United States Patent
Anton et al.

(10) Patent No.: US 11,438,383 B2
(45) Date of Patent: *Sep. 6, 2022

(54) CONTROLLING PERMISSIBLE ACTIONS A COMPUTING DEVICE CAN PERFORM ON A DATA RESOURCE BASED ON A USE POLICY EVALUATING AN AUTHORIZED CONTEXT OF THE DEVICE

(71) Applicant: VESCEL, LLC, Phoenix, AZ (US)

(72) Inventors: Dhryl Anton, Paradise Valley, AZ (US); Michael McFall, Paradise Valley, AZ (US)

(73) Assignee: VESCEL, LLC, Phoenix, AZ (US)

( * ) Notice: Subject to any disclaimer, the term of this patent is extended or adjusted under 35 U.S.C. 154(b) by 241 days.

This patent is subject to a terminal disclaimer.

(21) Appl. No.: 16/515,000

(22) Filed: Jul. 17, 2019

(65) Prior Publication Data

US 2019/0342344 A1    Nov. 7, 2019

Related U.S. Application Data

(63) Continuation of application No. 15/230,424, filed on Aug. 7, 2016, now Pat. No. 10,454,970.

(Continued)

(51) Int. Cl.
*G06F 17/30* (2006.01)
*H04L 9/40* (2022.01)
(Continued)

(52) U.S. Cl.
CPC .......... *H04L 63/20* (2013.01); *G06F 16/2219* (2019.01); *G06F 21/6227* (2013.01);
(Continued)

(58) Field of Classification Search
CPC ........ G06F 16/13; G06F 16/24; G06F 16/156; G06F 21/30; G06N 3/00; G06N 5/00; G05B 13/00; H04L 29/06823
See application file for complete search history.

(56) References Cited

U.S. PATENT DOCUMENTS

| 6,044,373 A * | 3/2000 | Gladney | G06F 16/252 |
| | | | 707/999.009 |
| 2008/0306872 A1* | 12/2008 | Felsher | G06Q 10/10 |
| | | | 705/51 |

(Continued)

*Primary Examiner* — Hung D Le
(74) *Attorney, Agent, or Firm* — Peter Jensen-Haxel

(57) ABSTRACT

Disclosed is a method, a device, and/or a system of controlling permissible actions a computing device can perform on a data resource based on a use policy evaluating an authorized context of the device. In one embodiment, a request is received from a device to use a protected resource stored in a non-hierarchical data structure. A use policy defining an authorized context for which the device can use the protected resource based on contextual value(s) is extracted from a data node. A use transaction is initiated that gathers the contextual values to determine whether the use request satisfies the authorized context. A set of use terms is generated and returned to the device. The protected resource is then streamed to the device, where the device includes a process to enforce ephemerality of the protected resource by maintaining the protected resource in association with the set of use terms.

20 Claims, 35 Drawing Sheets

TRANSACTION PROCESS FLOW 2.600

Related U.S. Application Data

(60) Provisional application No. 62/203,688, filed on Aug. 11, 2015.

(51) Int. Cl.
  *G06F 21/62* (2013.01)
  *G06F 16/22* (2019.01)

(52) U.S. Cl.
  CPC .... H04L 63/108 (2013.01); *G06F 2221/2137* (2013.01); *G06F 2221/2141* (2013.01); *G06F 2221/2149* (2013.01); *H04L 63/062* (2013.01); *H04L 63/0823* (2013.01); *H04L 63/101* (2013.01)

(56) References Cited

U.S. PATENT DOCUMENTS

| | | | | |
|---|---|---|---|---|
| 2012/0079590 | A1* | 3/2012 | Sastry | G06F 12/1458 726/21 |
| 2013/0174277 | A1* | 7/2013 | Kiukkonen | H04L 63/104 726/28 |
| 2014/0047531 | A1* | 2/2014 | Zaitsev | G06F 21/34 726/9 |
| 2014/0344900 | A1* | 11/2014 | Das | G06F 16/13 726/4 |
| 2016/0110553 | A1* | 4/2016 | Factor | H04L 63/20 726/30 |

\* cited by examiner

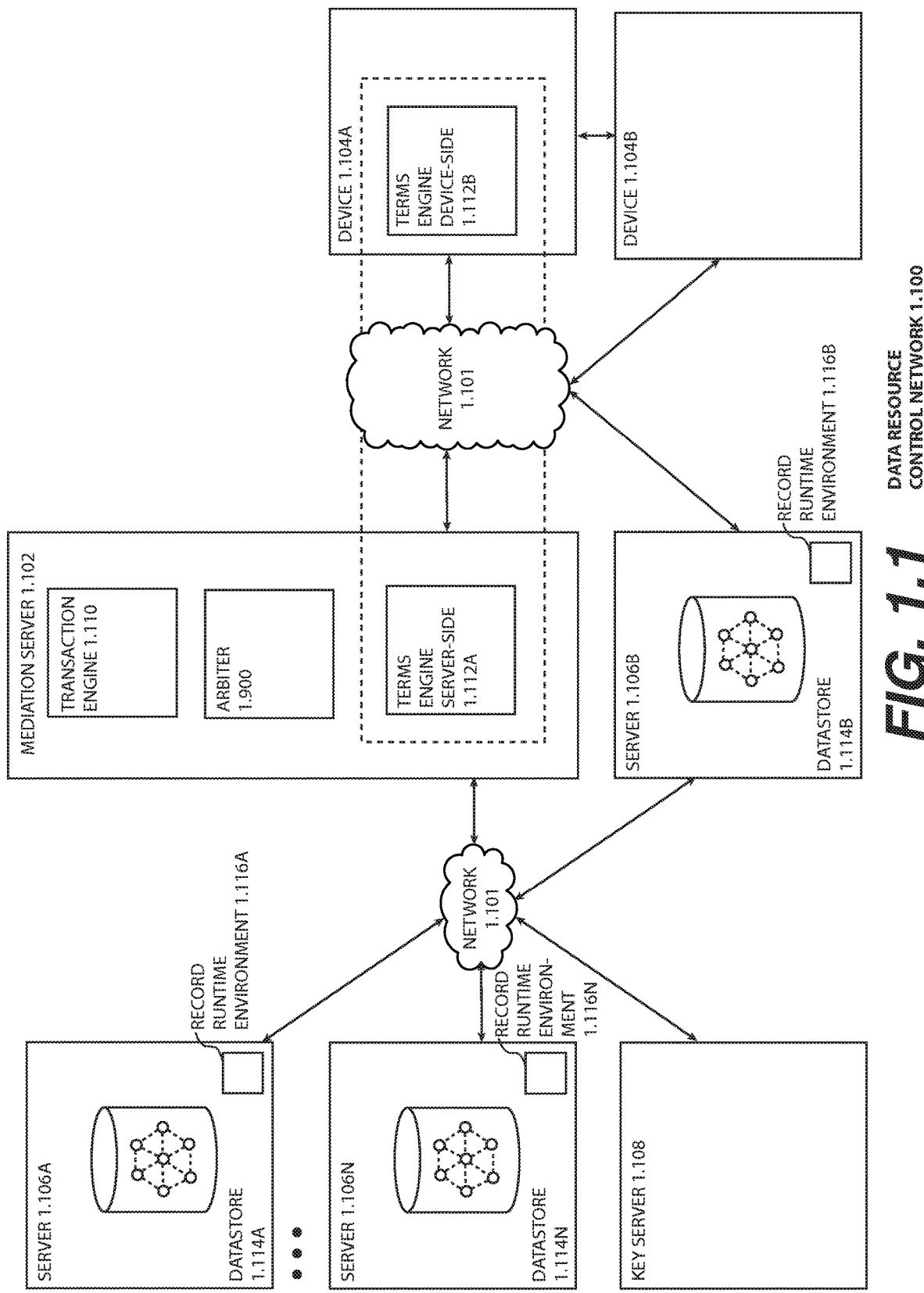
FIG. 1.1

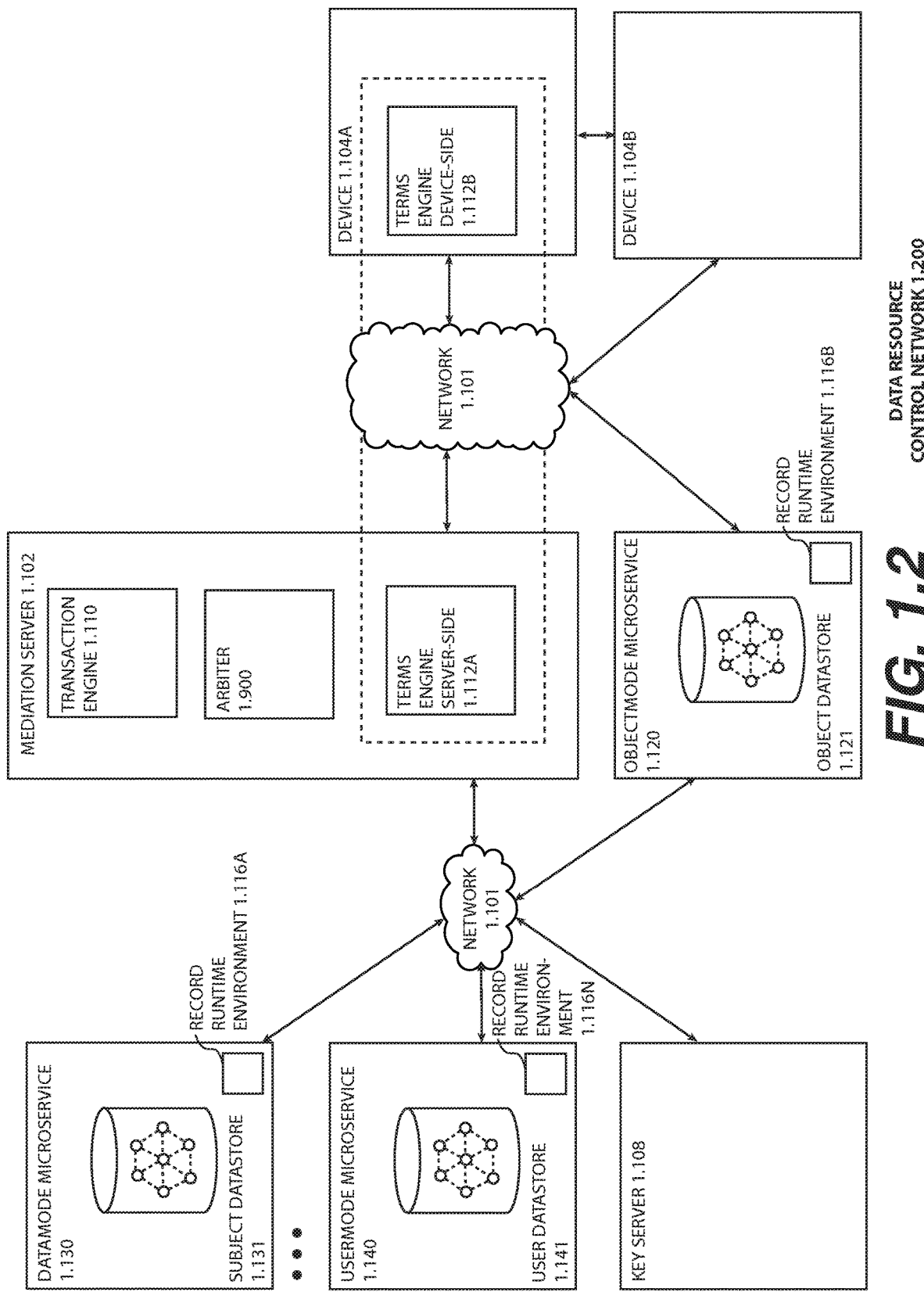
FIG. 1.2

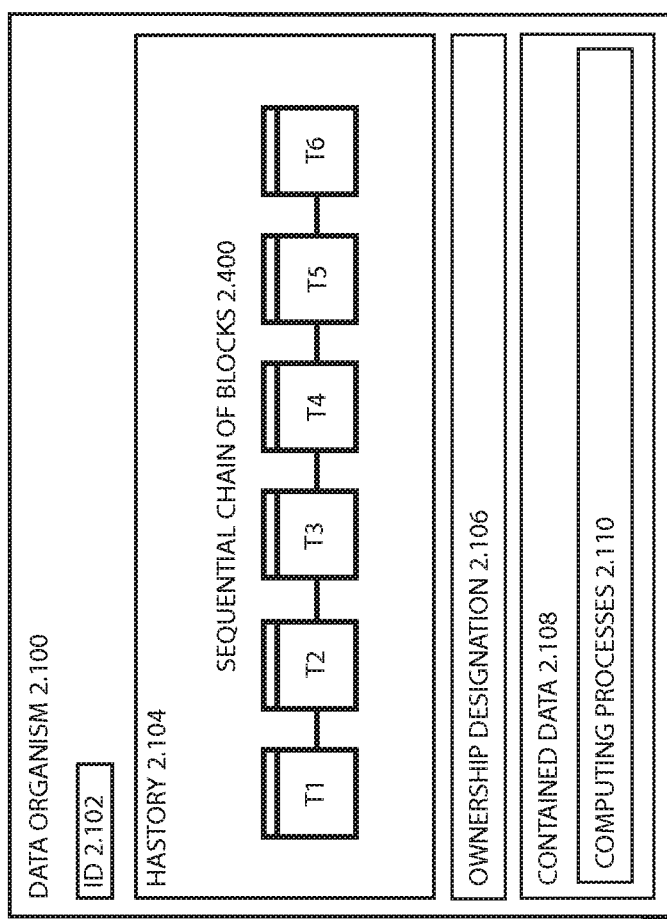
FIG. 2.1  DATA ORGANISM 2.100

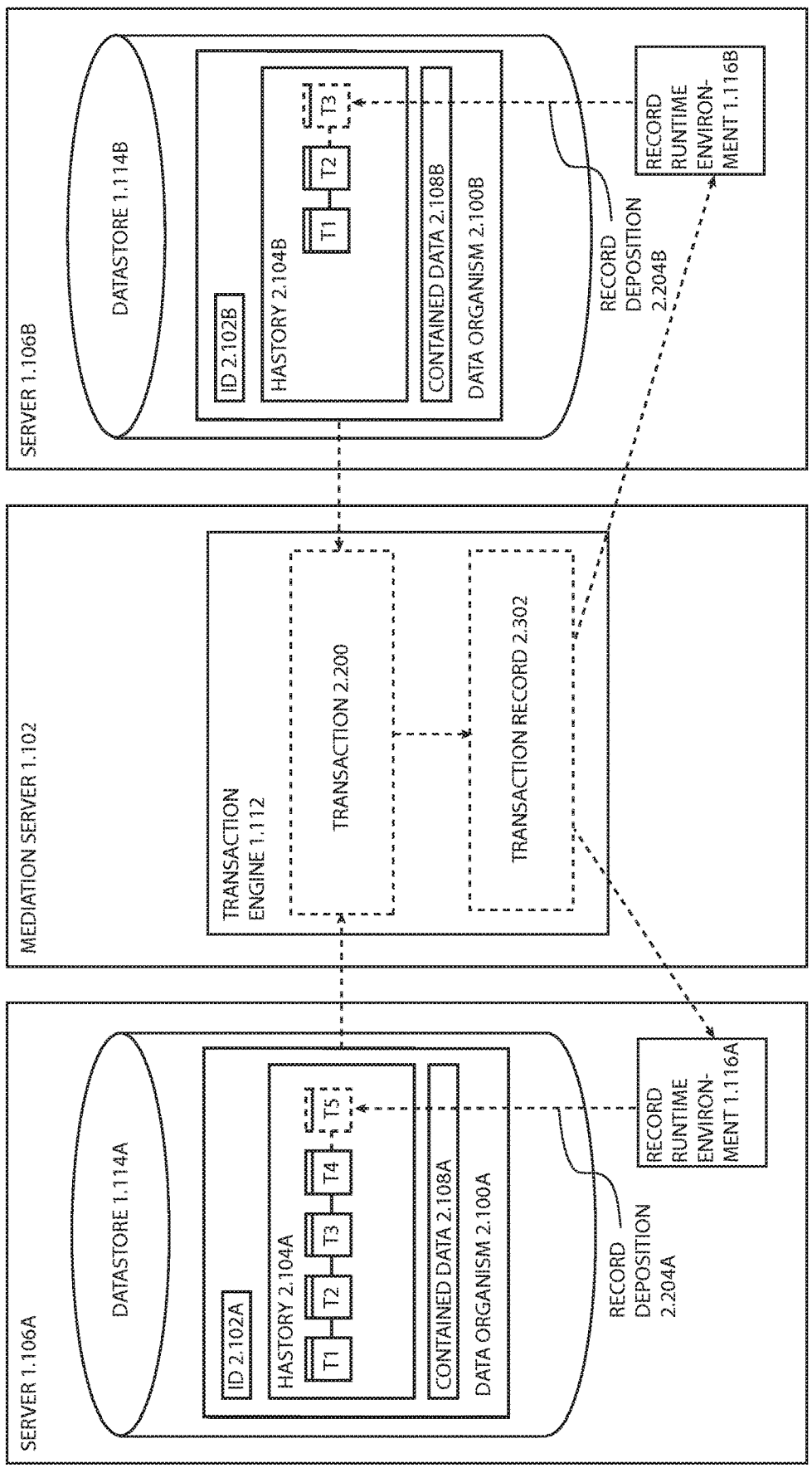
FIG. 2.2
DATA ORGANISM
TRANSACTION VIEW 2.250

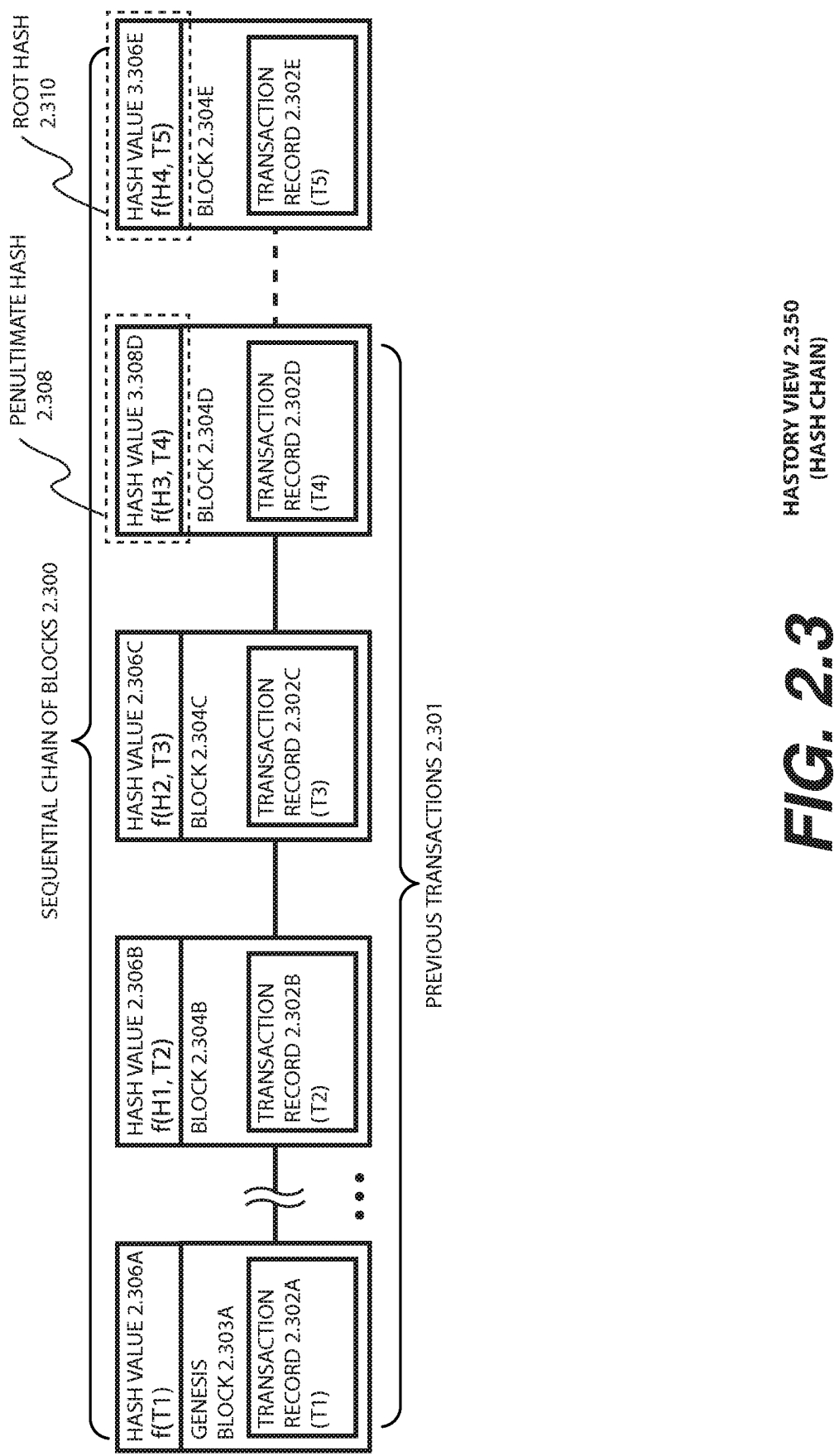
FIG. 2.3

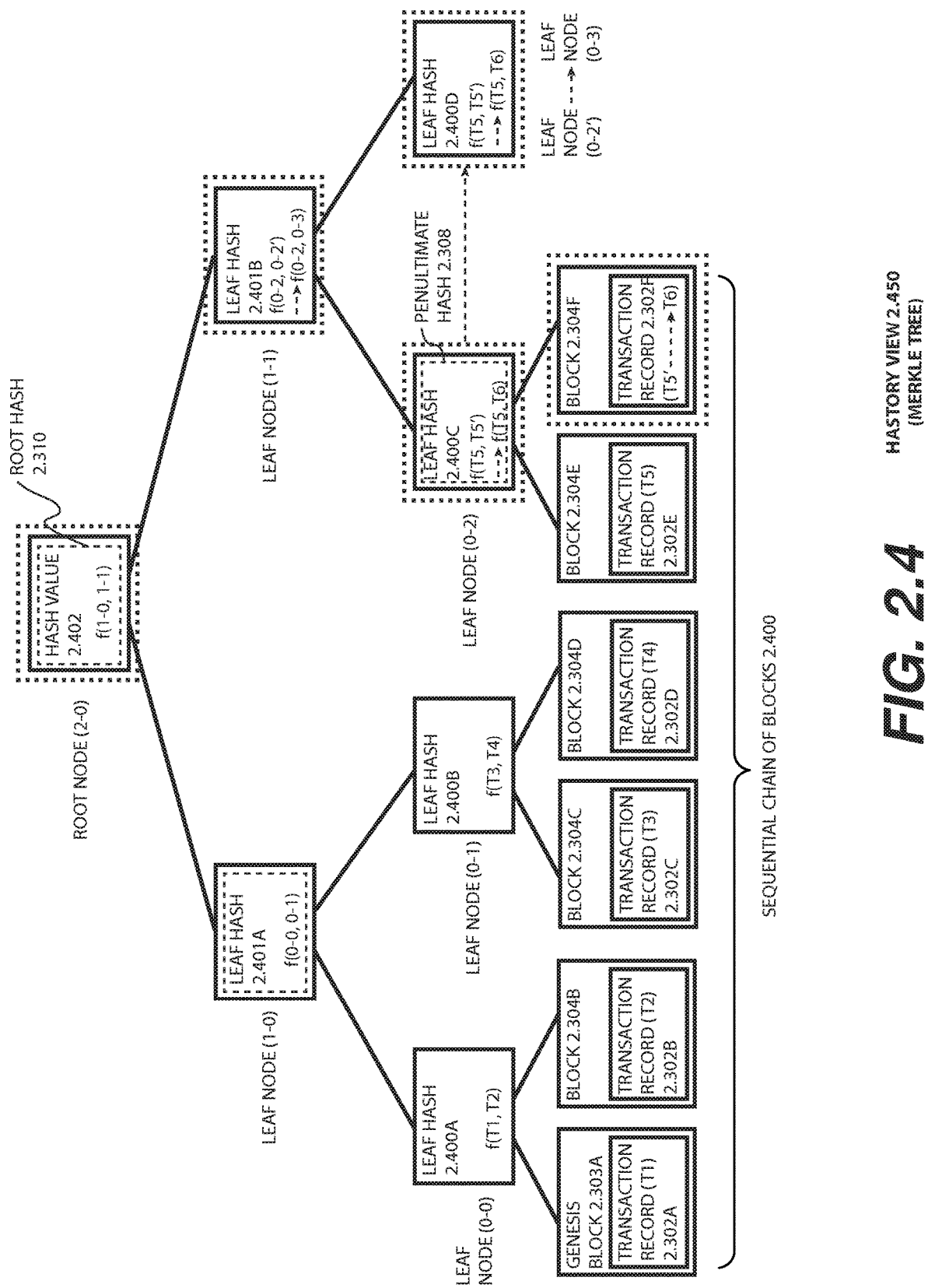
FIG. 2.4 HISTORY VIEW 2.450 (MERKLE TREE)

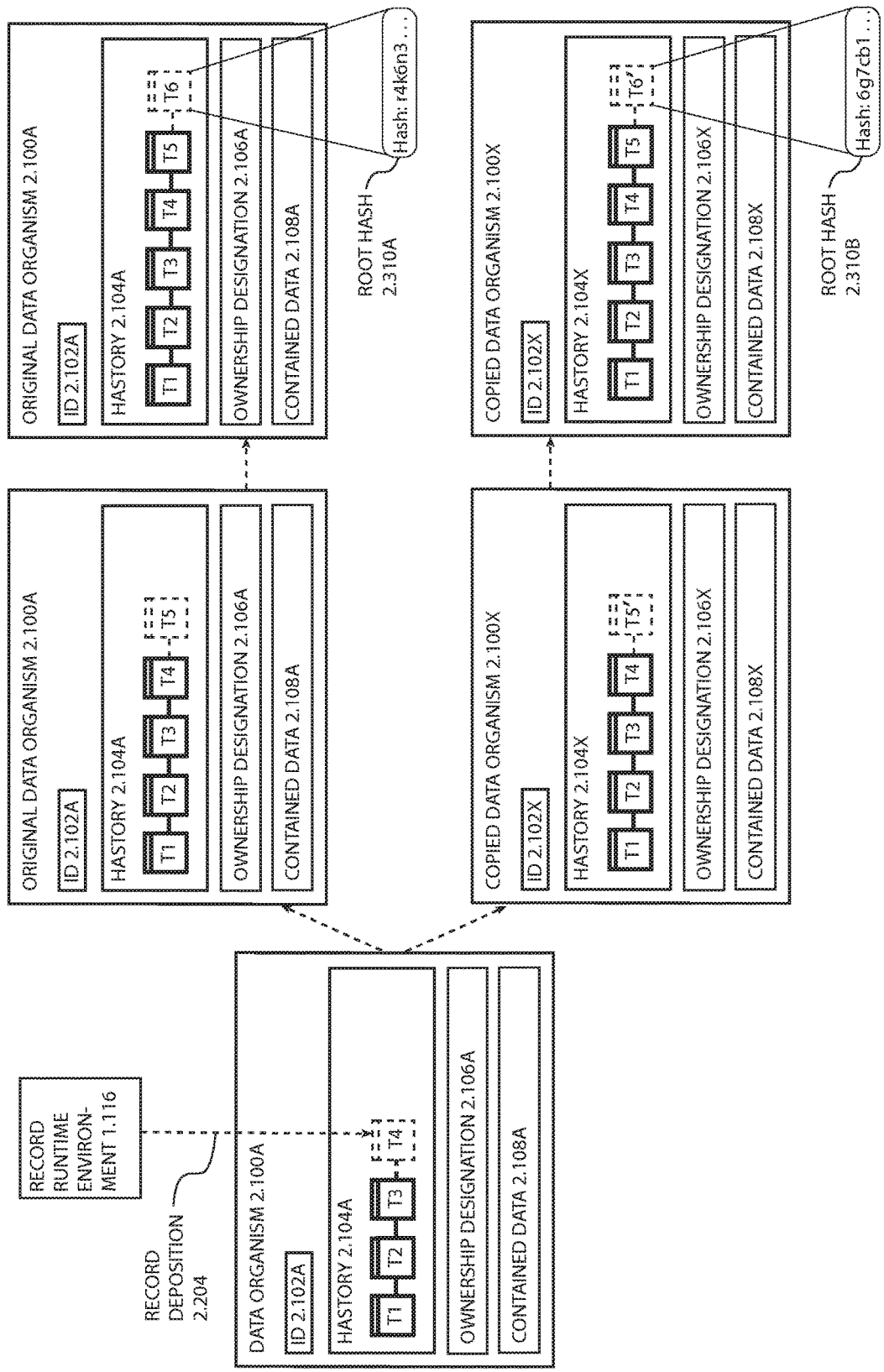
FIG. 2.5    DATA ORGANISM IDENTITY EVOLUTION VIEW 2.550

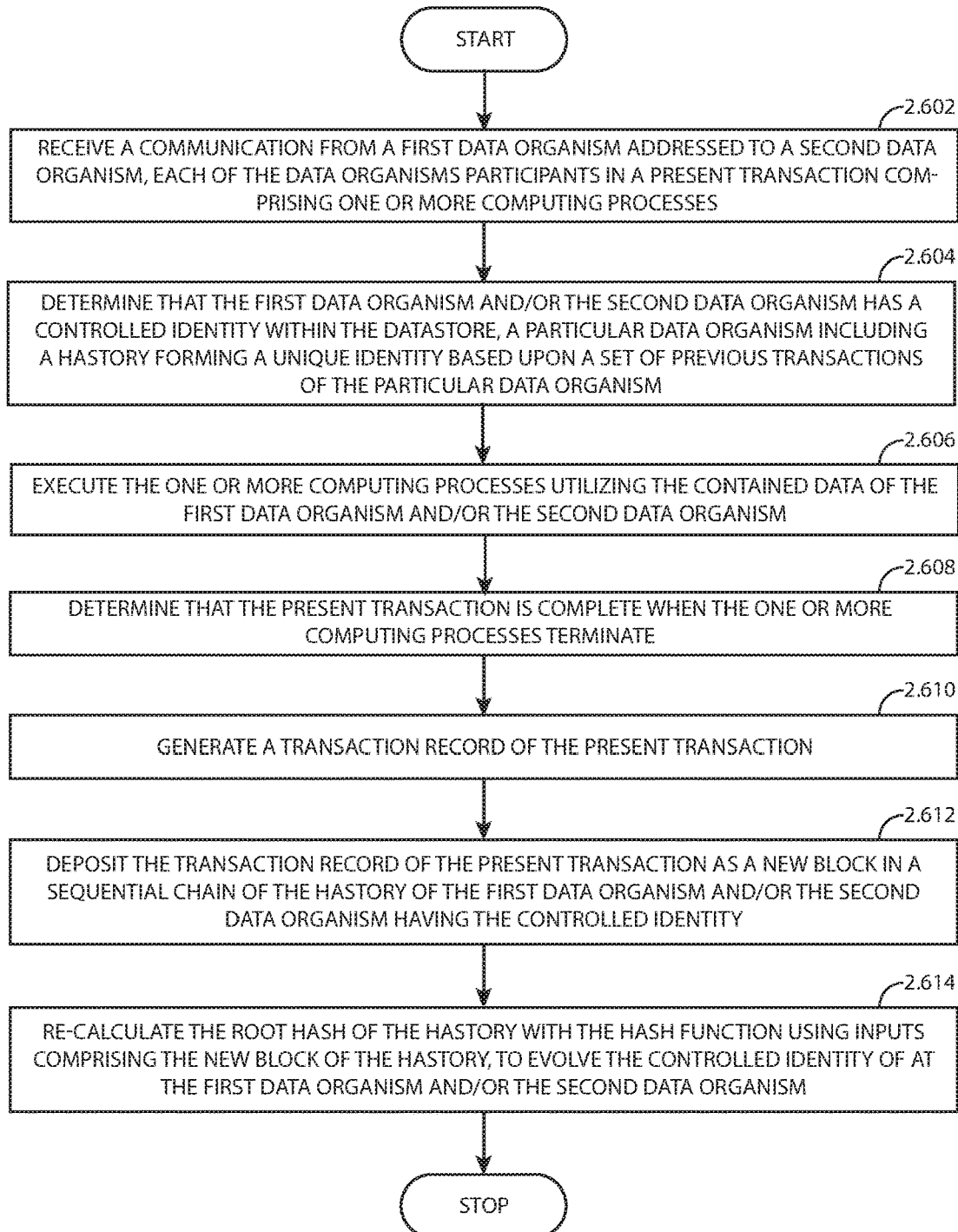
FIG. 2.6 — TRANSACTION PROCESS FLOW 2.600

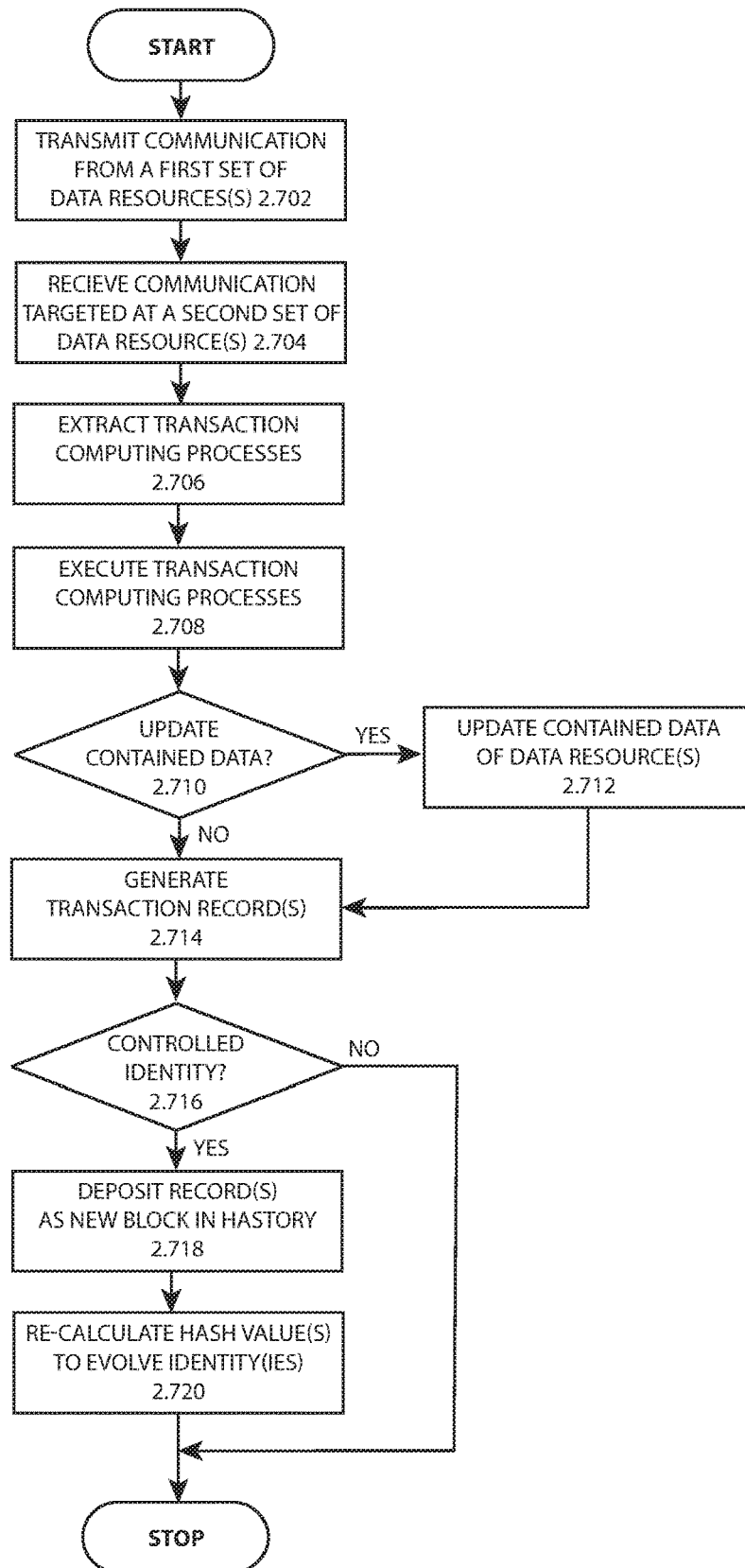
*FIG. 2.7*   TRANSACTION PROCESS FLOW 2.700

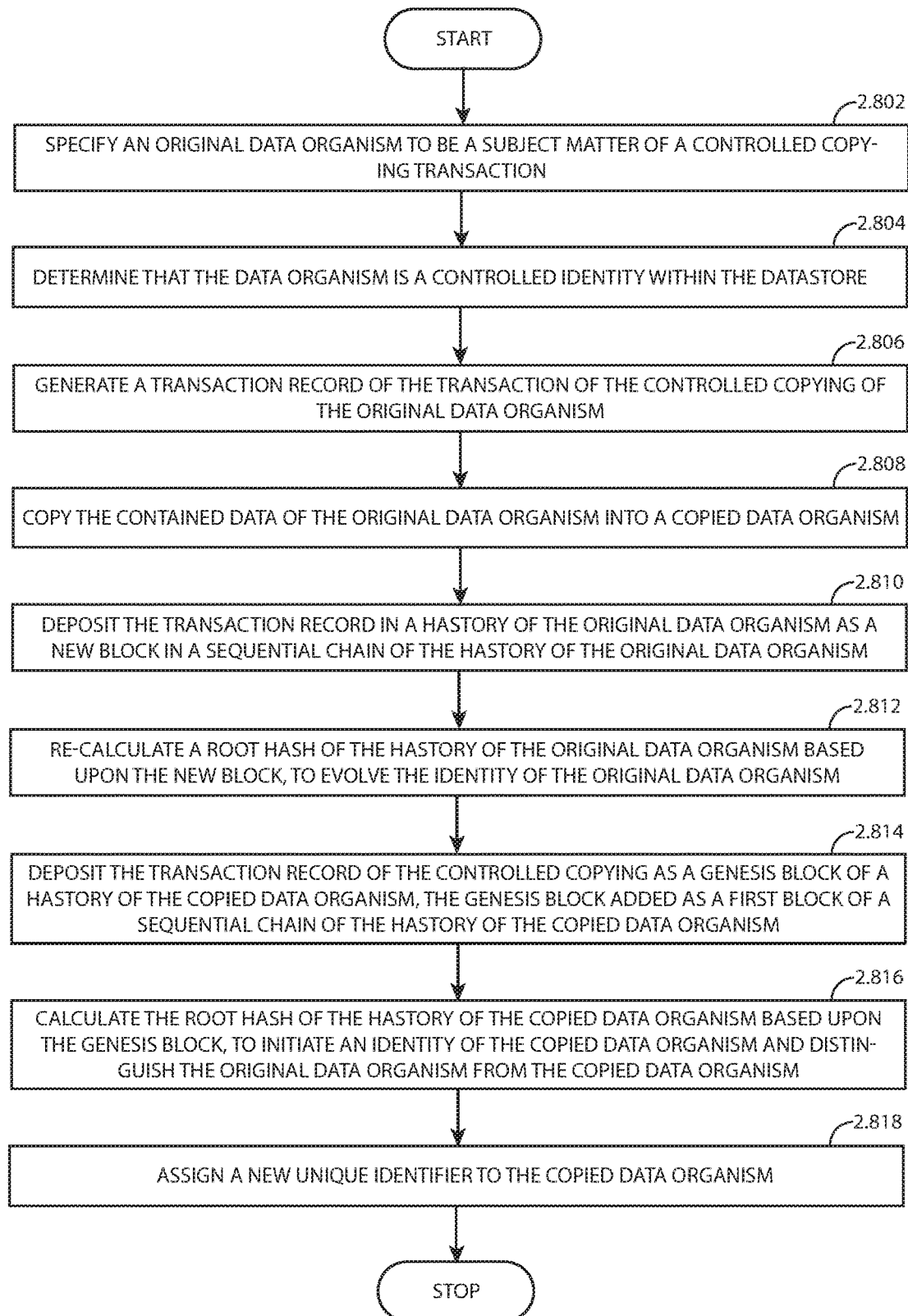
FIG. 2.8    CONTROLLED COPYING PROCESS FLOW 2.800

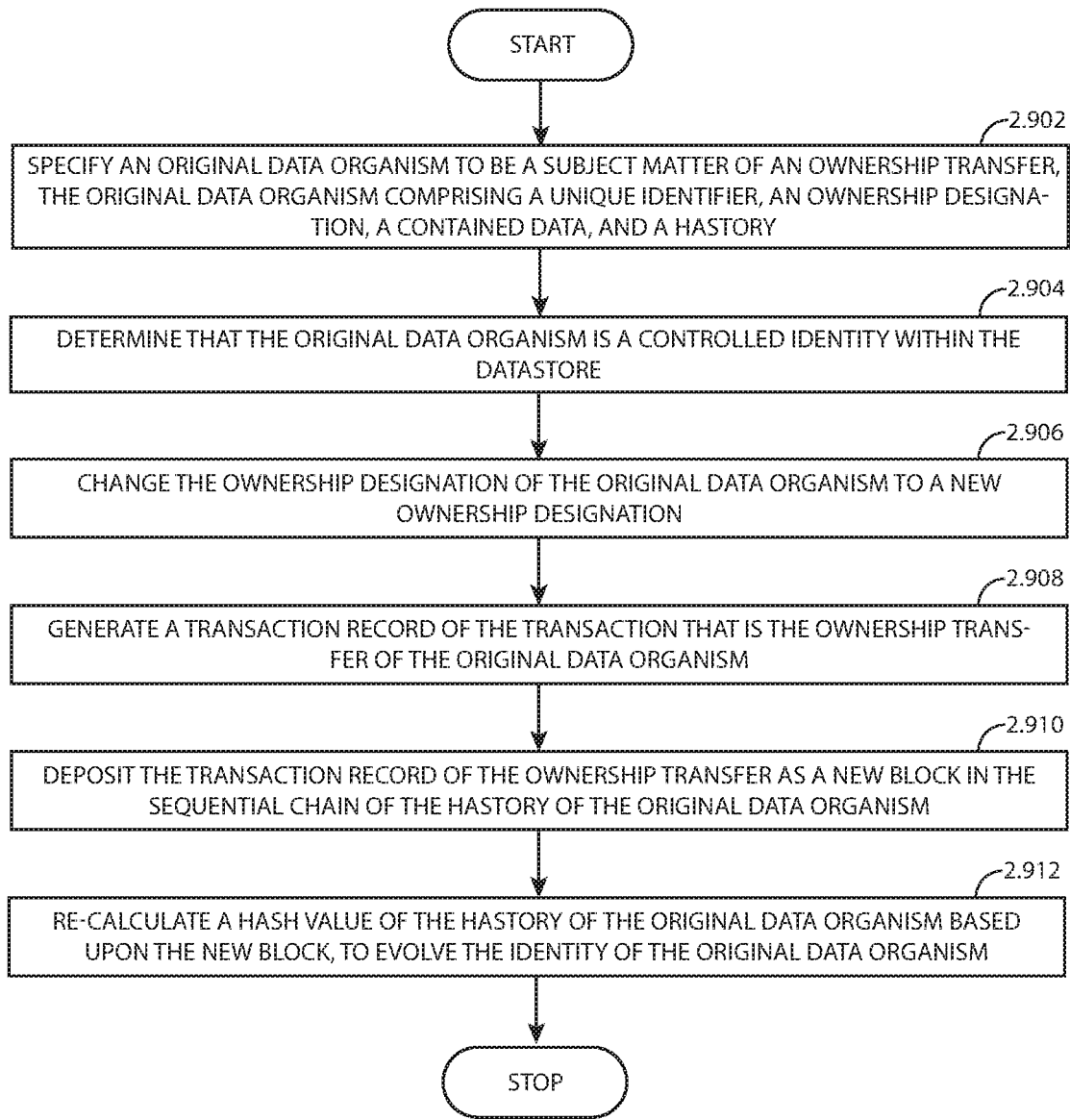
FIG. 2.9  DATA ORGANISM TRANSFER PROCESS FLOW 2.900

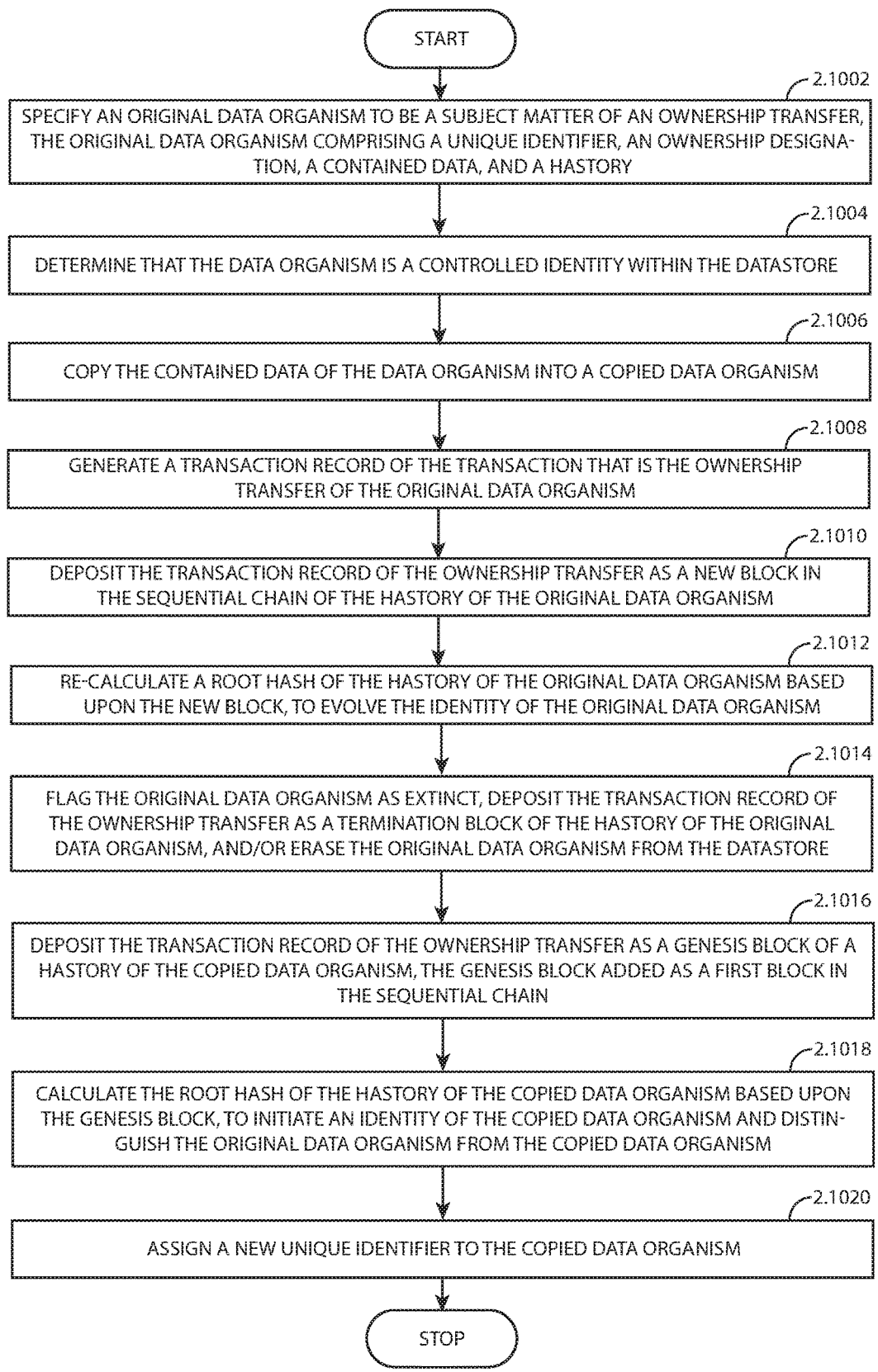
FIG. 2.10  DATA ORGANISM TRANSFER PROCESS FLOW 2.1000

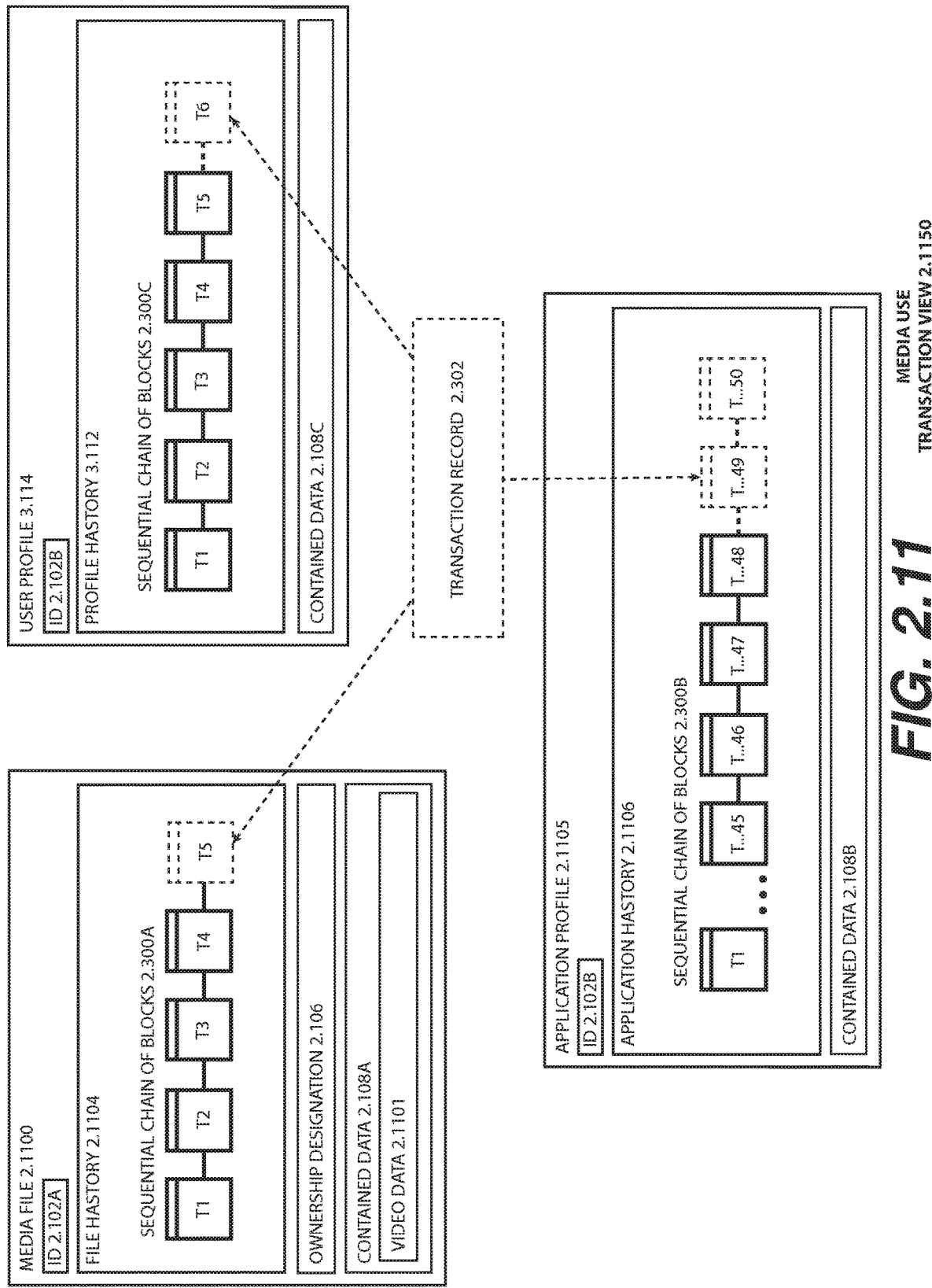
FIG. 2.11

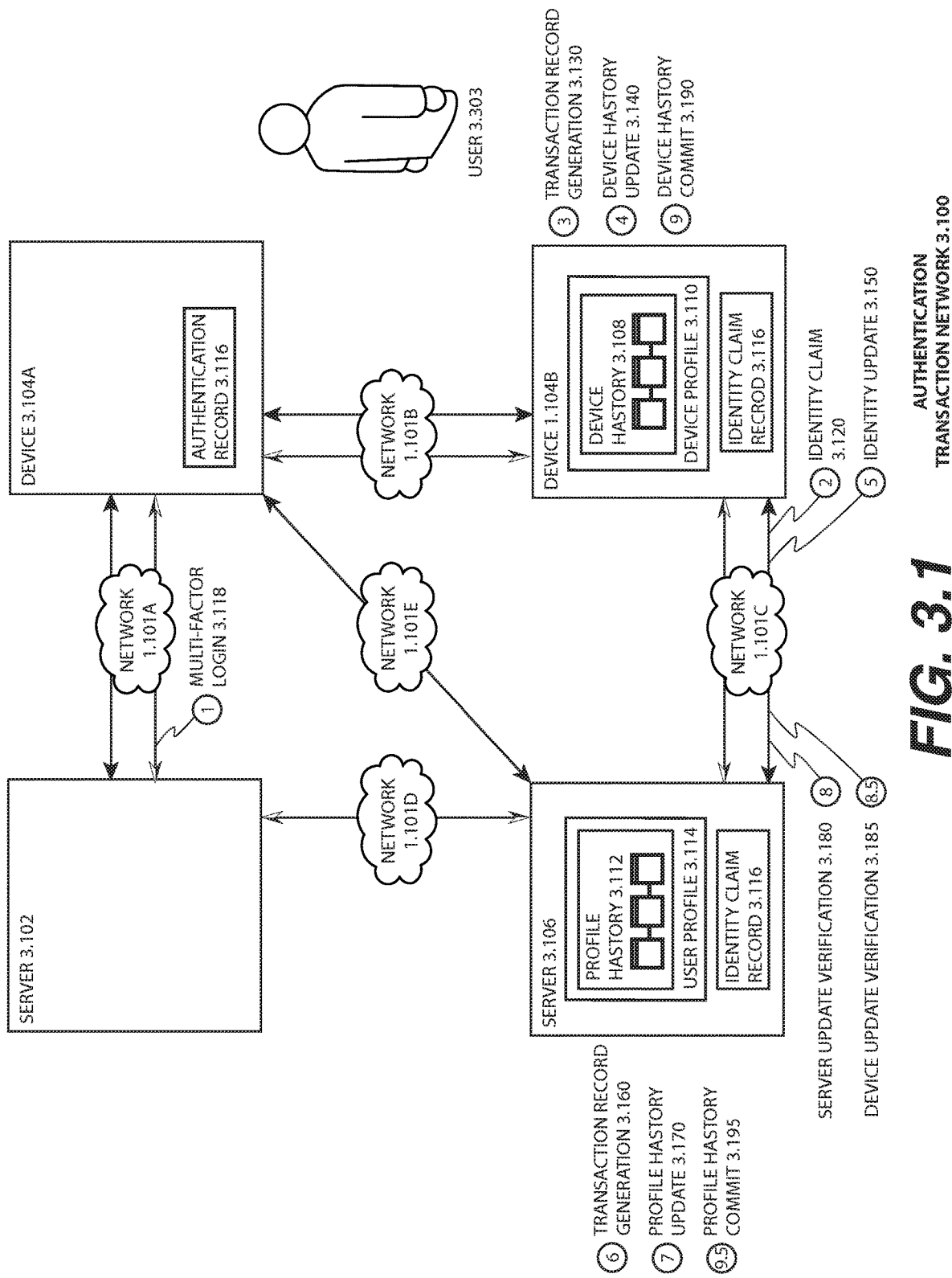
FIG. 3.1

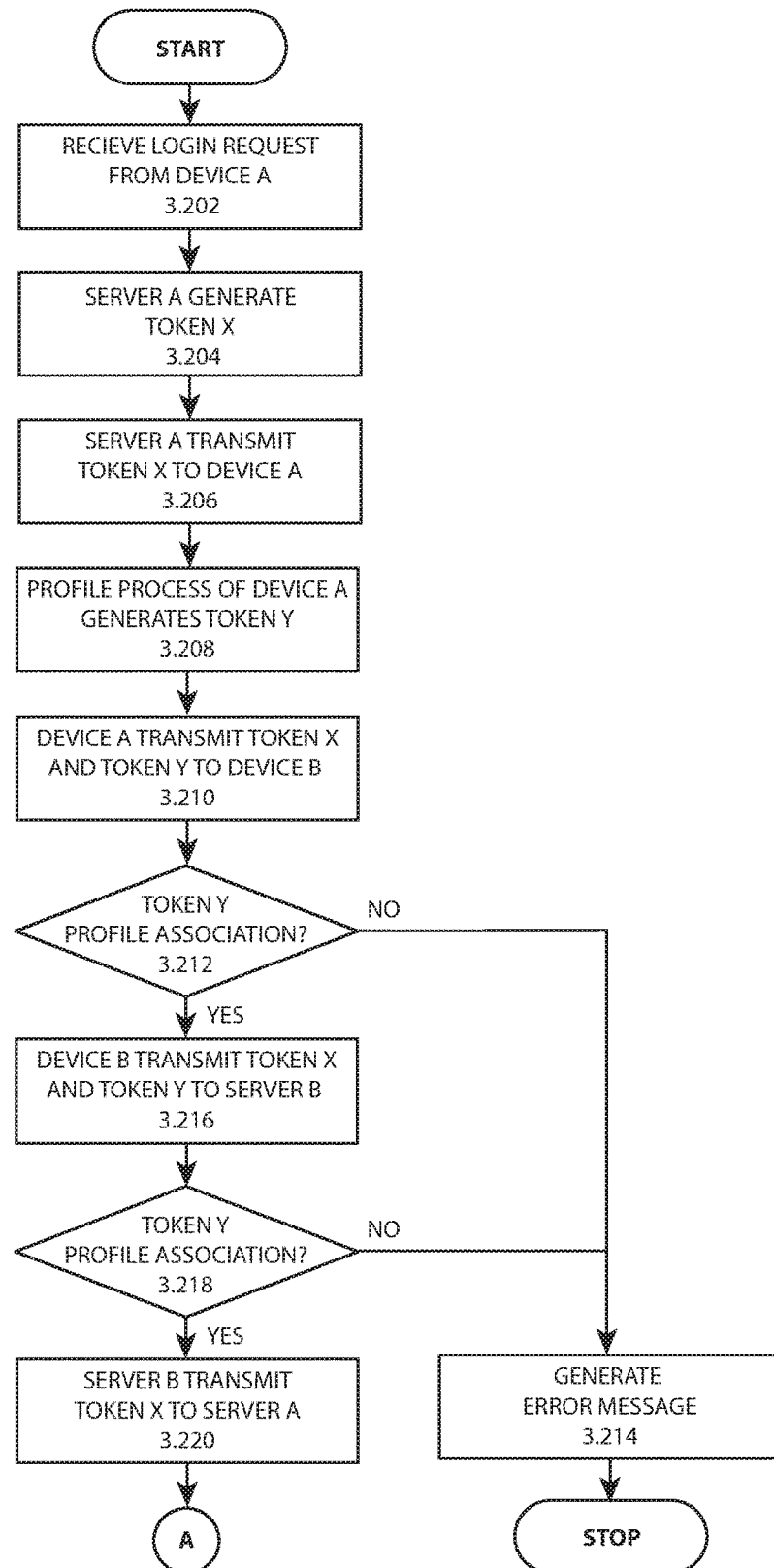
FIG. 3.2  MULTI-FACTOR LOGIN PROCESS FLOW 3.200

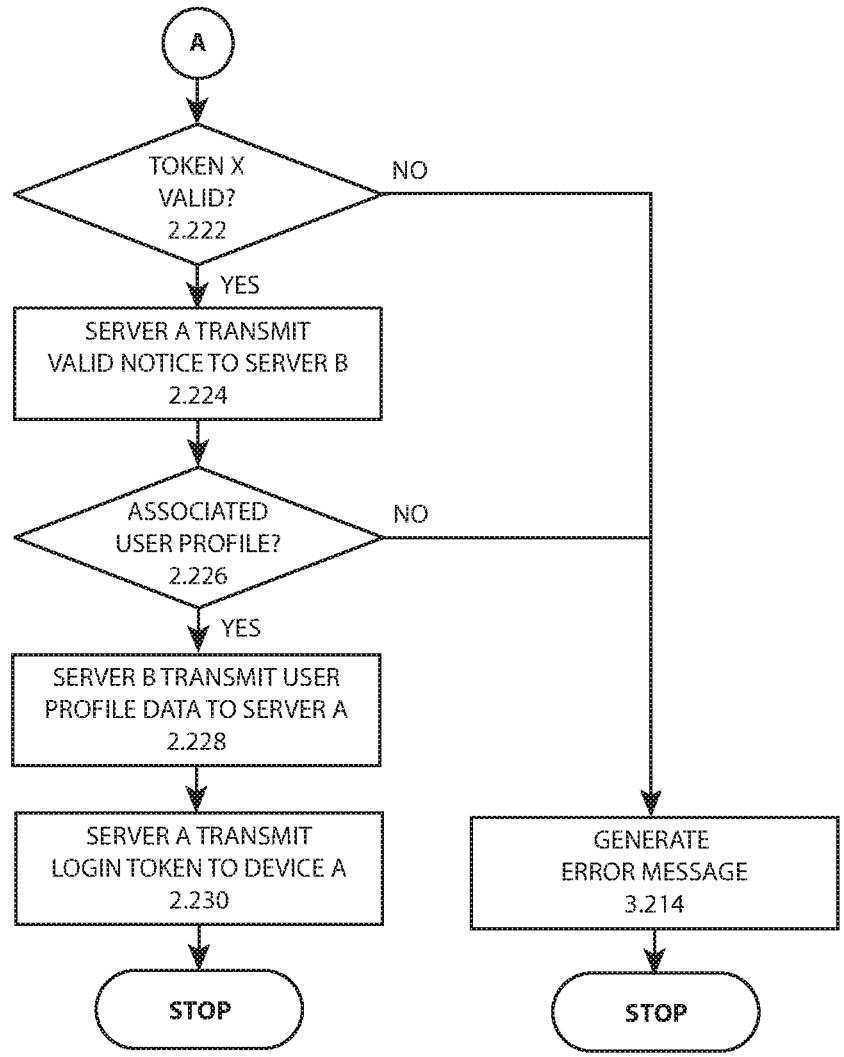
FIG. 3.3  MULTI-FACTOR LOGIN PROCESS FLOW 3.300

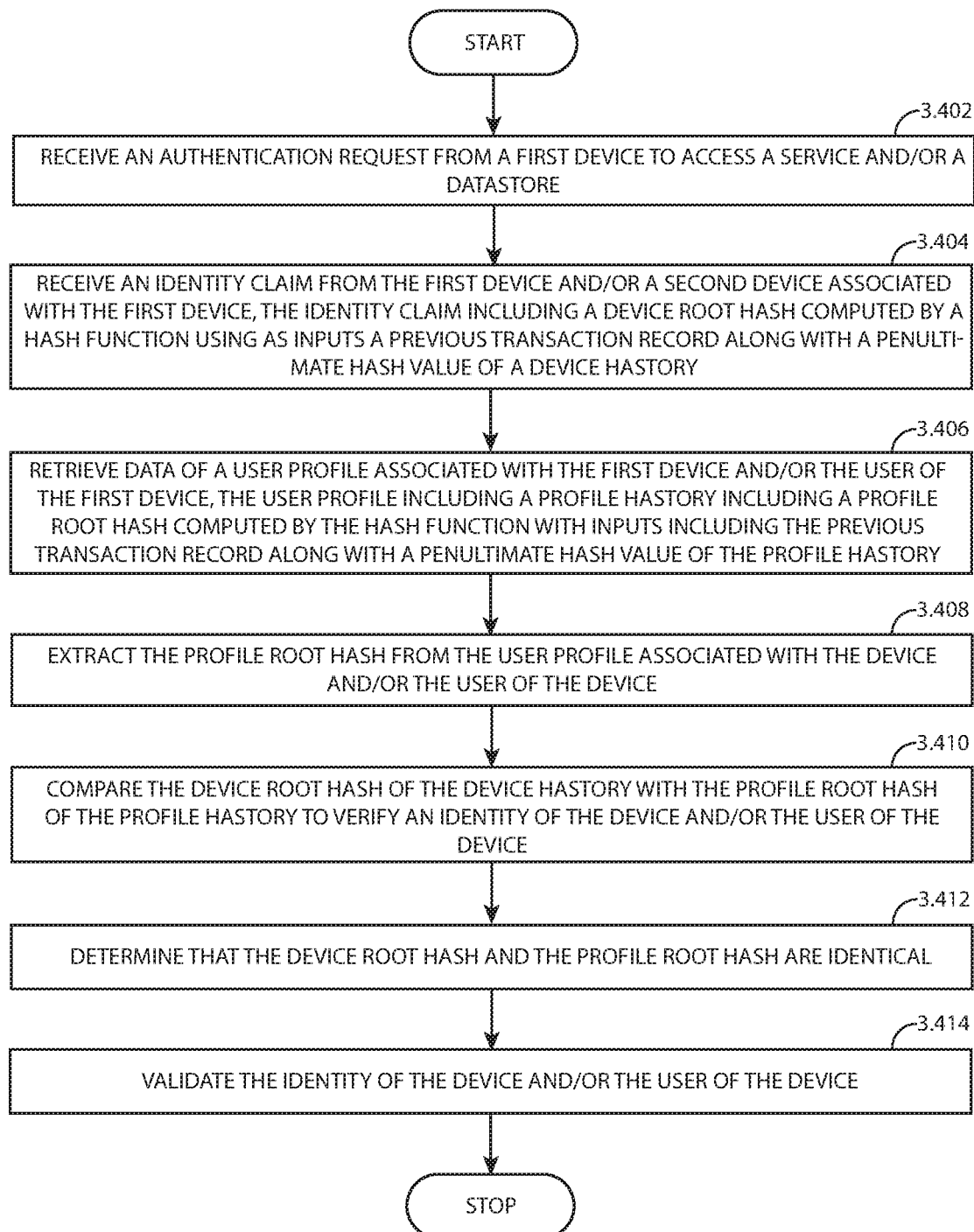
*FIG. 3.4*  AUTHENTICATION PROCESS FLOW 3.400

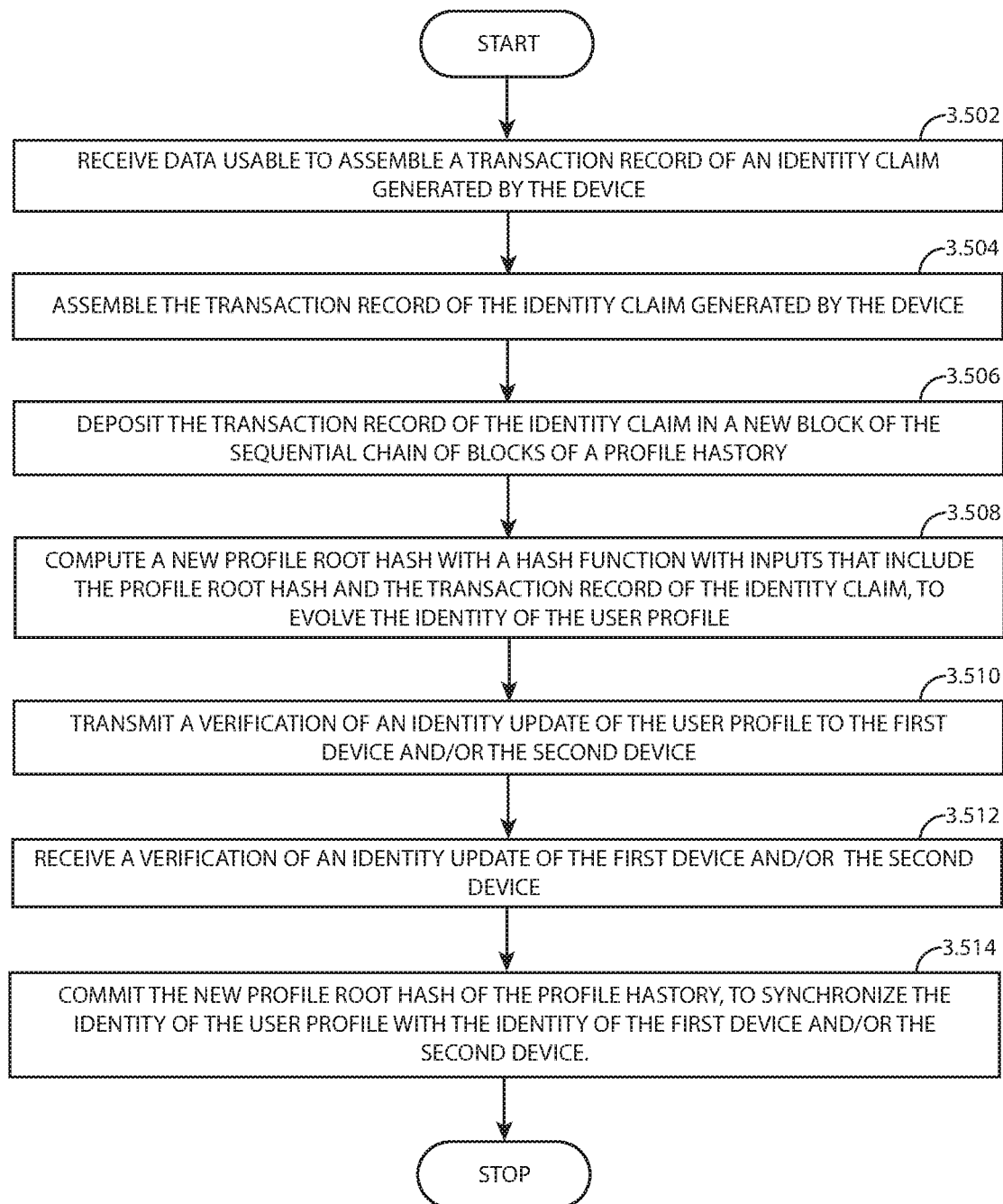
FIG. 3.5  IDENTITY EVOLUTION PROCESS FLOW 3.500

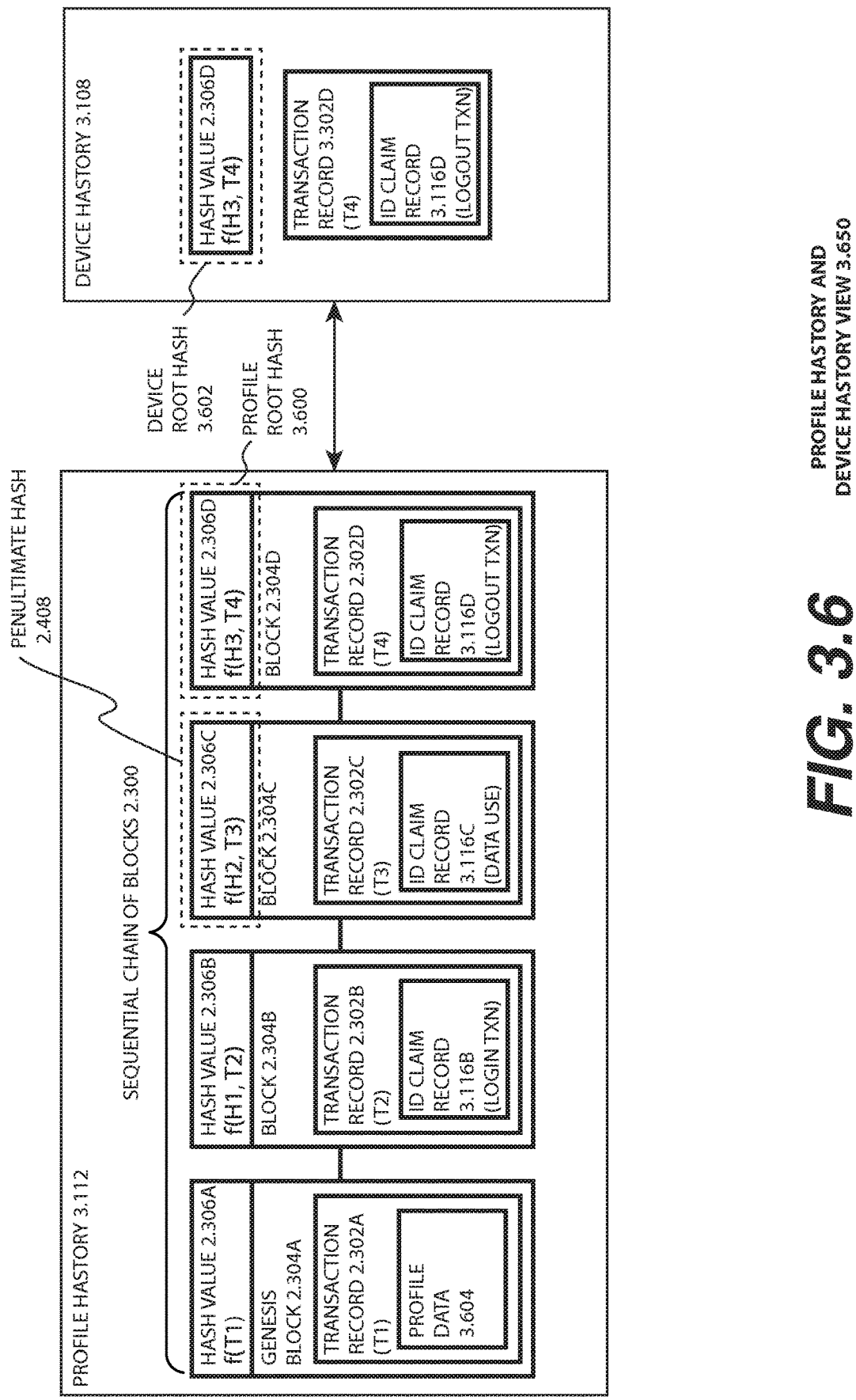
*FIG. 3.6*
PROFILE HASTORY AND
DEVICE HASTORY VIEW 3.650

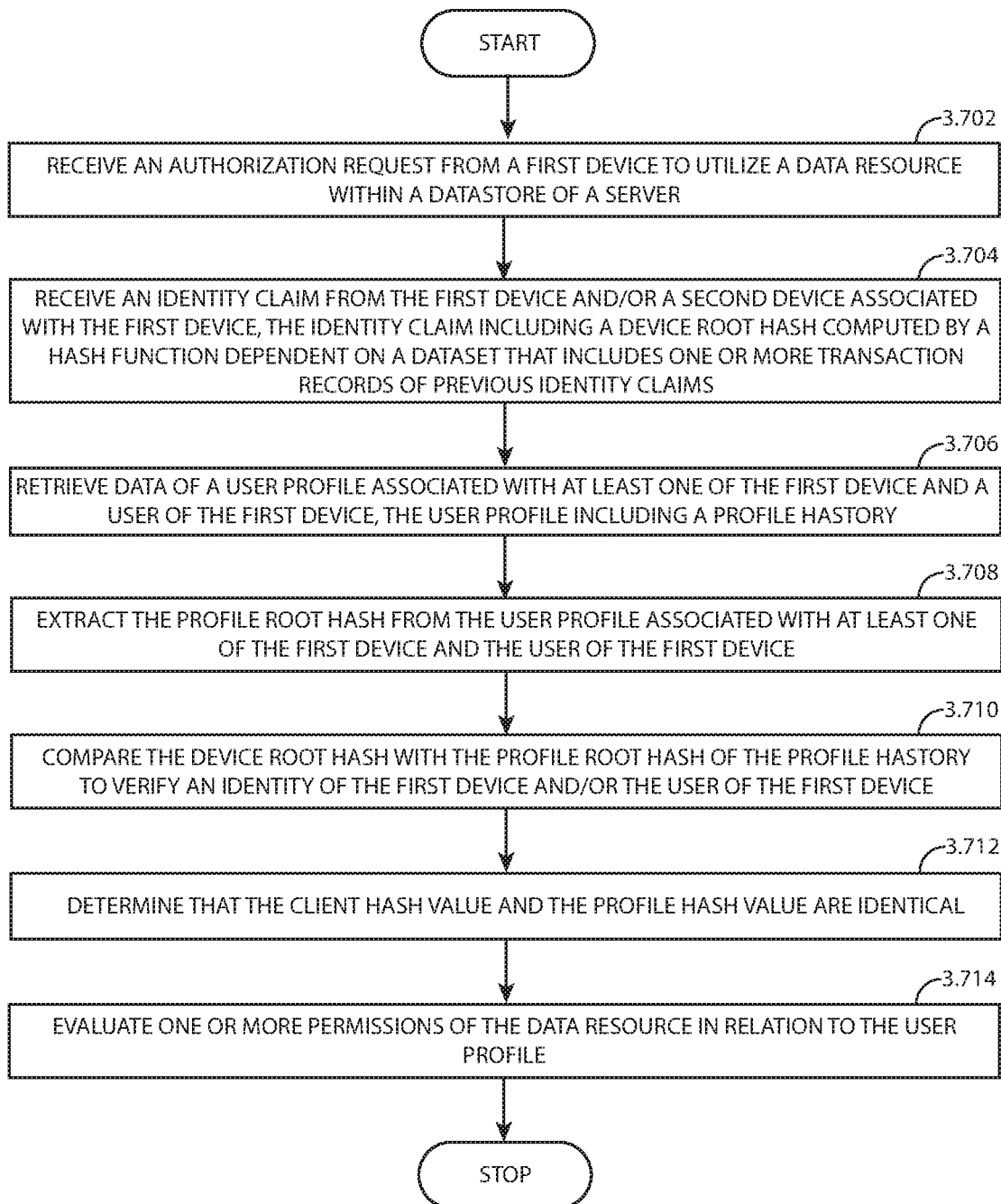
FIG. 3.7  REAL-TIME AUTHENTICAITON PROCESS FLOW 3.700

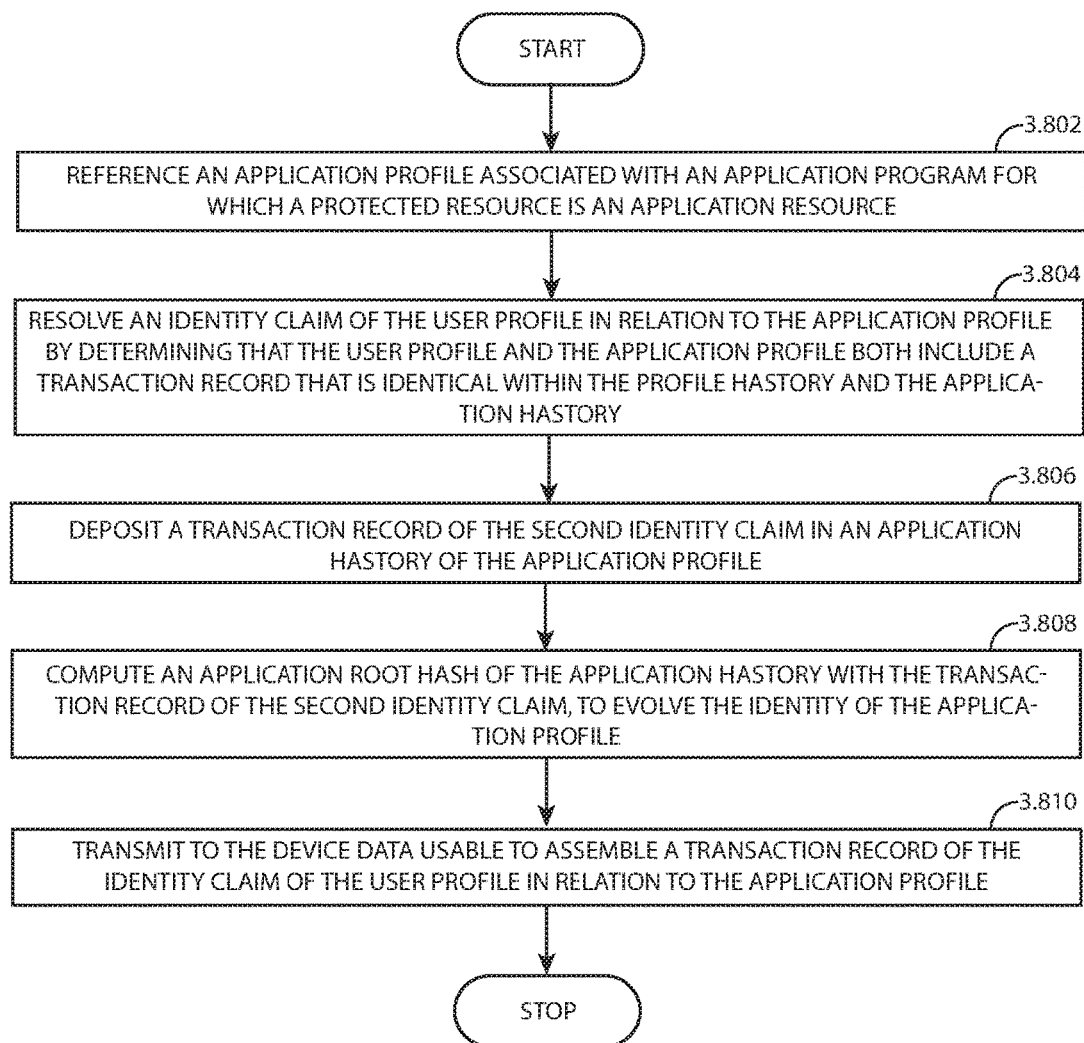
FIG. 3.8 APPLICAITON IDENTITY EVOLUTION PROCESS FLOW 3.800

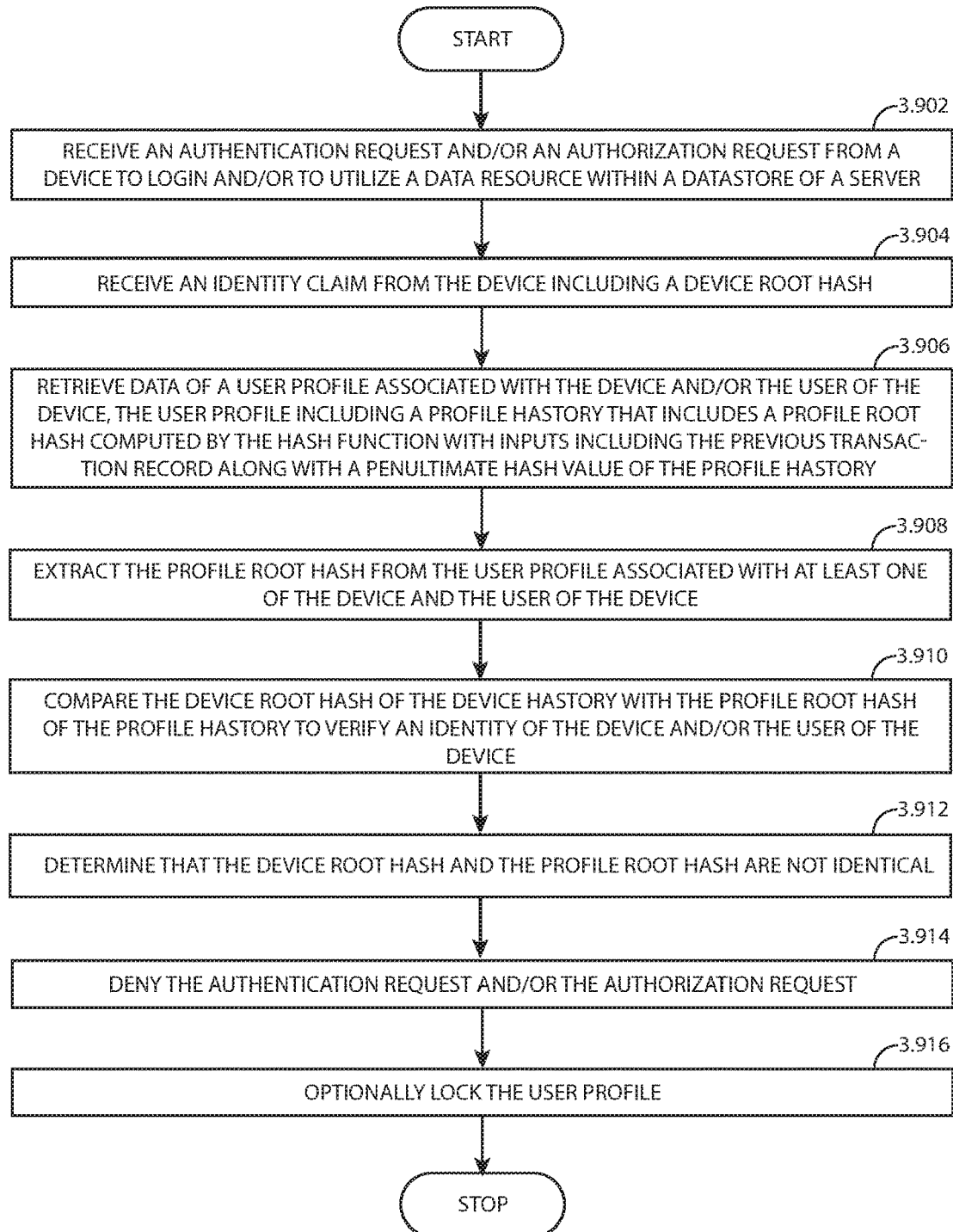
*FIG. 3.9* PROFILE ATTACK DETECTION PROCESS FLOW 3.900

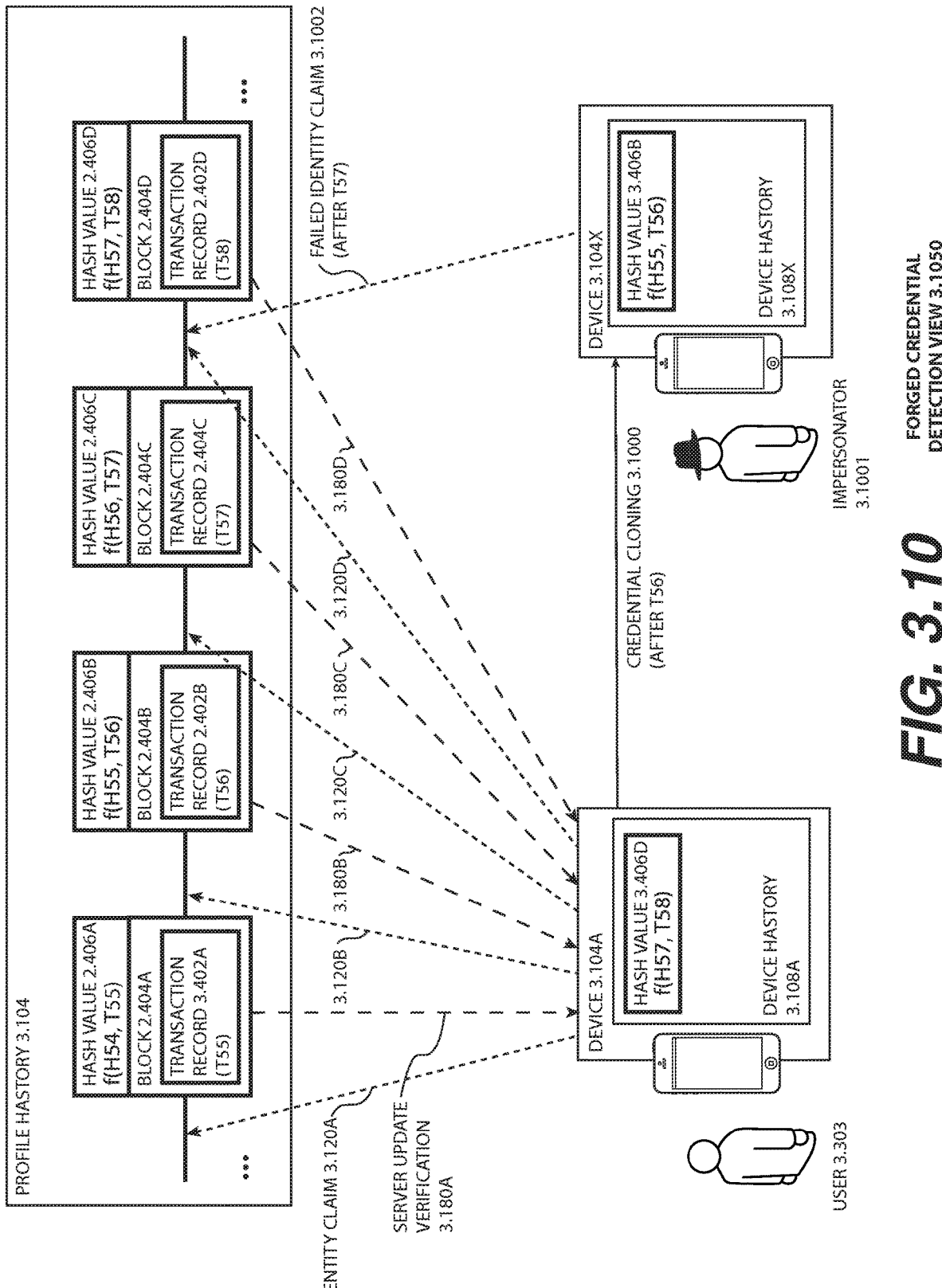
FIG. 3.10
FORGED CREDENTIAL
DETECTION VIEW 3.1050

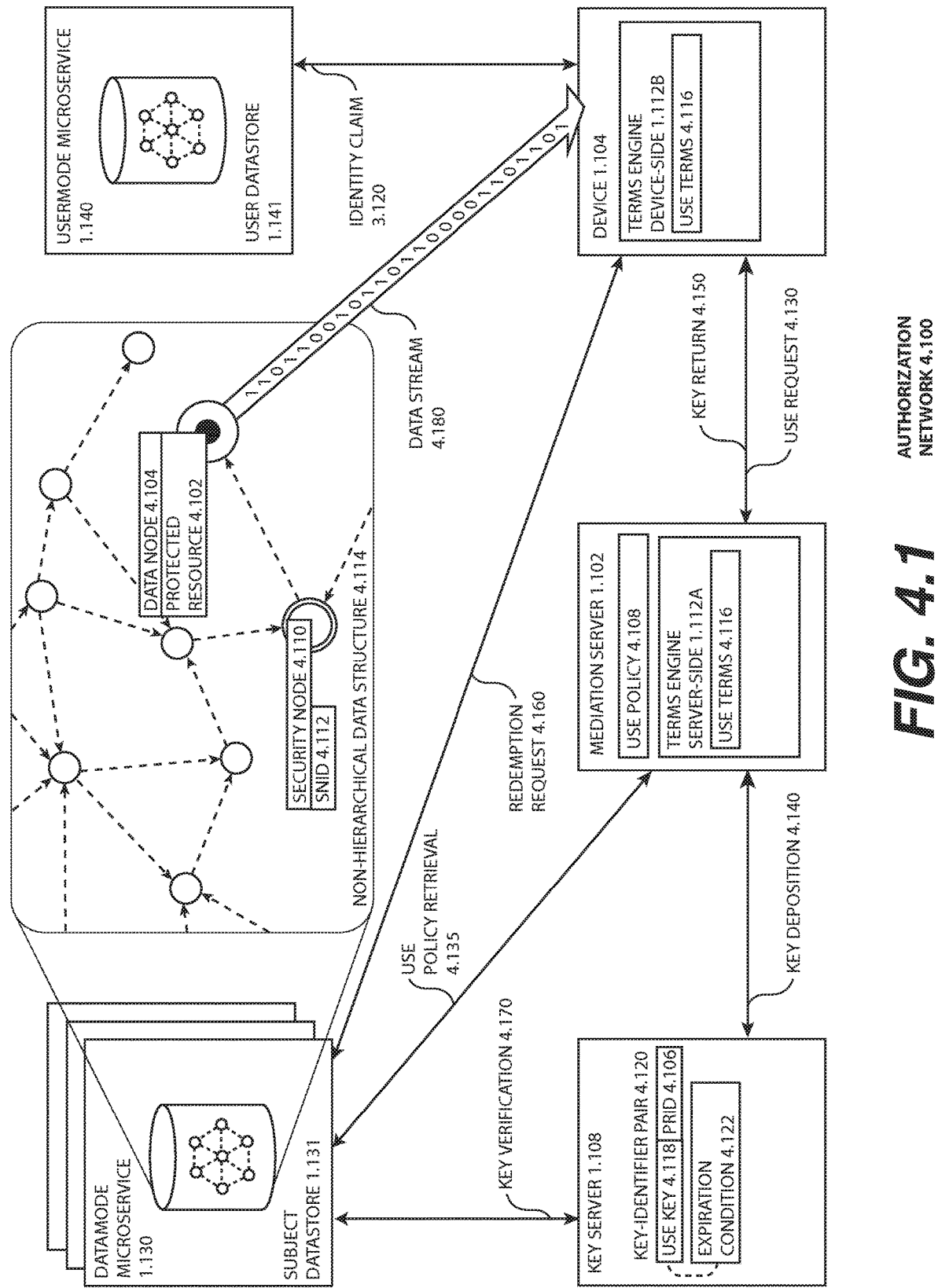
FIG. 4.1
AUTHORIZATION NETWORK 4.100

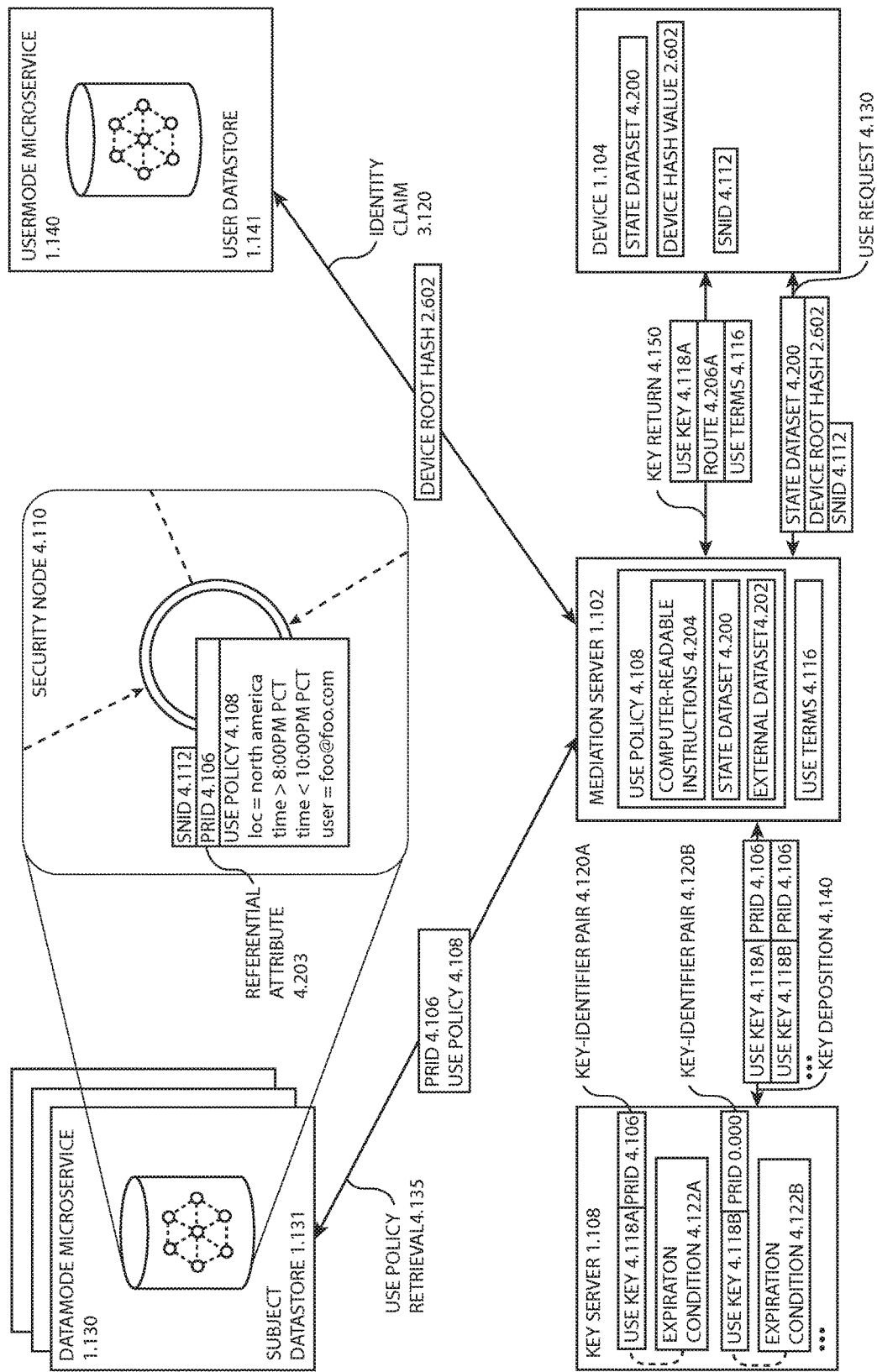
FIG. 4.2
CONTEXTUAL AUTHORIZATION PROCESS 4.250

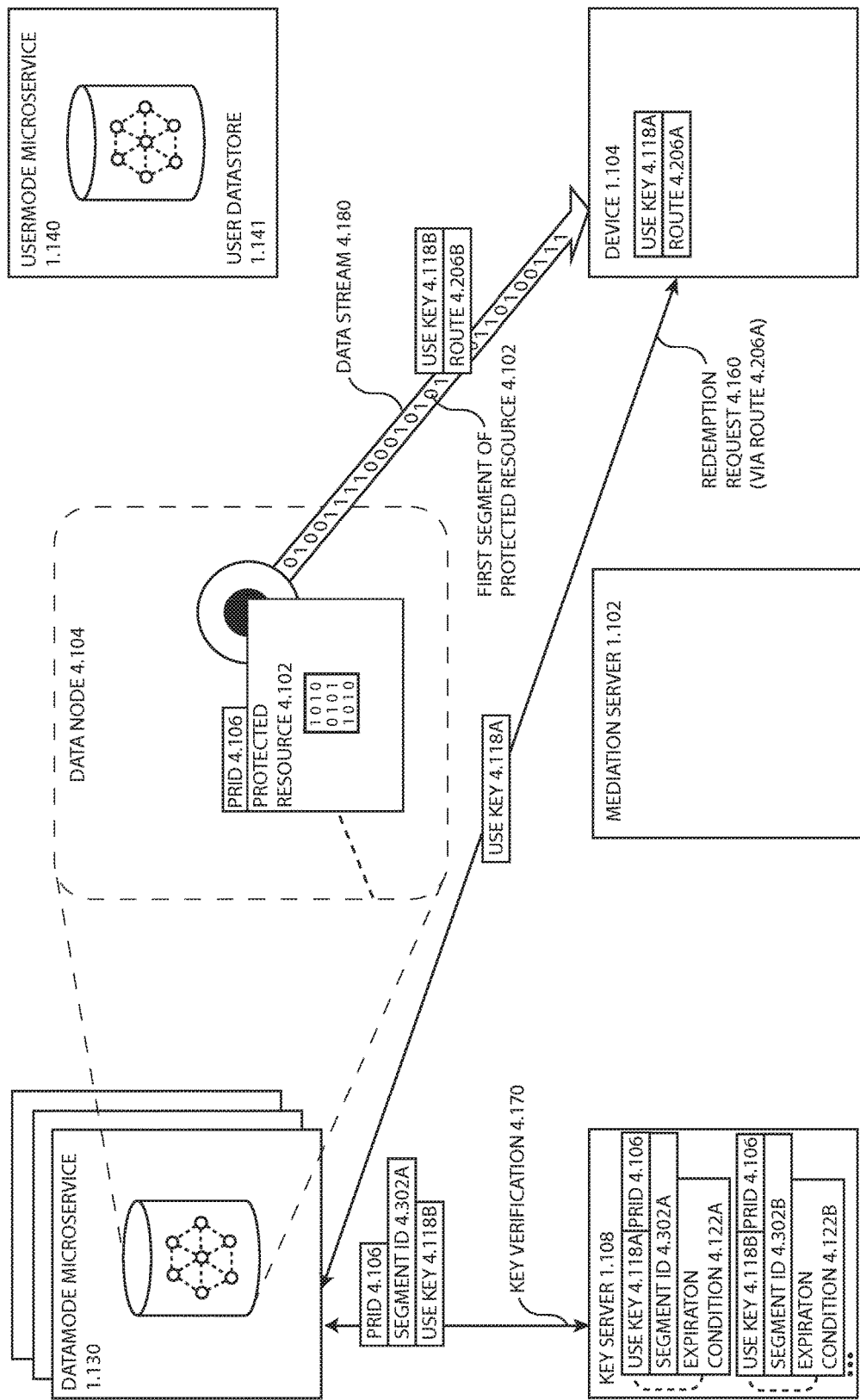
FIG. 4.3
CONTROLLED DATA
DELIVERY PROCESS 4.350

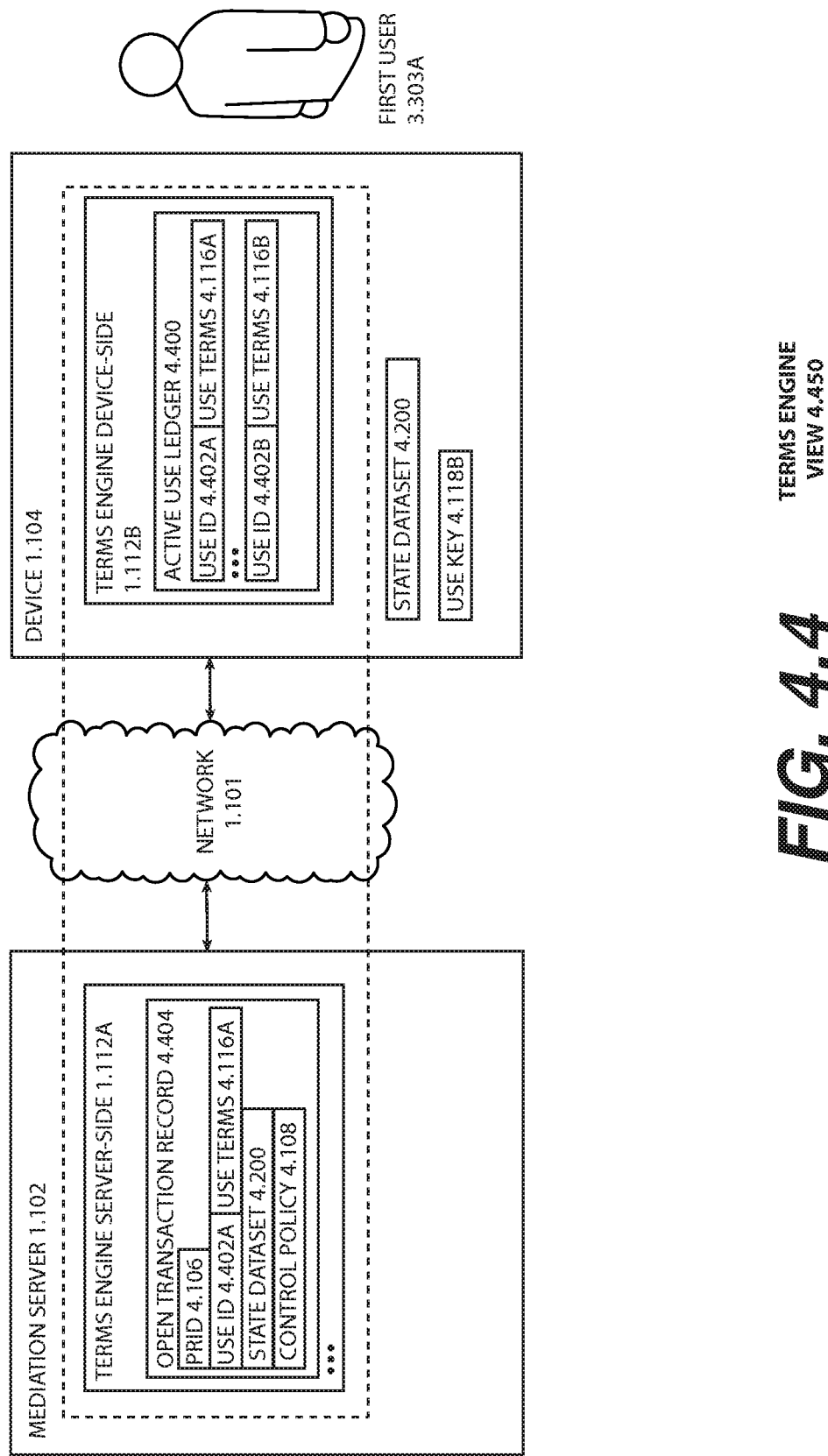
FIG. 4.4
TERMS ENGINE
VIEW 4.450

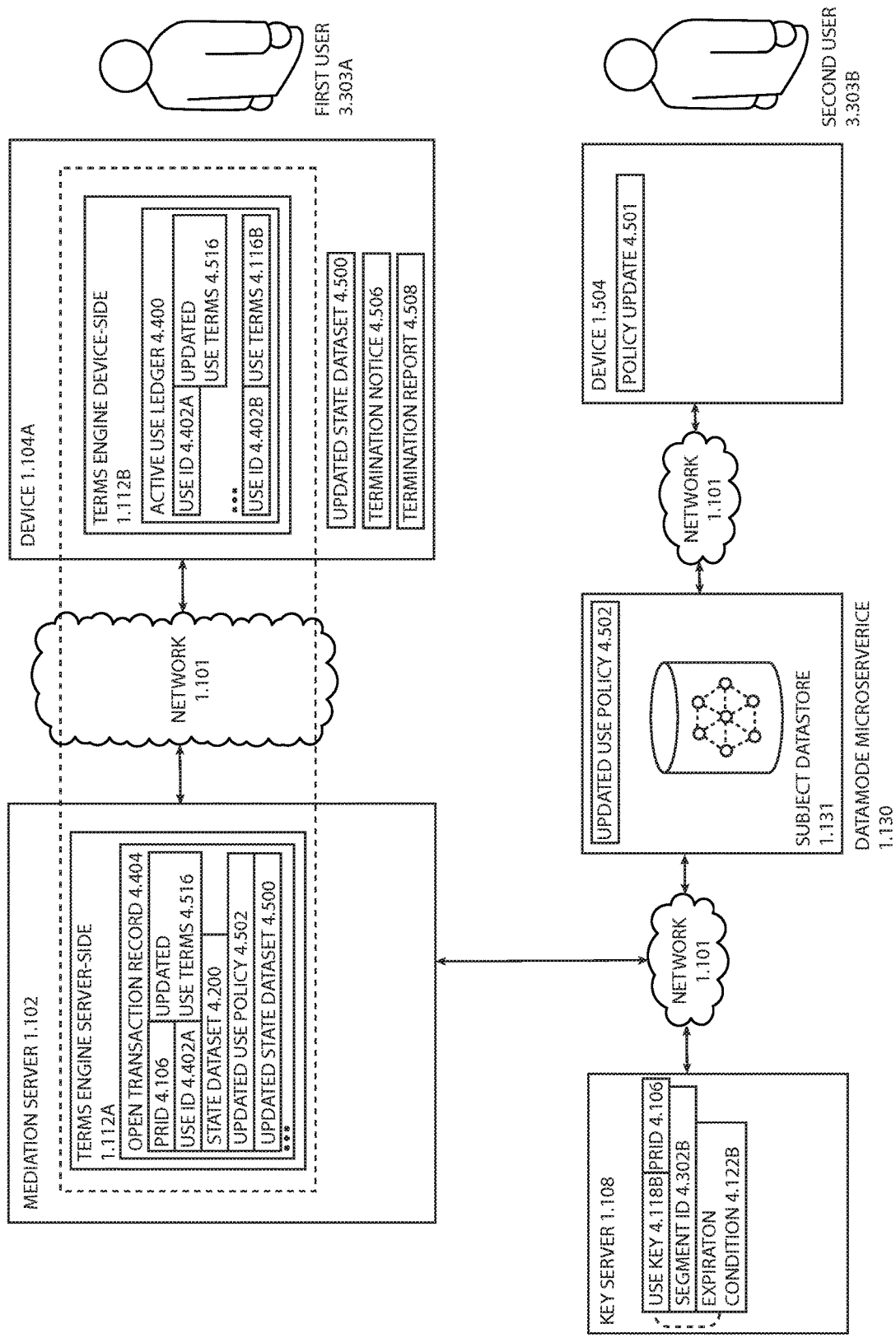

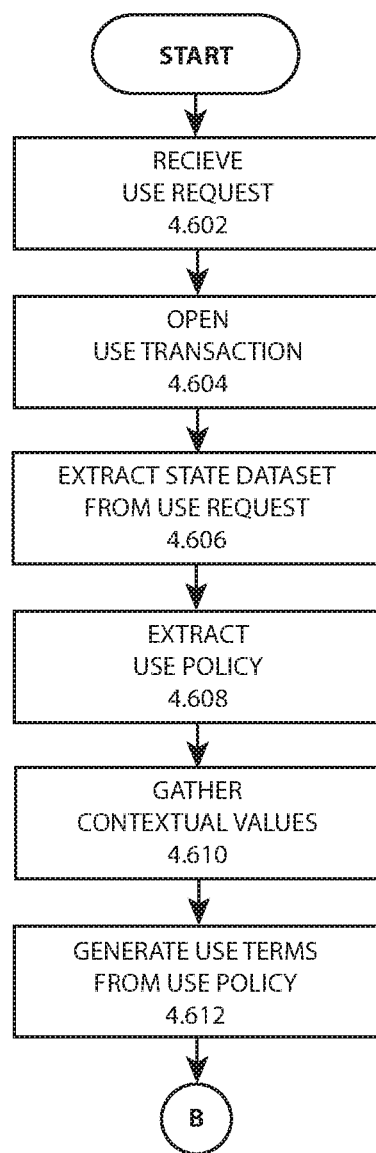
FIG. 4.6  USE KEY GENERATION PROCESS FLOW 4.600

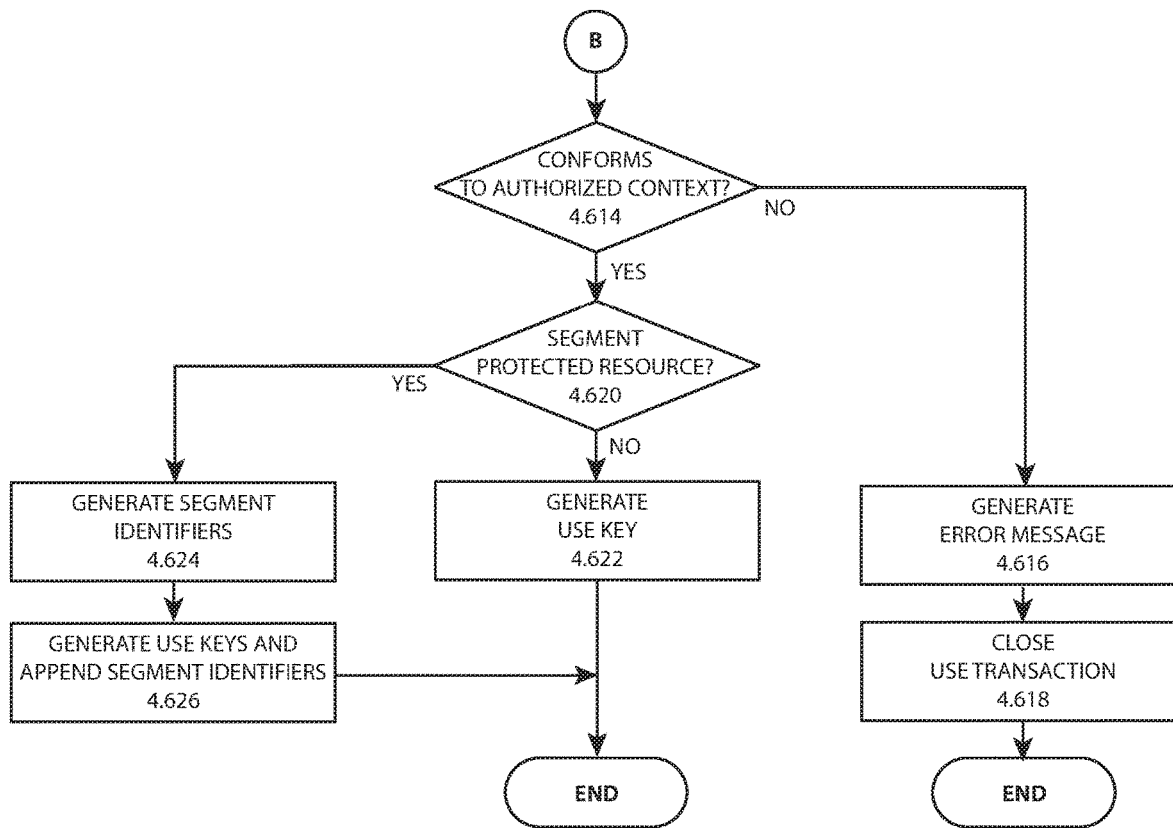
FIG. 4.7  USE KEY GENERATION PROCESS FLOW 4.700

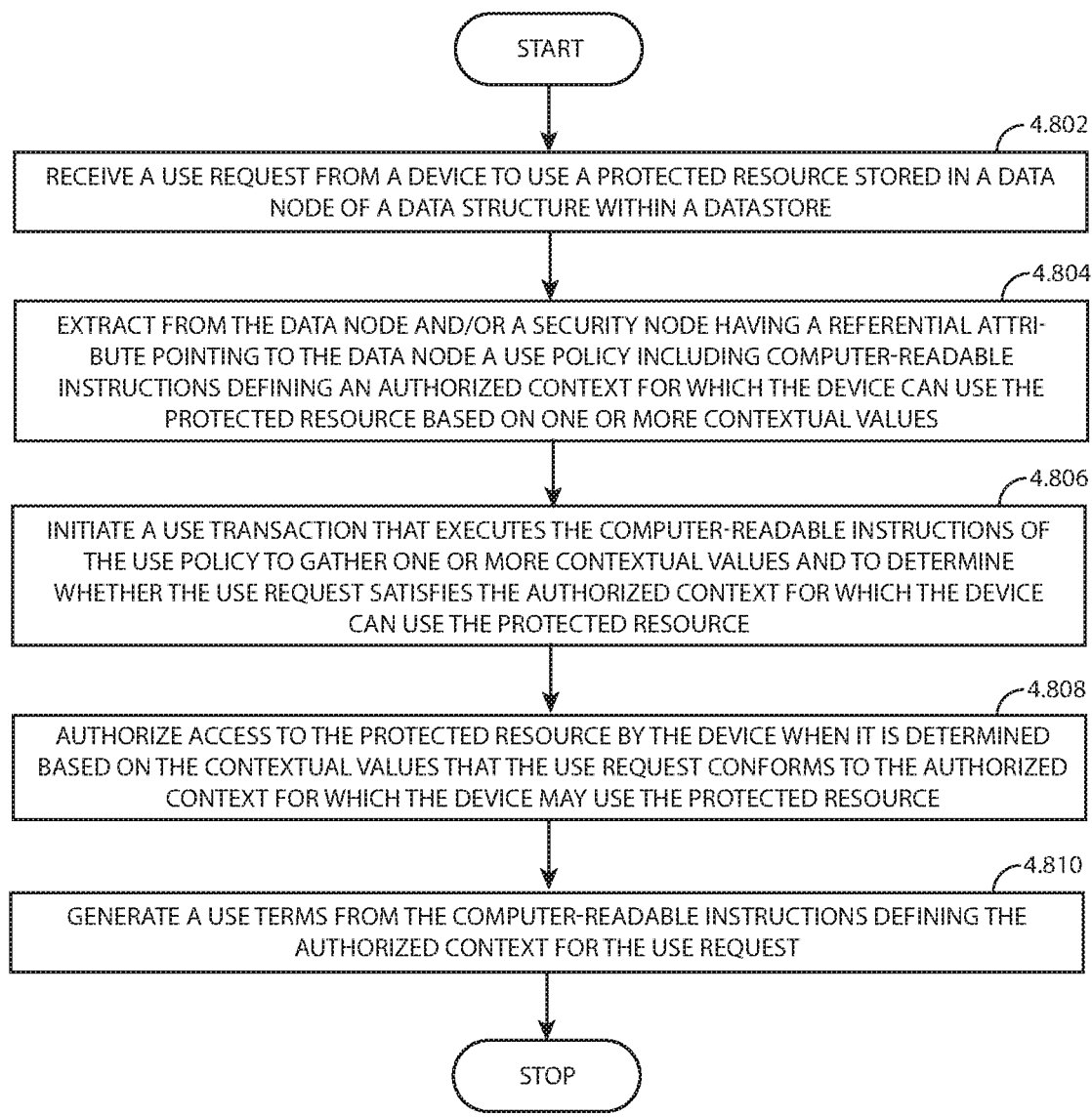
FIG. 4.8 — USE REQUEST EVALUATION PROCESS FLOW 4.800

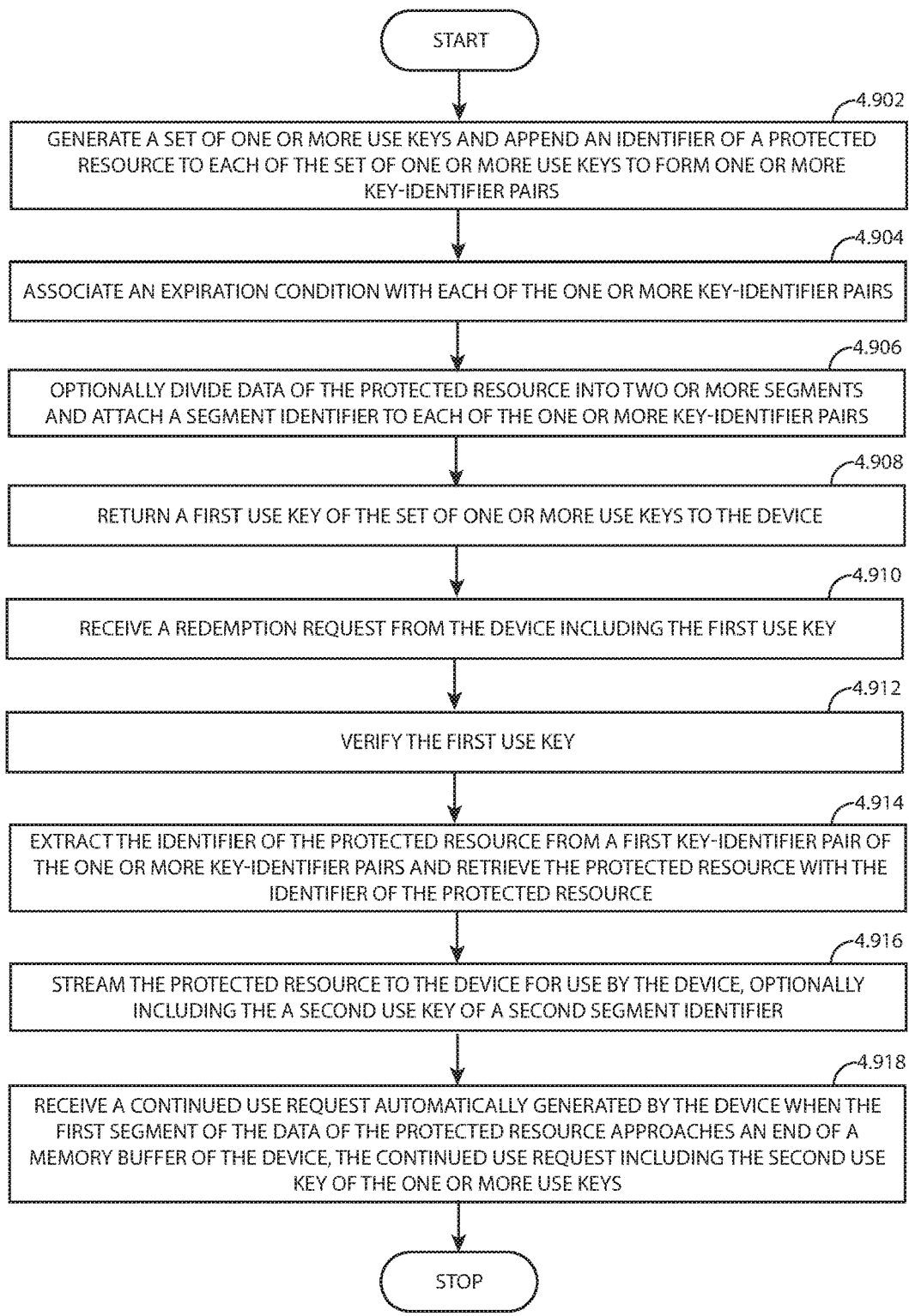
FIG. 4.9  KEY GENERATION AND REDEMPTION PROCESS FLOW 4.900

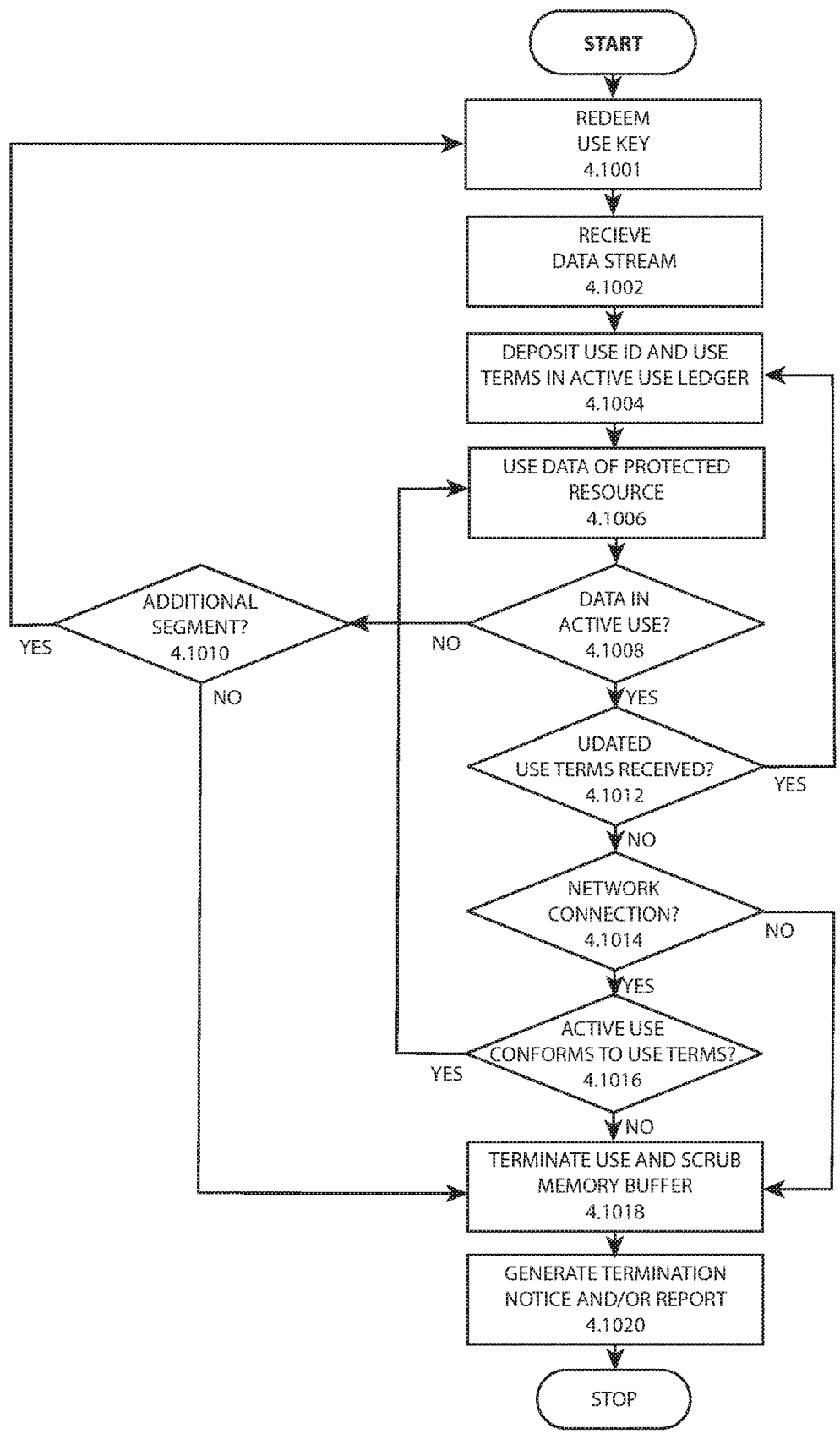
FIG. 4.10  DEVICE DATA USE PROCESS FLOW 4.1000

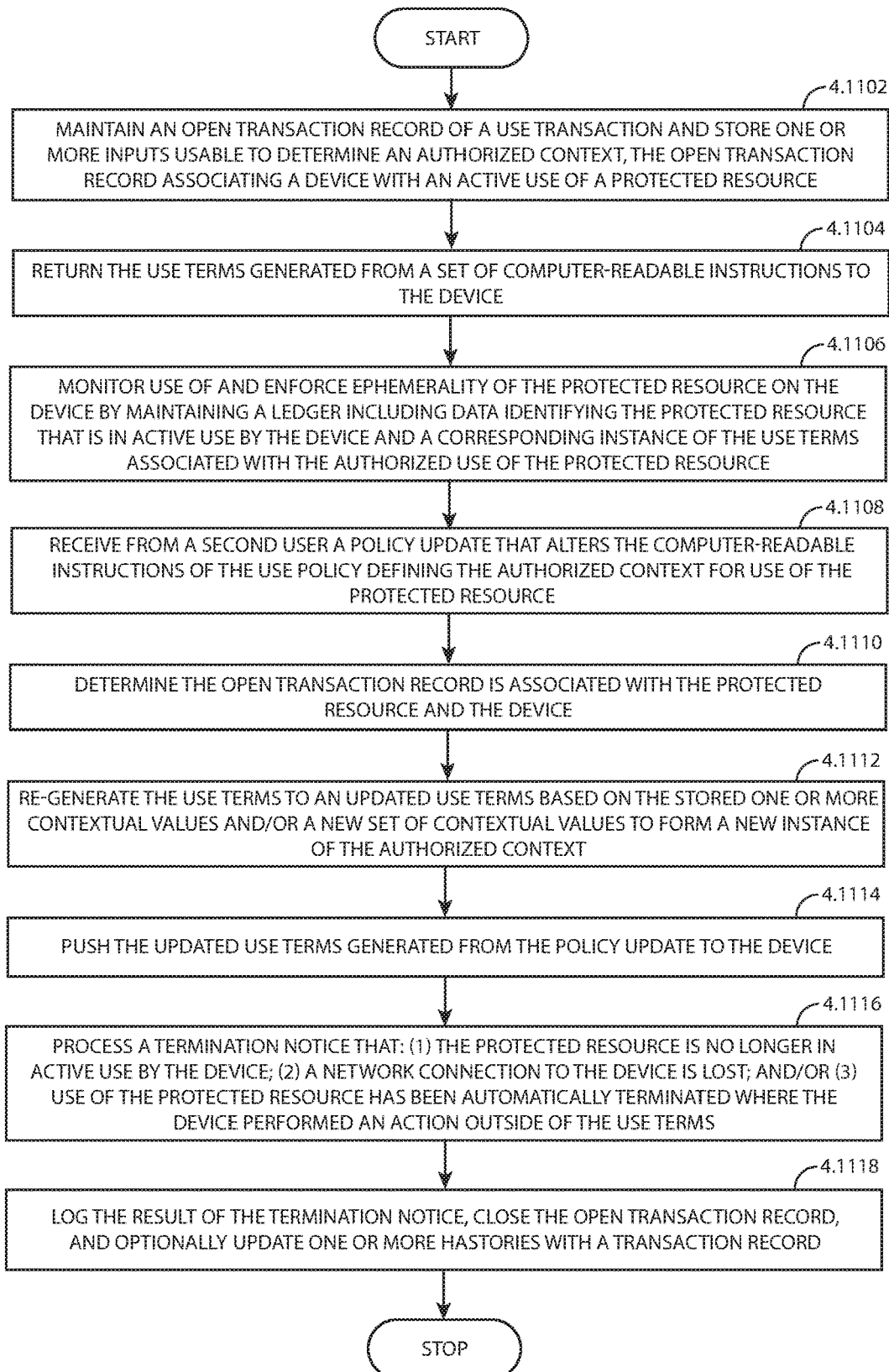
FIG. 4.11   USE TERMINATION PROCESS FLOW 4.1100

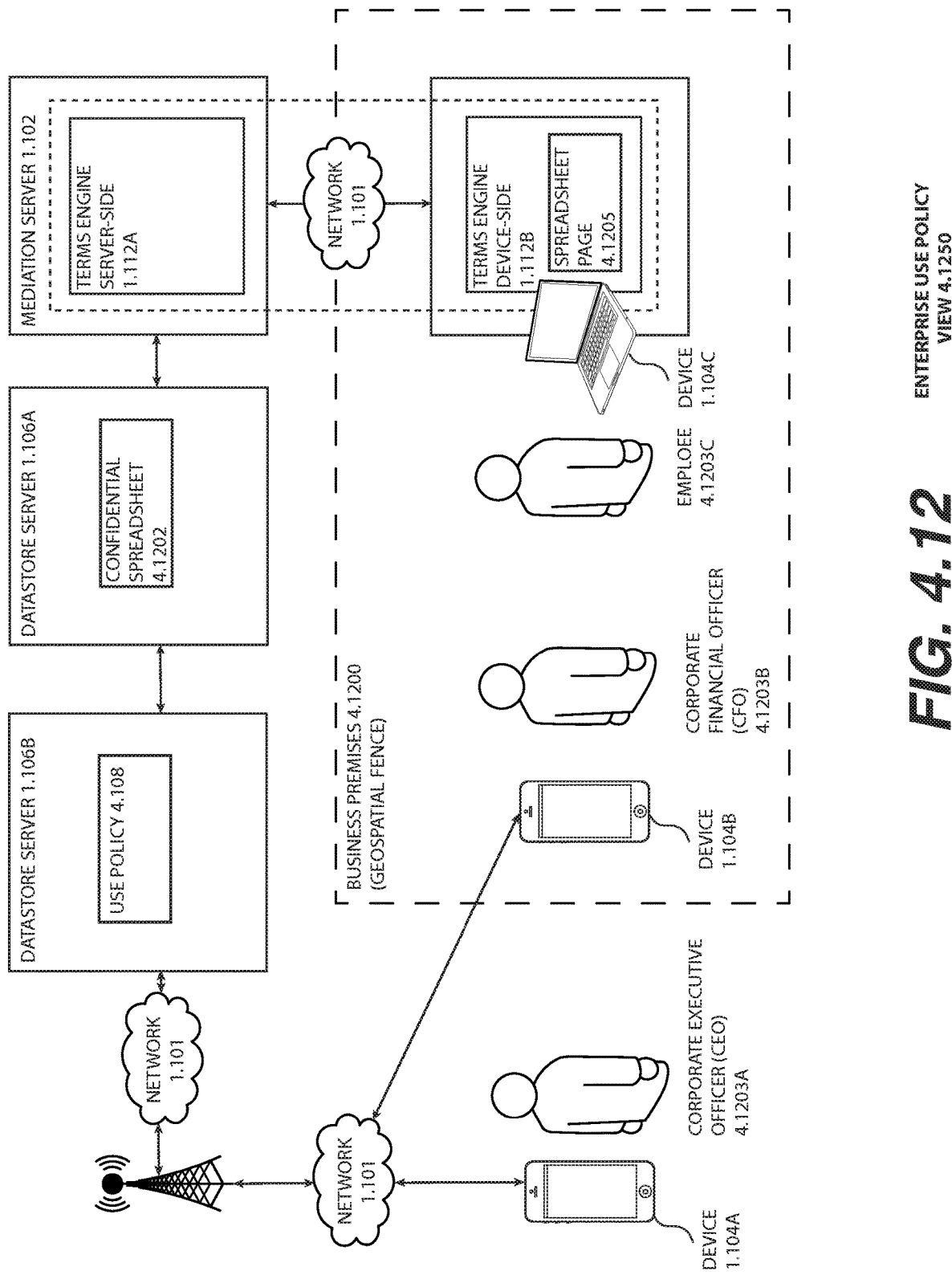

CONTROLLING PERMISSIBLE ACTIONS A COMPUTING DEVICE CAN PERFORM ON A DATA RESOURCE BASED ON A USE POLICY EVALUATING AN AUTHORIZED CONTEXT OF THE DEVICE

CLAIMS OF PRIORITY AND CROSS REFERENCES TO RELATED APPLICATIONS

This patent application is a continuation of and claims priority from, and hereby incorporates by reference: U.S. utility patent application Ser. No. 15/230,424, titled 'AUTHORIZATION OF ACCESS TO A DATA RESOURCE IN ADDITION TO SPECIFIC ACTIONS TO BE PERFORMED ON THE DATA RESOURCE BASED ON AN AUTHORIZED CONTEXT ENFORCED BY A USE POLICY', filed Aug. 7, 2016, which (1) claims priority from, and hereby incorporates by reference U.S. provisional patent application No. 62/203,688, titled 'AUTHORIZATION OF ACCESS TO A DATA RESOURCE IN ADDITION TO SPECIFIC ACTIONS TO BE PERFORMED ON THE DATA RESOURCE BASED ON AN AUTHORIZED CONTEXT ENFORCED BY A USE POLICY', filed Aug. 11, 2015; and (2) is a continuation-in-part, claims priority from, and hereby incorporates by reference: U.S. utility patent application Ser. No. 14/754,514, titled 'SEMANTIC DATA STRUCTURE AND METHOD' filed on Jun. 29, 2015, which claims priority to U.S. Provisional patent application No. 62/019,363, titled 'DATABASE SECURITY AND ACCESS CONTROL THROUGH A SEMANTIC DATA MODEL' filed on Jun. 30, 2014.

FIELD OF TECHNOLOGY

This disclosure relates generally to data processing devices and, more particularly, to a method, a device, and/or a system of permissible actions a computing device can perform on a data resource based on a use policy evaluating an authorized context of the device.

BACKGROUND

A datastore may be a repository for storing, managing, and distributing electronic data, and may store any of the data resources produced and/or utilized by an individual and/or an organization. Data resources may include files, documents, media (such as music and video), records, sensor data, and/or user profiles, or portions thereof. Data of the datastore may be stored in a database (e.g., a database management system, like MongoDB®, Riak®) and/or a file system (such as a hierarchical file system (HFS), network file system (NFS)). The data is stored within the datastore according to one or more data structures that define the physical arrangement of the data in a physical memory of one or more computers (e.g., servers) that are used to implement the datastore.

The datastore may include data resources that are proprietary, confidential, and/or private. For example, such data resources may include financial information, private communications, electronic medical records, or valuable trade secrets. A data resource that is protected by a security system may be referred to as a protected resource. The security system may require a user to be authenticated before the user can access the datastore and/or may require the user to be authorized before the user can utilize one or more of the protected resources of the datastore (e.g., use the protected resource on a device and/or manage a protected resource on a server). Specifically, an authentication process may be used to verify that the user is who they purport to be (e.g., validate the user's identity), while the authorization process may be used by the security system to ensure that the user is privileged to access a protected resource (e.g., download a video file, download a document, view personal information of the user profile). In some security systems, authorization may determine who has "access" to a particular protected resource.

For example, the authorization process may use an access control list (referred to as an ACL) to determine which users have permission to access a file in the file system or an individual field in the database application program. The access control list may also specify a limited set of allowed actions that the user can take on the protected resource (e.g., a read operation, a write operation, an execute operation, a delete operation). In attempting to limit access to the datastore and resolve permissions associated with access requests, the security system may use a significant number of systems external to the datastore. For example, the access control list may be an external system used by the security system. Once the data resource is accessed, a copy of the data resource may be made and distributed to (e.g., downloaded by) a device such as a smart phone, a piece of wearable technology like a smart watch, a desktop computer and/or a different server.

As the datastore increases in size, it may become increasingly difficult when using an external system to determine which data resources are protected by the security system and/or which permissions are associated with a particular protected resource. As a result, there may be oversights in defining security measures within the datastore. There may also be significant computing overhead to manage and utilize the external system. It may therefore be difficult to automatically and/or programmatically update the external system, which may prevent the security system from scaling to meet high demand of users of the datastore.

Complexity and/or overhead in defining and maintaining associations between the external system (such as the access control list) and the protected resources in the data structure of the datastore may prompt the organization to grant permissions in groups. For example, the security system may be used to define a group of users, to which permissions of a set of data resources are associated. As a result, a user of the group may be over-permissioned by having access to data that is unnecessary for the user's purpose, which may increase a security risk to an organization if the user (e.g., an employee) loses his or her identity credentials or takes actions against the interest of the organization. At the same time, the user may face the inconvenience that they are under-permissioned when they need to utilize a protected resource placed in a different group for which the user is not generally permissioned.

Once the copy of the data resource leaves the datastore, the copy may be outside the control of the security system. For example, once the protected resource is copied out of a first file system of a first computer and into a second file system of a second computer, the protected resource may generally be beyond the reach of the access control list of the first computer (in other words, it may no longer be "protected."). Even where a file is encrypted, once the file is decrypted on the second computer the file may generally be outside the control of the first computer and the access control list of the first file system. While some additional security features may be able to be placed on files, the set of bites attached to the file may be able to be stripped off, defeating the security features. As a result, it may be difficult to monitor and/or control use of the data resource on a device: once the device obtains the data resource, the complete data resource may generally be used without restriction (including further copying and/or dissemination). Further, any data about a use of the data resource on the device may be difficult to obtain, precluding complete audit records and limiting analysis and insight.

As a result, the security system may have limited capacity to control and secure the private and confidential data resources stored in the datastore. The authorization process may provide simple access control with a small set of permissions such as read, write, delete and execute permissions. The security system may also use systems that may be external and distinct from the datastore to define permissions over data resources within the datastore, and such a system may be complex and difficult to scale. The security system may only be able to regulate mere access to protected resources. Once a protected resource leaves a domain of the security system (e.g., leave a particular hierarchical file system and access control list), the protected resource may be out of control and out of sight.

SUMMARY

Disclosed are a method, a device, and/or a system of controlling permissible actions a computing device can perform on a data resource based on a use policy evaluating an authorized context of the device. In one embodiment, a computer-implemented method for authorizing and controlling use of a data resource includes receiving a use request from a device to use a protected resource stored in a data node of a non-hierarchical data structure within a datastore. The data node includes an identifier whereby the data node is addressable within the datastore. The method extracts from the data node and/or a security node having a referential attribute pointing to the data node a use policy that includes computer-readable instructions defining an authorized context for which the device can use the protected resource based on one or more contextual values. A use transaction is initiated that executes the computer-readable instructions of the use policy to gather the one or more contextual values and to determine whether the use request satisfies the authorized context for which the device can use the protected resource.

Access to the protected resource by the device is authorized when it is determined that based on the one or more contextual values that the use request conforms to the authorized context for which the device may use the protected resource. A set of one or more use keys is generated and the identifier of the protected resource is appended to each of the set of one or more use keys to form one or more key-identifier pairs. A first use key of the set of one or more use keys is returned to the device. A redemption request is received from the device including the first use key and verifying the first use key. The protected resource is then streamed to the device.

The identifier of the protected resource may be extracted from a first key-identifier pair of the one or more key-identifier pairs and the protected resource may be retrieved with the identifier of the protected resource. An expiration condition may also be associated with each of the one or more key-identifier pairs. A use terms from the computer-readable instructions may define the authorized context for the use request. An open transaction record of the use transaction may be maintained, and the one or more contextual values usable to determine the authorized context stored. The open transaction record may associate the device with an active use of the protected resource.

The use terms generated from the computer-readable instructions may be returned to the device. A process of the device operable to monitor use of and enforce ephemerality of the protected resource may be maintained by a ledger including data identifying the protected resource that is in the active use by the device and a corresponding instance of the use terms associated with the authorized use of the protected resource.

The method may process a termination notice that is (i) the protected resource is no longer in the active use by the device, (ii) a network connection to the device is lost, and/or (iii) use of the protected resource has been automatically terminated where the device performed an action outside of the use terms. A policy update may be received from a second user that may alter the computer-readable instructions of the use policy defining the authorized context for use of the protected resource.

The open transaction record may be determined to be associated with the protected resource and the device and the use terms re-generated to an updated use terms. The re-generation of the updated use terms may be based on the one or more contextual values stored and/or a new set of contextual values to form a new instance of the authorized context. The updated use terms generated from the policy update may then be pushed to the device (e.g., through a network).

The termination notice may include a termination report specifying the action outside the use terms. A result of the termination notice may be logged, and the open transaction record may be closed. Data of the protected resource may be divided into two or more segments and a segment identifier attached to each of the one or more key-identifier pairs. Data of the protected resource transmitted to the device may include a first segment of the two or more segments, and the data of the protected resource transmitted to the device may include a second use key of the one or more use keys. A continued use request may be automatically generated by the device when the first segment of the data of the protected resource approaches an end of a memory buffer of the device. The continued use request may include the second use key of the one or more use keys. The use request may include a state dataset specifying a current state of the device, and at least one of the one or more contextual values may be called from the state dataset specifying the current state of the device. A redemption route and a dynamic protocol designation may be conveyed with one of the set of one or more use keys that may be returned to the device. A first key-identifier pair of the one or more key-identifier pairs may be terminated after streaming the protected resource to the device irrespective of an expiration condition.

In another embodiment, a computer-implemented method for authorizing and controlling use of a data resource includes receiving a use request from a device to use a protected resource stored in a data node of a non-hierarchical data structure within a datastore. The method extracts from the data node and/or a security node having a referential attribute pointing to the data node a use policy that includes computer-readable instructions defining an authorized context for which the device can use the protected resource based on one or more contextual values. A use transaction is initiated that executes the computer-readable instructions of the use policy to gather the one or more contextual values to determine whether the use request satisfies the authorized context for which the device can use the protected resource. Access to the protected resource by the device is authorized when it is determined that each of the one or more contextual values called by the use policy conforms to the authorized context for which the device may use the protected resource. A use terms is generated from the computer-readable instructions defining the authorized context for the use request.

The use terms generated from the computer-readable instructions are returned to the device. The protected resource is then streamed to the device, where the device the protected resource is streamed to includes a process operable to monitor use of and enforce ephemerality of the protected resource by maintaining a ledger that includes data identifying the protected resource that is in an active use by the device and a corresponding instance of the use terms associated with the authorized use of the protected resource.

In yet another embodiment, a system includes one or more datastore servers, a transaction engine, a mediation server, and a network. The one or more datastore servers include computer readable instructions that when executed on one or more processors of the one or more datastore servers store a data node that includes a protected resource, extract from the data node a use policy including computer-readable instructions defining an authorized context for which a device can use the protected resource based on one or more contextual values, and transmit the protected resource to the device for use by the device upon receipt of an identifier of the protected resource.

The transaction engine includes computer readable instructions that when executed initiate a use transaction that executes the computer-readable instructions of the use policy to gather the one or more contextual values to determine whether the use request satisfies the authorized context for which the device can use the protected resource.

The mediation server includes computer readable instructions that when executed on a processor of the mediation server process the one or more contextual values. The mediation server also includes computer readable instructions to authorize access to the protected resource by the device when it is determined that the use request based on the one or more contextual values gathered by the use policy conforms to the authorized context for which the device may use the protected resource, and to generate a use terms from the computer-readable instructions defining the authorized context for the use request. The system may further include the device, a key server, and a profile server.

BRIEF DESCRIPTION OF THE DRAWINGS

The embodiments of this disclosure are illustrated by way of example and not limitation in the figures of the accompanying drawings, in which like references indicate similar elements and in which:

FIG. 1.1 is a data resource control network that carries out transactions between and/or among data resources within a datastore, controls replication of data resources to maintain data uniqueness, controls ownership transfer of the data resources, authenticates a device requesting access to the datastore, authorizes utilization of a particular data resource, and/or controls use of data resources through a use policy and a terms engine, according to one or more embodiments.

FIG. 1.2 is an instantiation of the data resource control network of FIG. 1.1 illustrating a set of servers providing micro services to the data resource control network, including a datamode microservice for storing data resources, a usermode microservice comprising a user datastore for storing user profiles, and an objectmode microservice for storing relationships between and among the data resources, according to one or more embodiments.

FIG. 2.1 is an instance of a data resource, having a controlled identity within the datastore, referred to as a data organism, the data organism comprising an identifier, a hastory that is an immutable record of previous transactions in which the data organism participated forming an evolving identity of the data organism, a contained data that the data organism contains, and a set of computing processes that may be executed by the data resource control network of FIG. 1.1 when the data organism is called and/or addressed, according to one or more embodiments.

FIG. 2.2 is a data organism transaction view illustrating a first data organism transacting with a second data organism, the transaction conducted by a transaction engine of a mediation server and a transaction record deposited in each of the hastories of the first data organism and the second data organism through a record runtime environment, according to one or more embodiments.

FIG. 2.3 is a hastory view illustrating the hastory of FIG. 2.2 including a sequential chain of blocks implemented as a hash chain, each block including a transaction record and a hash value, the hash value generated based upon the transaction record of the block and a penultimate hash value of a previous block, a root hash unique within the datastore for a given data within each of the blocks and a given block order of the sequential chain, according to one or more embodiments.

FIG. 2.4 is a second hastory view illustrating the hastory of FIG. 2.2 implemented as a Merkle tree, a binary tree of a set of leaf nodes extended from the sequential chain of blocks to a root node that includes a root hash that is unique within the datastore, according to one or more embodiments.

FIG. 2.5 is a data organism identity evolution view showing the data organism of FIG. 2.1 copied to form an original data organism and a copied data organism that remains unique within the datastore as each engages in different transactions that are added to each of the hastories to result in different root hashes, according to one or more embodiments.

FIG. 2.6 is a transaction process flow illustrating a process by which two of the data organisms of FIG. 2.2 engage in a transaction to result in one or more evolved identities, according to one or more embodiments.

FIG. 2.7 is a second transaction process flow illustrating a detailed process by which one or more data resources and/or data organisms transact such that data organisms having controlled identities of the transacting data organisms remain unique within the datastore, according to one or more embodiments.

FIG. 2.8 is a controlled copying process flow illustrating a process by which the copying transaction shown in FIG. 2.5 may be controlled within the datastore such that the original data organism and the copied data organism remain unique, according to one or more embodiments.

FIG. 2.9 is a data organism transfer process flow showing a process by which the data organism of FIG. 2.1 may have an ownership transferred between a first user and a second user by changing an ownership designation and depositing a record of the transaction in a block of the hastory, according to one or more embodiments.

FIG. 2.10 is a second data organism transfer process flow illustrating a second process by which the ownership of the data organism may be transferred by copying the data organism, and: flagging an original of the data organism as extinct; depositing an ownership transfer as a termination block of the hastory of the original data organism; and/or, erasing the original data organism from the datastore, according to one or more embodiments.

FIG. 2.11 is a media use transaction view illustrating a video data stored in a media file that is a first data organism, the media file an application resource for a second data organism that is an application profile and the media file accessed by a user associated with a user profile that is a third data organism, according to one or more embodiments.

FIG. 3.1 is an authentication transaction network in which the device of FIG. 1.1 completes a multi-factor login that may establish a secure communication channel over the network and submits an identity claim comprising a device root hash of a device hastory to a server for comparison to a profile root hash of a profile hastory to validate the identity claim, according to one or more embodiments.

FIG. 3.2 is a multi-factor login process flow of the multi-factor login of FIG. 3.1, according to one or more embodiments.

FIG. 3.3 is the multi-factor login process of FIG. 3.2 continued, according to one or more embodiments.

FIG. 3.4 is an authentication process flow illustrating a process by which the device of FIG. 3.1 may be securely authenticated using un-forgeable identity credentials that define a fourth authentication factor based on a transaction history of the device and the user profile associated with the device, according to one or more embodiments.

FIG. 3.5 is an identity evolution process flow that illustrates a process for evolving both the profile hastory and the device hastory in parallel to synchronize their identities for comparison in a subsequent authentication request, according to one or more embodiments.

FIG. 3.6 is a profile hastory and device hastory view illustrating a detailed view of the sequential chain of blocks of the profile hastory with transactions records such as a profile data and several identity claim records associated with transaction such as a login transaction, a data use transaction and a log out transaction, according to one or more embodiments.

FIG. 3.7 is an real-time authentication process flow illustrating a process by which the device of FIG. 3.1 can submit to just-in-time authentication in association with an authorization request to utilize a data resource of the datastore of FIG. 1.1, according to one or more embodiments.

FIG. 3.8 is an application identity evolution process flow showing a process whereby an identity claim may be made by the device and/or the user profile against an application profile of an application program, according to one or more embodiments.

FIG. 3.9 is a profile attack detection process flow showing a process that invalidates forged identify credentials if the identity credentials are copied from the device based on the evolution of the device hastory and the profile hastory, according to one or more embodiments.

FIG. 3.10 is a forged credential detection view showing a failed identity claim by an impersonator who cloned credentials from a device of user, the failed identity claim identifier and optionally responded to by the process of FIG. 3.9, according to one or more embodiments.

FIG. 4.1 is an authorization network showing a set of servers usable to authorize use of a protected resource by a device and control use of the protected resource on the device using a terms engine according to a use policy, according to one or more embodiments.

FIG. 4.2 is a contextual authorization process showing the authorization network of FIG. 4.1 receiving a use request from the device, processing an identity claim, retrieving a use policy that evaluates one or more contextual values, depositing a use key in a key server, and returning a use key to the device, according to one or more embodiments.

FIG. 4.3 is a controlled data delivery process showing the contextual authorization network of FIG. 4.2 receiving a redemption request comprising the use key, verifying the use key in the key server, and streaming data of the protected resource to the device, according to one or more embodiments.

FIG. 4.4 is a terms engine view showing the contextual authorization network of FIG. 4.3 monitoring use of and enforcing ephemerality of data of the protected resource of FIG. 4.1 through a device-side terms engine associated through the network with a server-side terms engine, according to one or more embodiments.

FIG. 4.5 is a real-time revocable authorization process by which data of the protected resource in active use by the device may have use terminated based on an updated use policy generated by a second user in control of the protected resource, a termination notice and/or a termination report generated by the device and transmitted to the mediation server to close the use transaction, according to one or more embodiments.

FIG. 4.6 is a use key generation process flow illustrating a process by which the contextual values of the use policy may be evaluated and the use key of FIG. 4.2 may be generated, according to one or more embodiments.

FIG. 4.7 is a continued process flow of the use key generation process flow of FIG. 4.6, illustrating a process by which the contextual values of the use policy may be evaluated and the use key of FIG. 4.2 may be generated, according to one or more embodiments.

FIG. 4.8 is a use request evaluation process flow showing a process for authorizing use of a protected resource according to a set of computer-readable instructions of a use policy, according to one or more embodiments.

FIG. 4.9 is a key generation and redemption process flow showing, subsequent to evaluation of the contextual values of the use policy of FIG. 4.1, a process by which the use keys may be generated, returned to the device, and redeemed upon a redemption request by the device, according to one or more embodiments.

FIG. 4.10 device active data use process flow showing a process that can be used to monitor use of the protected resource by the device and/or enforce ephemerality of the protected resource on the device in accordance with the use policy and a set of use terms generated based on the use policy, according to one or more embodiments.

FIG. 4.11 is a use termination process flow illustrating a process by which an open transaction record of the active use of the protected resource is closed when the protected resource is determined to no longer be in active use, a network connection to the device was lost, and/or the device performed an action outside of the use terms, according to one or more embodiments.

FIG. 4.12 is an enterprise use policy view illustrating use of the use policy to define an authorized context for limited access and use of a protected resource that is a confidential spreadsheet, the authorized context including flexible controls such as a requirement that an executive of the enterprise be within a geospatial fence of the premises for an employee to view the confidential spreadsheet, according to one or more embodiments.

Other features of the present embodiments will be apparent from the accompanying drawings and from the detailed description that follows.

DETAILED DESCRIPTION

Disclosed are a method, a device, a system and/or a manufacture of controlling permissible actions a computing device can perform on a data resource based on a use policy evaluating an authorized context of the device. Although the present embodiments have been described with reference to specific example embodiments, it will be evident that various modifications and changes may be made to these embodiments without departing from the broader spirit and scope of the various embodiments.

FIG. 1.1 is a data resource control network 1.100 that carries out transactions between and/or among data resources within a datastore 1.114, controls replication of data resources to maintain data uniqueness, controls ownership transfer of the data resources, authenticates a device 1.104A requesting access to the datastore, authorizes utilization of a particular data resource, and/or controls use of data resources through a use policy and a terms engine 1.112, according to one or more embodiments. Specifically, FIG. 1.1 shows a network 1.101, a mediation server 1.102, two devices 1.104A and 1.04B, a set of servers 1.106A through 1.106N (each of which may include a datastore 1.114A through 1.114N and a record runtime environment 1.116A through 1.116N, respectively), a key server 1.108, a transaction engine 1.110, and a terms engine 1.112 having a terms engine server-side 1.112A along with a terms engine device-side 1.112B communicatively coupled through the network 1.101.

The mediation server 1.102 may receive a communication from the device 1.104A over the network 1.101 to utilize a data resource stored in one or more of the datastores 1.114A through 1.114N. Utilization may be, for example, using the data resource on the device 1.104A and/or managing the data resource within one or more of the datastores 1.114 (e.g., copy, delete, update). The device 1.104A and/or the device 1.104B may be a smartphone, a tablet, a desktop computer, or a different server. The device 1.104A and/or the device 1.104B may also be a piece of machinery like a CNC mill or a 3D printer, a vehicle such as an automobile having an onboard computer and networking capability, a piece of networking equipment such as a router, and/or an unmanned autonomous vehicle. The network 1.101 may be a network connecting two or more computers such as a wide area network (WAN) or the internet.

A data resource is a discrete piece of data, or portion thereof, that is usable as a resource for an application program. For example a data resource may include a file, a document, a record, a message, an image, statistical and scientific data, and/or media such as music or video. In a specific example, a data resource may include a user profile that includes a set of attributes and values associated holding information about a particular person. Similarly, a portion of the user profile such as a single attribute-value pair specifying a social security number of the person may also be a data resource. In another example, a data resource may include an audio file (e.g., an MP3 file, an AAC file), and/or a portion of that audio file, for example a 30 second long section streamed to a device for use. Where the data resource is protected by a security system, for example that may require authentication and/or authorization before utilization, the data resource may be referred to as the protected resource. The data resource may also be a cryptographic key of a cryptographic currency, for example a Bitcoin private key.

In addition, where the data resource has a controlled identity within one of the datastores 1.114, the data resource may be containerized into a particular data structure and associated with a hash history, referred to as a hastory 2.104, as shown in FIG. 2.1. The data resource having the hastory 2.104 may also be referred to as a data organism 2.100 due to an evolving identity based on an immutable record of previous transactions in which a particular data organism 2.100 participated. The identity of a data organism 2.100 may evolve based upon transaction records (e.g., the transaction record 2.302 of FIG. 2.2) added to the hastory of the data organism 2.100 by the record runtime environment 1.116 associated with a particular server 1.106 on which the particular data organism 2.100 is stored.

The data resource control network 1.100 may act as a data privatization network. One or more embodiments that comprise the network 1.100, working along or in combination, may be able to track data resources and ensure their uniqueness, authenticate users requesting access to one or more of the datastores 1.114, authorization access and use requests of the data resources in addition to control use of the data resources (in contrast to mere access to data resources without continuing use control). The data resource control network 1.100 may be used by an enterprise such as a corporation, one or more government agencies, or may be used as a platform for application programs to provide services to consumers (e.g., secure messaging and file transfer). The users may be, for example, enterprise executives, employees, healthcare professionals, consumers, attorneys and their clients, a government employee, a datastore administrators, etc. First, the device 1.104A may request a transaction between one or more of the data resources, for example as a normal operation of an application program calling on data resources to populate a user interface of the device 1.104A. The mediation server 1.102 transacts in one or more of the data resources and/or data organisms using the transaction engine 1.110, as shown in conjunction with FIG. 2.1 through FIG. 2.11. A transaction (e.g., the transaction 2.200 of FIG. 2.2) may include, for example, an instance of an interaction between two data resources (e.g., an interaction between a user profile and document when a user associated the user profile views the document, as shown and described in FIG. 2.11). The transaction may also be an interaction such as a controlled copying transaction in which an original data organism and a copy of the data organism are maintained as unique within the datastore (as shown and described in FIG. 2.5). Another example of a transaction includes an ownership transfer in which the original data organism 2.100 may have ownership transferred between a first user and a second user (as shown and described in conjunction with FIG. 2.9 and FIG. 2.10).

The mediation server 1.102 may also coordinate secure login of the device 1.104A to one or more servers, and may orchestrate authentication of the device 1.104A as shown and described in conjunction with FIG. 3.1 through FIG. 3.10. The authentication process may also include real-time authentication in association with the authorization of the device 1.104A to utilize a particular date resource (e.g., in conjunction with a use transaction as shown in FIG. 4.1). The authentication process verifies an identity claim made by the device 1.104A by utilizing the evolving nature of an identity of the user profile that is associated with a user and/or the device 1.104A (such as the user profile 3.106 of FIG. 3). The identity claim may include one or more identity credentials, including a root hash of a device hastory. Verifying the identity claim by comparing the root hash of the device hastory to the root hash of the profile hastory may result in virtually un-forgeable identity credentials, greatly increasing security of the datastore 1.114 and control over the data resources. The authentication process may utilize a second device, the device 1.104B, for example to store the device hastory and/or identity credentials to be communicated in the identify claim over a channel that is distinct from the channel over which use of the data resource was requested.

The mediation server 1.102 may also operate the terms engine 1.112 to control access to, and use of, a data resource (referred to as a protected resource 4.102) by the device 1.104 through a use transaction and a use policy 4.108, as shown and described in conjunction with FIG. 4.1 through 4.12. The use policy 4.108 may evaluate one or more contextual values defined in computer-readable instruction 4.204 to authorize access to and use of the data resource in conjunction with the key server 1.108, as shown in FIG. 4.1 and FIG. 4.9. The terms engine server-side 1.112A may maintain an open transaction record 4.404 of a data resource and/or a data organism 2.100 that is in an active use by the device 1.104A. The device 1.104A may then use the terms engine device-side 1.112B to monitor use of and enforce ephemerality of the data resource on the device 1.104A according to a use terms (e.g., the use terms 4.116 of FIG. 4.1) generated from the use policy 4.108. Upon termination of the use by the device 1.104A, a termination report 4.508 logged by the mediation server 1.102 and the open transaction record may be closed. For example, the use of the protected resource 4.102 may be terminated when: the use falls outside the authorized context, the use of the protected resource 4.102 by the device is no longer active, a network connection is lost (e.g., through the network 1.101), and/or a second user that may own the protected resource revokes authorization with a policy update 4.501, as shown in FIG. 4.5.

The arbiter 1.900 may act as a temporary owner for any of the data resources and/or data organisms 2.100. According to the computing processes defining the transaction (some of which may be specified in a particular data resource and/or data organism 2.100, e.g., as the computing processes 2.110 of FIG. 2.1), ownership of the particular data resource and/or the particular data organism 2.100 may be temporarily given over to the arbiter 1.900. The arbiter 1.900 may re-distribute the data organism 2.100 to one or more users according to the computing processes of the transaction. For example, the arbiter 1.900 may be used to effect an escrow, a wager, and/or another type of complex agreement and/or transaction in which events programmatically alter a state of the data resource and/or data organism, including the value of an attribute specifying an ownership designation 2.106. The arbiter 1.900 may connect to one or more external services, not shown in the embodiment of FIG. 1.1, to retrieve inputs to determine an outcome in accordance with the use policy 4.108.

Each of the servers of FIG. 1.1 (e.g., the servers 1.106A through 1.106N, the mediation server 1.102, the key server 1.108) are computers that include computer processors, computer memories, and may additionally use storage such as a hard disk, a solid-state drive and/or other physical storage/memory mechanisms such as memristors. One or more of the servers may be implemented on shared physical hardware or each may run on a dedicated piece of physical hardware. Each of the individual datastores 1.114A through 1.114N may collectively act as a single datastore (e.g., referred to as the datastore 1.114). For example, the datastore 1.114A may store data resources and/or data organisms 2.100 related to users, datastore 1.114B may store data resources and/or data organisms 2.100 related to files (e.g., a document, an electronic record), and datastore 1.114N may store data resources and/or data organisms related to messages (e.g., an electronic message). Each of the networks 1.101 shown in the embodiment of FIG. 1.1 may be similar or distinct. For example, the instance of the network 1.101 connecting the mediation server 1.102 to the device 1.104 may be the internet whereas an instance of the network 1.101 connecting each of the servers 1.106 to the mediation server 1.102 may be a local area network (LAN) and/or a wide area network (WAN).

The data resource stored in the datastore 1.114 may be a grouped collection of attributes and values within a data structure (which may be commonly referred to as a data object). The grouped attributes and values may comprise an identifier 2.102 whereby the data resource may be addressed in the datastore (e.g., a file name, a unique identifier, a global unique identifier) and a contained data (e.g., similar to the contained data 2.108 of FIG. 2.1) that the particular data resource contains. The contained data of the data resource, for example, may be one or more attributes containing data such as a binary large object (BLOB) of a primitive data such as a document, a music file (e.g., an MP3, an AAC file) and/or a video file. Other attributes may be referential attributes pointing to other data resources to specify relationships (e.g., containing relationships, directed acyclic relationships, and/or contextual relationships). Where the data resource includes protections such as an authorization process before it can be accessed and/or used, the data resource may be referred to as a protected resource. The data resource, the protected resource and/or the data organism 2.100 are further described in conjunction with FIG. 2.1.

The datastore 1.114 and/or each of the datastores 1.114A through 1.114N that comprise the datastore 1.114 may be implemented on a commercial database application supporting a collection of grouped attribute-value pairs forming the data resources and/or the data organisms 2.100 (e.g., a "NoSQL" database supporting a document store, such as MongoDB®). Additionally, a data structure supporting collections of attributes and values of the data resource may be built on top of the commercial database application. For example, a model supporting data resources may be built on top of a key value store such as Aerospike®, and/or a columner store such as Cassandra®. In one preferred embodiment, the relationships between the data resources and/or the data organisms are stored according to a non-hierarchical data structure that may be disclosed in co-pending patent applications by a similar inventive entity and/or common assignee as the present disclosure. In such case, the data resources and/or data organisms 2.100 may be stored as nodes in the non-hierarchical data structure, resulting in, for example, a graph data structure and/or a directed acyclic graph with one or more of the data resources including referential attributes pointing to other data resources.

Demonstrating an example of specialization of each of the datastores 1.114A through 1.114N that together comprise the datastore 1.114, FIG. 1.2 is an instantiation of the data resource control network of FIG. 1.1 illustrating a set of servers providing micro services to the data resource control network 1.200, including a datamode microservice 1.130 for storing data resources, a usermode microservice 1.140 comprising a user datastore 1.141 for storing user profiles, and an objectmode microservice 1.120 for storing relationships between and among the data resources, according to one or more embodiments. In accordance with co-pending patent applications by a similar inventive entity and/or a common assignee of the present disclosure, a subject datastore 1.131 of the datamode microserver 1.130 may store data resources and/or data organisms 2.100 that include a primitive data such as an image, document, music and/or video. A user datastore 1.141 may store data resources and/or data organisms 2.100 that are user profiles 4.404 associated a user of one or more of the datastores 1.114 of the data resource control network 1.200. An object datastore 1.121 of the objectmode microserver may contain data resources and/or data organisms 2.100 representing relationships between other data resources and/or data organisms 2.100 (for example, between a video file and its an image representation as stored in the subject datastore 1.131). In addition, the object datastore 1.121 may store control relationships such as the security node 4.110 of FIG. 4.1.

FIG. 2.1 is an instance of a data resource, having a controlled identity within the datastore, referred to as a data organism 2.100, according to one or more embodiments. The data organism 2.100 may include an identifier 2.102, a hastory 2.104 that is an immutable record of previous transactions in which the data organism participated forming an evolving identity of the data organism 2.100, a contained data 2.108 that the data organism contains, and a set of computing processes that may be executed by the data resource control network 2.100 of FIG. 1.1 when the data organism 2.100 is called and/or addressed, according to one or more embodiments. The identifier 2.102 provides a means to address the data organism 2.100 within the datastore 1.114, and is preferably a unique identifier (UID) and/or a globally unique identifier (GUID) generated through a random or pseudo-random number generator. This method of generation may ensure that there is a very low probability of two data resources having the same unique identifier within the datastore and/or across all datastores 1.114 on the network 1.101.

The hastory 2.104 is a hash history of the data organism 2.100. A sequential chain of blocks 2.300 forms an immutable record of transactions in which the data organism 2.100 participated. Each block 2.304 of the sequential chain of blocks 2.300 comprise a transaction record 2.302 of a transaction 2.200 in which the data organism 2.100 previously participated ('T1' may stand for a first transaction, 'T2' for a second transaction, etc.). In addition, each of the blocks 2.304 includes a unique hash value (e.g., the hash value 2.306 of FIG. 2.3) calculated with a hash function. The hash function may depend on both data of each of the blocks in addition to an order of each of the blocks such that any alternation of the data of any of the blocks or the block order in the sequential chain yields a different root hash of the hastory 2.104. Thus, the set of transition stored in the sequential chain may be immutable. The most recent hash value 2.306 in the sequential chain of blocks 2.300 may be referred to as a root hash value 2.306, and may be used as an identity of the particular data organism 2.100 and/or to generate identity claims. The hastory is further described in conjunction with FIG. 2.2 through 2.4.

The data organism 2.100 may include the ownership designation 2.106 attribute that may have as an associated value a name (e.g. of a user, an organization, a computer application) and/or a reference to a different data resource such as a user profile representing the user, the organization, and/or the application program. In other cases, the ownership of the data organism 2.100 may be implicit through reference from the user profile.

The contained data 2.108 may contain one or more attributes and associated values of data that the data organism 2.100 is meant to hold, contain and/or represent. For example, where the data organism 2.100 is a media file, the contained data 2.108 may contain a video data, images representing the video data, and/or metadata related to the video data. The data organism 2.100 may also contain computing processes 2.110 that may be executed (e.g., by the mediation server 1.102) when the data organism 2.100 is called and/or addressed, for example by a different data organism 2.100. The computing processes 2.110 may be used in part or in full to determine who the data organism 2.100 transacts. The computing processes 2.110 may contain the computer-readable instructions 4.204 that may also specify a use policy 4.108 that defines an authorized context for which access to and/or use of the data organism 2.100 is authorized by the device 1.104A and/or a user of the device 1.104A. The use policy 4.108 evaluates one or more contextual values to determine whether a use request satisfies the authorized context. For example, the contextual values may include which user is making the authorization request, a date and a time of the authorization request, a geospatial location of the device, a value called from another data organism 2.100, and/or a value called from an API. Similarly, the computing processes 2.110 may include instructions executable by the arbiter 1.900 of FIG. 1.1. The computing processes 2.110 may be written in a Turing-complete scripting language that supports a read operation, a write operation (e.g., to data of the data organism 2.100 and/or a different data organism 2.100), a go-to operation, and a conditional branching operation.

FIG. 2.2 is a data organism transaction view 2.250 illustrating a first data organism 2.100A transacting with a second data organism 2.100B, the transaction conducted by a transaction engine 1.112 of a mediation server 1.102 and a transaction record 2.302 deposited in each of the hastories 2.104A and 2.104B of the first data organism 2.100A and the second data organism 2.100B through a record runtime environment 1.116A and 1.116B, according to one or more embodiments. In FIG. 2.2, the transaction 2.200 may be initiated when data organism 2.100A receives a communication addressed from data organism 2.100B. For example, the data organism 2.100B may be a user profile (e.g., the user profile 3.114) requesting access to an electronic record in the contained data 2.108A of the data organism 2.100A. In another example, the data organism 2.100B may contain within the contained data 2.108 software code of an application program and an application profile associated with the application program may address the data organism 2.100A to instruct data organism 2.100A to automatically update the software code. Each server 1.106 may pass any required data to effect the transaction 2.200 to the transaction engine 1.112 of the mediation server 1.102. The transaction engine 1.112 may be a set of machine-readable instructions that carries out the transaction 2.200 according procedures, including machine-readable instructions defined in the contained data 2.108 and/or the computing processes 2.212 of one or more data organisms 2.100. Examples of the transaction 2.200 include a controlled copying of a data organism 2.100, an ownership transfer the data organism 2.100, and/or a use transaction of the data organism 2.100. In each such example, a user profile that owns the data organism 2.100 may address the data organism 2.100 to initiation the controlled copying or ownership transfer transaction.

Upon completion of the transaction 2.200, a transaction record 2.200 is generated by the transaction engine 1.112. The transaction record 2.302 may include data as to the nature of the transaction 2.200, an outcome of the transaction 2.200, which data organisms 2.100 and/or data resources interacted, a date and/or time of the transaction 2.200, a monetary value associated with the transaction 2.200, details about use of the data organism 2.100, and any additional data relevant for recordation and/or accounting purposes. The transaction record 2.302 is transmitted from the mediation server 1.102 to each server 1.116 that includes data organisms 2.100 participating in the transaction 2.200, and specifically the transaction record 2.302 may be submitted to a record runtime environment 1.116. In the embodiment of FIG. 2.2, the transaction record 2.302 is transmitted to record runtime environment 1.116A to be deposited as 'T5' via record deposition 2.204A in the hastory 2.104A of data organism 2.100A. Similarly, the transaction record 2.302 is transmitted to the record runtime environment 1.116B to be added as 'T3' of the hastory 2.104B. Following each of the record depositions 2.204, each of the hastories 2.104 may re-calculate the root hash 2.310 of each of their respective sequential chains 2.300, as shown and described in conjunction with FIG. 2.6. Although not shown in the embodiment of FIG. 2.2, both the data organism 2.100A and the data organism 2.100B may be resident on the same server 1.106A. Additionally, a transaction 2.200 may occur between one data organism 2.100 (e.g., a data resource having a controlled identity within the datastore 1.114) and one or more data resource that do not have controlled identities.

FIG. 2.3 is a hastory view 2.350 illustrating the hastory 2.104 of FIG. 2.1 including a sequential chain of blocks 2.300 implemented as a hash chain, each block 2.304 including a transaction record 2.302 and a hash value 2.306, the hash value 2.306 generated based on the transaction record 2.302 and a penultimate hash value 2.308 of a previous block 2.304, a root hash 3.210 unique within the datastore 1.114 for a given data within each of the blocks 2.304 and a given block order of the sequential chain 2.300, according to one or more embodiments. In FIG. 2.3, the hastory 2.104 is shown as a set of five blocks, the block 2.304A through 2.304D, although the hastory 2.104 may grow to an arbitrary number of blocks 2.304 in length. A first block 2.304 of the sequential chain 2.300, shown as a genesis block 2.303A, may be a block initiating the hastory 2.104 and the controlled identity of the data organism 2.100. For example, where the data organism 2.100 is a user profile 3.114, the genesis block 2.303A may contain a transaction record 2.302A that includes data related to or associated with a user that the user profile represents, such as an email address, an IP address, associated device IDs, a social security number, a physical mailing address, an age, and/or other information of the user. Where the data organism 2.100 is a media file, the genesis block 2.303A may be data related to when the data organism 2.100 was created and a hash value of the initial contained data 2.108 of the data organism 2.100. The genesis block 2.302A is hashed according to a hash function (e.g., the SHA256 algorithm) denoted 'f( ),' using as an input the transaction record 2.302A to yield the hash value 2.306A. The hash function may be a cryptographic function and/or algorithm that converts a set of data to a string of other data such as alphanumeric characters. Additionally, the hash function may be a function that can be used to map digital data of arbitrary size to digital data of fixed size, where a small change in the input digital data yields a large difference in the output digital data of fixed size. The hash chain may be usable in successive application of a cryptographic hash function to a piece of data, can be applied successively to additional pieces of data in order to record a chronology of an existence of all of the data.

After undergoing a second transaction 2.200, the transaction record 2.302 may be generated and deposited in the block 2.204B. For example, the transaction record 2.302B may be a login transaction where the data organism 2.100 is the user profile, or may be a use transaction where the data organism 2.100 is the media file. In calculating the hash value 2.406B of block 2.304B, the hash function uses inputs that include the data of the transaction record 2402B in addition to the previous hash value 2.306A. This process continues as each block 2.406 is added to the sequential chain 2.300 such that a new root hash 2.310 is generated using the most recent transaction record 2.302 (e.g., of a present transaction) along with a penultimate hash 3.208 associated with a transaction that immediately proceeded the present transaction. After repeating this process for five transactions 2.200, the sequential chain of blocks 2.300 may include four previous transactions 2.301, and one most recent block, the block 2.304E. In the embodiment of FIG. 2.3, the last hash value 2.306E of the sequential chain of blocks 2.300 is the root hash 2.310, which may be used to uniquely distinguish the data organism 2.100 from any other data organisms 2.100 in the datastore 1.114. The root hash 2.310 is unique for a given data of each of the transaction records 2.302 and for a given order of the blocks 2.304 of the sequential chain of blocks 2.300. Although not shown in the embodiment of FIG. 2.3, the hash function may additionally use as inputs additional data such as a nonce.

FIG. 2.4 is a second hastory view 2.450 illustrating the hastory 2.104 of FIG. 2.1 implemented as a Merkle tree, a binary tree of a set of leaf nodes extended from the sequential chain of blocks 2.300 to a root node that includes a root hash 2.310 that is unique within the datastore 1.114, according to one or more embodiments. The Merkle tree implementation of the hastory 2.104 may be useful to reduce computing overhead in re-computing the root hash 2.310 and/or where the hastory 2.104 may include a large number of blocks 2.304. In FIG. 2.4, the data of each pair of the blocks 2.302 in the sequential chain of blocks 2.300 starting with the genesis block 2.303A are used as inputs to a hash function to generate a leaf hash 2.400 that is a "leaf node" of the Merkle tree. For example, in FIG. 2.4 the genesis block 2.303A and the block 2.304B are both hashed to yield a leaf hash 2.400A. In turn, each pair of leaf hashes 2.400 are input into the hash function to yield the leaf hash 2501. Any unpaired blocks 2.304 are replicated to form a pair of duplicate blocks 2.304. For example, where block 2.304E is an unpaired block 2.304, the data of the block 2.304E is replicated to form a block 2.304F (denoted 'T5' and which may be referred to as "T5 prime"). The leaf hash 2.400C is then computing using as inputs block 2.304E (T5) and the block 2.304F (T5'). Later, when an even-numbered transaction (e.g., T6) is added to the sequential chain of blocks 2.300, T5' is replaced with T6 and all leaf hashs dependent on the block 2.304F are re-calculated (e.g., leaf hash 2.400C, the leaf hash 2.401B, the root hash 2.310). In the case of the Merkle tree, the penultimate hash 2.408 may be the a hash value 2.500 of a leaf node that is dependent on the transaction immediately previous to a present transaction. For example, in the embodiment of FIG. 2.4, the penultimate hash 2.408 may be the hash value 2.500C that uses as an input T5 of FIG. 2.4. The hash function calculating the root hash 2.310 uses the penultimate hash as an input through the incorporation of the penultimate hash in a higher leaf node (e.g., the lead node (1-1) of FIG. 2.4.

FIG. 2.5 is a data organism identity evolution view 2.550 showing the data organism 2.100 of FIG. 2.1 copied to form an original data organism 2.300A and a copied data organism 2.300X that remain uniques within the datastore as each engages in different transactions 2.200 that are added to each of the hastories 2.104A and 2.104X to result in different root hashes 2.310, according to one or more embodiments. In FIG. 2.5, the record runtime environment 1.116 via record deposition 2.204 deposits the transaction record 2.302 (T4) as a new block 2.304 in the data organism 2.100A. In the embodiment of FIG. 2.5, the transaction 2.200 T4 is a controlled copying transaction as shown and described in conjunction with FIG. 2.8. The result of the controlled copying transaction is: a new block 2.304 added to the hastory 2.104A (T5) and a new block 2.304 added to the hastory 2.104X (T5'). The data of T5 and T5' is slightly different, e.g., T5 may include an "original" designation within the transaction record 2.302 and T5' may include a "copied" designation. As a result, the hastory 2.100A has been "forked" into the hastory 2.104A of the original data organism 2.100A and the hastory 2.104X of the copied data organism 2.100X. Alternatively, although not shown in FIG. 2.5, the copied data organism 2.100X may begin with a new hastory 2.104X having a single genesis block 2.303A. The original data organism 2.100A and the copied data organism 2.100X will undergo different transactions 2.200, diverging their identities. Following the controlled copying, the root hash 2.306A of the original data organism 2.100A and the root hash 2.306X of the copied data organism 2.100X will not have the same values due to the cryptographic properties of the hash function. Thus, both the original data organism 2.100A and the copied data organism 2.100X remain unique within the datastore 1.114, and computing processes may be defined (including the computing processes of the transaction engine 1.110) that pertain to and/or specify either individually.

FIG. 2.6 is a transaction process flow 2.600 illustrating a process by which two of the data organisms of FIG. 2.2 engage in a transaction to result in one or more evolved identities, according to one or more embodiments. Operation 2.602 receives a communication from a first data organism 2.100 addressed to a second data organism 2.100, each of the data organisms 2.100 participants in a present transaction 2.200 comprising one or more computing processes. The computing processes may include, for example, the computing processes 2.110 contained in either or both of the first data organism 2.100 and the second data organism 2.100. The communication may be a message such as a use request (e.g., the use request 4.130 of FIG. 4.1) from the first data organism 2.100 (e.g., a user profile 3.114) to the second data organism 2.100 (e.g., containing a document). Operation 2.604 determines that the first data organism 2.100 and/or the second data organism 2.100 has a controlled identity within the datastore 1.114, a particular data organism 2.100 of the first data organism 2.100 and/or the second data organism 2.100 including a hastory 2.104 forming a unique identity based upon a set of previous transactions (e.g., a set of the transactions 2.200) of the particular data organism 2.100. For example, the transaction engine 1.110 and/or the server 1.106A may determine that a data resource has a controlled identity (e.g., that it an instance of the data organism 2.100) by the presence of a hastory attribute of the data organism 2.100 and/or a different attribute indicating that the data resource is to be a controlled identity within the datastore 1.114. Operation 2.606 executes the one or more computing processes utilizing the contained data 2.108 of the first data organism 2.100 and/or the second data organism 2.100. For example, the transaction 2.100 may involve the use of a video file of the contained data of the second data organism 2.100. In another example, the data organism 2.100 may contain within the contained data 2.108 an SQL query executed against a relational database application when the data organism 2.100 is called. Operation 2.608 determines that the present transaction 2.200 is complete when the one or more computing processes terminate. For example, as shown in conjunction with FIG. 4.5, a use transaction may terminate when a protected resource is no longer in active use by the device 1.104. In operation 2.610, a transaction record 2.302 of the present transaction 2.200 is generated. Generating the transaction record 2.302 may also occur along with the process of closing an open transaction record (e.g., the open transaction record 4.404 of FIG. 4.404). Operation 2.612 deposits the transaction record 2.302 of the present transaction 2.200 as a new block 2.304 in a sequential chain 2.300 of the hastory 2.104 of the first data organism 2.100 and/or the second data organism 2.100 having the controlled identity. Operation 2.614 re-calculates the root hash 2.310 of the hastory 2.104 with the hash function using inputs comprising the new block 2.304 of the hastory 2.104, to evolve the controlled identity of at the first data organism 2.100 and/or the second data organism 2.100, as further shown and described in conjunction with FIG. 2.3 and/or FIG. 2.4.

FIG. 2.7 is a second transaction process flow 2.700 illustrating a detailed process by which one or more data resources and/or data organisms 2.100 transact such that data organisms 2.100 having controlled identities participating in the transaction 2.200 remain unique within the datastore 1.114, according to one or more embodiments. Operation 2.702 transmits a communication (e.g., sends an addressed) from a first set of one or more data resources. The one or more data resources may include one or more data organisms 2.100. For example, the communication may be a 1:N communication in which a data organism 2.100A that is a user profile 3.114 sends a message to a number of other data organisms 2.100B through 2.100N that are also user profiles 3.114. Similarly, the communication may be N:1 or N:N, with 'N' representing an arbitrary number of transacting data resources and/or data organisms 2.100. Similarly, a data organism 2.100 may address itself, for example when a user associated with a user profile 3.114 updates data of the user profile 3.114. Operation 2.704 receives the communication at a second set of one or more data organism 2.100. Operation 2.706 extracts computing processes used in the transaction 2.200. For example, the computing processes may specify a series of operations to perform as part of the transaction 2.200 when the data organism 2.100 is called and/or addressed. In another example, the computing processes may define a use policy 4.108 comprising computer-readable instructions calling one or more contextual values to define an authorized context for which utilization of a protected resource is authorized. The computing processes may be extracted from a server (e.g., the mediation server 1.102, the usermode microservice 1.140), and/or from the contained data 2.108 of the data resource and/or the data organism 2.100 (e.g., the computing processes used in the transaction 2.200 may include the computing processes 2.110 stored within the contained data 2.108). Operation 2.708 executes the computing processes to effect the transaction 2.200. For example, operation 2.708 may effect a controlled copying of the data organism 2.100 through a sub-set of the operations of the process flow 2.800 of FIG. 2.8.

Operation 2.710 is a decision that determines whether the contained data 2.108 of one or more of the data resources and/or data organisms 2.100 that are transacting should be updated. For example, a user may replace the contents of a data organism 2.100, or may update attributes and/or values of the data organism 2.100. If the contained data 2.108 is to be updated, operation 2.712 updates the contained data 2.712 of appropriate data organism 2.100, then proceeds to operation 2.714. Otherwise, operation 2.710 proceeds to operation 2.714, which generates one or more transaction records 2.302. The transaction records 2.302 may include, for example, the identifiers 2.102 of other data organisms 2.100 in the transaction 2.200, information such as a time of the transaction 2.00, use data of the transaction 2.00, and/or performance of the executed computing processes. The transaction records 2.302 may also include data such as use termination records (e.g., the termination report 4.508) and records of updates made to a use policy 4.108 controlling use of data within the data organism 2.100. Operation 2.716 determines whether each of the data resources involved in the transaction 2.100 are controlled identities within the datastore 1.114. If not, no further action may be taken for the particular data resource. If the particular data resource is a controlled identity (e.g., it is a data organisms 2.100), then operation 2.718 deposits one or more transaction records 2.302 in the hastory 2.104 of the particular data resource that is a data organism 2.100. Operation 2.720 then re-calculates a root hash 2.310 to evolve an identity of the data organism 2.100.

To control copies within the datastore 1.114, a primary use of the evolving identity of data organisms 2.100 may be to control copying and/or replication of the data within the datastore 1.114 such that data retains uniqueness. FIG. 2.8 is a controlled copying process flow 2.800 illustrating a process by which the copying transaction shown in FIG. 2.5 may be controlled within the datastore 1.114 such that an original data organism 2.100 and a copied data organism 2.100 remain unique, according to one or more embodiments. Operation 2.802 specifies an original data organism 2.100 to be a subject matter of a controlled copying instance of the transaction 2.200. For example, a user may specify an original data organism 2.100 to be copied, as may be useful for versioning of the contained data 2.108 of the original data organism 2.100. Similarly, a server could use the controlled copying transaction when distributing instances of the data organism 2.100 across several physical locations to track those instances. Operation 2.802 determines that the data organism 2.100 is a controlled identity within the datastore 1.114 (e.g., it is a data resource including a hastory 2.104). Operation 2.806 generates a transaction record 2.302 of the transaction of the controlled copying of the original data organism 2.100, and operation 2.208 copies the contained data 2.108 of the original data organism into a copied data organism 2.100. Other attributes and values of the original data organism 2.100, such as the ownership designation 2.106. Operation 2.810 deposits the transaction record 2.302 in a hastory 2.104 of the original data organism 2.100 as a new block 2.304 in a sequential chain 2.300 of the hastory 2.104 of the original data organism 2.100. Operation 2.812 re-calculates a root hash 2.310 of the hastory 2.104 of the original data organism 2.100 based upon the genesis 2.303, to evolve the identity of the original data organism 2.100. Operation 2.214 deposits the transaction record 2.302 of the controlled copying as a genesis block 2.303 of a hastory 2.104 of the copied data organism 2.100, the genesis block 2.303 added as a first block 2.304 of a sequential chain 2.300 of the hastory 2.104 of the copied data organism 2.100. Operation 2.816 calculates the root hash 2.310 of the hastory 2.104 of the copied data organism 2.100 based upon the genesis block 2.303, to initiate an identity of the copied data organism 2.100 and distinguish the original data organism 2.100 from the copied data organism 2.100. Optionally, operation 2.818 may assign a new unique identifier to the copied data organism 2.100 such that it can be uniquely addressed within the datastore 2.114 even as the root hash 2.310 continues to change. In one or more embodiments, the new unique identifier may be recorded in a transaction record 2.302.

In addition to the controlled copying transaction, the data resource control network 1.100 may be used to control ownership of and to effect an ownership transfer of the set of bits that comprise an original data organism 2.100. FIG. 2.9 is a data organism transfer process flow 2.900 showing a process by which the data organism 2.100 of FIG. 2.1 may have an ownership transferred between a first user and a second user by changing an ownership designation 2.106 and depositing a record of the transaction (e.g., the transaction record 2.302) in a block 2.304 of the hastory 2.104 of the data organism 2.100, according to one or more embodiments. Operation 2.902 specifies an original data organism 2.100 to be a subject matter of an ownership transfer, the original data organism 2.100 comprising a unique identifier (e.g., an instance of the identifier 2.302 of FIG. 2.1), an ownership designation 2.106, a contained data 2.108, and a hastory 2.104. For example, a user may request to transfer ownership of one or more data organisms 2.100 that the user owns, and/or the arbiter 1.900 of FIG. 1.1 may transfer ownership to one or more other users. Operation 2.904 determines that the original data organism 2.100 is a controlled identity within the datastore 1.114 by detected a hastory 2.102 associated with the original data organism 2.100. Operation 2.906 changes the ownership designation 2.106 of the original data organism 2.100 to a new ownership designation 2.106. Operation 2.108 generates a transaction record 2.302 of the transaction 2.200 that is the ownership transfer of the original data organism 2.100, and operation 2.910 deposits the transaction record 2.302 of the ownership transfer as a new block 2.304 in the sequential chain 2.300 of the hastory 2.104 of the original data organism 2.100. For example, the transaction record 2.302 may be generated by the transaction engine 1.110 and deposited by one or more record runtime environments 1.116. Operation 2.912 re-calculates a root hash 2.310 of the hastory 2.104 of the original data organism 2.100 based upon the new block 2.304, to evolve the identity of the original data organism 2.100. Upon the competition of process flow 2.900, the identity of the original data organism 2.100 will evolve to distinguish the original from copies within the datastore 1.114.

FIG. 2.10 is a second data organism transfer process flow 2.900 illustrating a second process by which the ownership of the data organism 2.100 may be transferred by copying the data organism and: flagging an original of the data organism 2.100 as extinct; depositing an ownership transfer as a termination block 2.304 of the hastory 2.104 of the original data organism 2.100; and/or, erasing the original data organism 2.100 from the datastore 2.114, according to one or more embodiments. Operations 2.1002 and 2.1004 of FIG. 2.10 are similar to operations 2.902 and operations 2.904 of FIG. 2.9. Operation 2.1006 copies the contained data 2.108 of the data organism 2.100 into a copied data organism 2.100, similar to operation 2.808 of FIG. 2.8. Operation 2.1008 through operation 2.1012 are similar to operation 2.908 through 2.912 of FIG. 2.9. Operation 2.1014 effects one of the following processes: flags the original data organism 2.100 as extinct; deposits the transaction record 2.302 of the ownership transfer as a termination block 2.304 of the hastory of the original data organism 2.100; and/or, erases the original data organism 2.100 from the datastore 1.114. The data organism 2.100 flagged as distinct may be partitioned within the datastore 1.114 and may have its ownership designation changed to an application program for creating auditing records. Operation 2.1016 may deposit the transaction record 2.302 of the ownership transfer as a genesis block 2.303 of a hastory 2.104 of the copied data organism 2.100, the genesis block 2.303 added as a first block 2.304 in the sequential chain 2.300. Operation 2.1018 calculates the root hash 2.310 of the hastory 2.104 of the copied data organism 2.100 based upon the genesis block 2.303, to initiate an identity of the copied data organism 2.100 (e.g., as a new data resource of the datastore 1.114 having a controlled identity). Similarly, the calculated root hash 2.310 distinguishes the original data organism 2.100 (e.g., which may now be deleted, and/or extinct) from the copied data organism 2.100. Finally, operation 2.1020 may assign a new unique identifier (e.g., an instance of the identifier 2.102 that is unique within the datastore) to the copied data organism 2.100.

FIG. 2.11 is a media use transaction view 2.1150 illustrating a video data 2.1101 stored in a media file 2.1100 that is a first data organism 2.100A, the media file 2.1100 an application resource for a second data organism 2.100B that is an application profile 2.1105 and the media file 2.1100 accessed by a user associated with a user profile 3.106 that is a third data organism 2.100, according to one or more embodiments. Specifically, FIG. 2.11 is an example of a transaction 2.200 in which a user requests to utilize a first data organism 2.100 through use by an application program on a device 1.104 associated with a user. For example, the application program might be a music streaming player or an enterprise business contact application. The application program may include an instance of the data resource and/or the data organism 2.100 that is the application profile 2.1105, which may catalogue and/or list each of the data resources and/or data organisms 2.100 available to the application program (e.g., as application resources). Using a user interface (UI) of the application program, the user may select a video which the user would like to view. After an authentication of the user and/or the device along with authorization of the user, the mediation server 1.102 may initiate a use transaction. For example, the use transaction may be data use as shown in described in conjunction with FIG. 4.1 On conclusion of the use transaction, the resulting transaction record 2.302 may be deposited in each of the hastories 2.1104 of the media file 2.1100, the user profile 3.114, and/or the application profile 2.1105 to evolve the identities of each and create an auditing record of the transaction within each. The media file 2.1100 may be transacting with several user profiles 3.106 simultaneously. For example, there may be several open transaction records 4.404 within the terms engine server-side 1.112A as shown in FIG. 4.4. In one or more embodiments, while each transaction 2.200 may open at a different time, a particular transaction 2.200 that closes (e.g., generates a transaction record 2.302) may be added to the file hastory 2.1104 first. Similarly, the application program may be simultaneously transacting with hundred or thousands of user profiles 3.106 and/or other data organisms 2.100. As shown in FIG. 2.11, the transaction record 2.302 of FIG. 2.11 is added as T49, while a different transaction 2.200 may still be pending (to tentatively have a transaction record 2.302 of the different transaction 2.200 added as T50 within the application hastory 2.1106).

The embodiments shown and described in conjunction with FIG. 2.1 through FIG. 2.11 lead to a number of advantages. First, characterizing various interactions within the datastore 1.114 as transactions may allow for a distinguishing factor of data resources based on a developing history of how they transact. Hashing this developing history may form an immutable record of transactions associated with each data resource that is usable to distinguish the data resource from any other data resource within the datastore 1.114. The result may be one or more data organisms 2.100, each of which have an evolving identity. In other words, the data within the datastore 1.114 is able to remain unique within the datastore 1.114 and/or globally unique.

Computing processes may be defined to treat each of the data organisms 2.100 differently. For example, a user who owns an original data 2.100 resource may be able to determine constrained permissions for any copy of the set of bits of the original data organism 2.100. Specifically, the user may decide that an original document can only be modified by himself or herself, whereas a copy may only have read-access. As a result, the set of bits of original data resource may have increased economic value being that the original data organism 2.100 includes a single instance that may be permanently and/or immutably transferred (e.g., the ownership transfer transaction). In addition, the data organisms 2.100 are able to participate in agreements between one or more users and/or parties wherein ownership is temporarily granted to the arbiter 1.900. The ability to enforce such agreements may provide a foundation for marketplaces for data organisms 2.100 that may further increase their monetary value.

Third, the root hash 2.310 may be used that two or more data organisms which may include other similar identifying names (e.g., a file name) may contain different data. For example, one or more transactions may be recorded that change the contained data of a particular data organism 2.100, thus changing the root hash 2.310 of the hastory 2.104 of the particular data organism. Where the hash function additionally includes as an input one or more pieces of the contained data 2.108, it may also affect the root hash 2.310. These advantages may markedly increase efficiency of the datastore 1.114, for users, an enterprise administering the datastore 1.114, and/or developers building application programs that interact with the datastore 1.114.

In addition, use of one or more data organisms 2.100 within the datastore 1.114 may improve ease of data analysis being that each data resource and the transactions in which it has participated can be individually identified and distinguished. For example, comparing root hashes 3.310 and/or transaction records 3.304 can be used to de-duplicate a dataset for analysis, and/or track a family of copies spawned from an original instance of the data organism 2.100. The chain of blocks 2.300, each block 2.304 of which includes a transaction record 3.302, creates an immutable accounting record of important interactions in which the data organism 2.100 has participated. For example, this auditing trail may be used to quickly and easily determine which employees of an enterprise used a particular data organism along with details of the use, which may be superior to re-constructing auditing logs from an external scheme that attempts to build accounting records that may be complex and require significant computing overhead. Using the immutable audit records associated with each of the data organisms 2.100 increases security of the datastore 1.114 by making it easier to detect suspicious activity by analysis and/or examination of particular data resources.

In addition to conducting transactions between data resources and maintaining uniqueness of data organisms, the immutable records of one or more data organisms 2.100 may be used to authenticate a user and/or a device, including "just-in-time" authentication when a particular data resource is requested. FIG. 3.1 is an authentication transaction network 3.100 in which the device 3.104A completes a multi-factor login that may establish a secure communication channel over the network 1.101, the device 3.104A and/or the device 3.104B then submits an identity claim 3.120 comprising a device root hash 3.602 of a device hastory

3.108 to a server (e.g., the mediation server 1.102) for comparison to a profile root hash 3.600 of a profile hastory 3.112 to validate the identity claim 3.120, according to one or more embodiments. As a result, the root hash 3.310 may be used to define a fourth authentication factor based on a transaction history. This fourth authentication factor may act as a virtually un-forgeable, single-use identity credential that changes after each identity claim by a user (e.g., the user 3.303) and/or a device (e.g., the device 1.304A) is made. FIG. 3.1 further illustrates four instances of a network 1.101A through 1.101E, a server 3.102 and a server 3.106, a user 3.303, a device 3.104A and a device 3.104B, a device hastory 3.108, a device profile 3.110, a profile hastory 3.112, a user profile 3.114, and an identity claim record 3.116. The authentication transaction network 3.100 may be implemented as a part of, or independently of, the data resource control network 1.100. For example, in one or more embodiments the server 3.102 may be the mediation server 1.102 of FIG. 1. Similarly, the server 3.106 may be the server 1.106A and/or the usermode microservice 1.140. The device 3.104A and 3.104B may be the device 1.104A and the device 1.104B, respectively. Each of the networks 1.101A through 1.101E may be similar or different. In one preferred embodiment, network 1.101A is the internet or a first WAN, network 1.101B is a Bluetooth® connection, a tether (e.g., a wired connection) a LAN, and/or a near field communication connection, the network 1.101C is the internet or the first WAN, the network 1.101D is a LAN and/or a second WAN behind a firewall, and the network 1.101E is the internet or the first WAN. Where two or more of the network 1.101A, 1.101C and 1.101E are the same, preferably a first channel is used to communicate between the device 3.104A and server 3.102, a second channel is used between device 3.106 and device 3.104B, and a third channel to communicate between the device 3.104A and server 3.106. The device 3.104A and the device 3.104B may be a desktop computer, a smartphone (e.g., an iPhone®, a Galexy® phone, an Android® phone, a Windows® Phone), a notebook computer, a different server, a piece of wearable technology (such as a smart watch like an iWatch), and/or a tablet device (such as an iPad). In one preferred embodiment, the device 3.104A is the desktop computer and the device 3.104B is the smartphone. In another preferred embodiment the device 3.104A is a smartphone (e.g., an iPhone®) and the device 3.104B is a piece of wearable technology (e.g., an iWatch®).

In FIG. 3.1, the device 3.104A may request access to a service provided by a server, for example the datastore 1.114. The service may also be, for example an application running on the server. The device 3.104A may engage in a multi-factor login 3.118, as shown and described in conjunction FIG. 3.2 and FIG. 3.3. The multi-factor login 3.118 may establish one or more secure channels of communication (e.g., the first channel over network 1.101A) by verifying that the one or more of the channels are not being intercepted by a third party (e.g., a "man-in-the-middle" attack) after which a cryptographic shared secret may be utilized, for example using a Diffie-Hellman key exchange to establish an encrypted channel. Independent of the multi-factor login, the device profile 3.110 makes an identity claim 3.120 against the user profile 3.114 to authenticate the device 3.104A and/or the user 3.303 of the device 3.304A. The identity claim 3.120 may be transmitted in addition to one or more of the tokens of the multi-factor login 3.118. The identity claim 3.120 comprises a device root hash 3.602 of a device hastory 3.108, as shown in FIG. 3.6. The device root hash 3.602 may be transmitted over one of the networks 1.101 as part of the identity claim 3.120 to be compared to a profile root hash 3.600 of a profile hastory 3.112, as shown in conjunction with FIG. 3.3 through FIG. 3.10. In the transaction record generation 3.130 the device 3.104A and/or the device 3.104B may generate an identity claim record 3.116 of the authorization request. The identity claim record 3.116 may be similar to the transaction record 2.200 of FIG. 2.2 in nature, but may be generated by the device 1.104A and/or the device 1.104B. The identity update 3.150 comprising data of the identity claim record 3.116 may then be transmitted through one or more channels of communication to the server 3.106 in the identity update 3.150 for assembly into an identical and/or virtually identical instance of the identity claim record 3.116, the assembly occurring in the transaction record generation 3.160. The server 3.106 adds the transaction record to a pending and/or forming instance of the block 2.304 of the profile hastory 3.112 in the profile hastory update 3.170. The root hash of the device hastory 3.108 and the root hash of the profile hastory 3.114 may be re-calculated. The server update verification 3.180 may then be transmitted to the device 3.104B as an acknowledgment of receipt and assembly of the identity claim record 3.116. Similarly, the device update verification 3.185 may acknowledge receipt of the server update verification 3.190. The device and the server 1.106 may then proceed with the hastory commit 3.190 and the profile hastory commit 3.195. If either of the server update verification 3.180 or the device update verification 3.185 are not properly received, the authentication transaction may be rolled back such that the neither the profile hastory 3.112 or the device hastory 3.108 evolve. In such case the device may be required to re-submit a second identity claim 3.120 in a second authentication attempt. Although not shown in the embodiment of FIG. 3.1, an optional transaction with an application profile (e.g., the application profile 2.1105 of FIG. 2.11) may occur between the user profile 3.106 and an application hastory (e.g., the application hastory 2.1106), as shown in the process flow of FIG. 3.8. In such case an identity update 3.150 comprising data usable to assemble a resulting transaction record 2.302 may be sent from the server 3.106 and/or a different server to the device 1.104B, with the device assembling the resulting truncation record 2.302 before updating the device hastory 3.108 and verifying the update with the server 3.106. Additionally, although shown stored on the device 3.104B, the device profile 3.110 may alternatively or in addition reside on the device 3.104A.

FIG. 3.2 is a multi-factor login process flow 3.200 of the multi-factor login 3.120 of FIG. 3.1, according to one or more embodiments. Operation 3.202 receives a login request through the network 1.101, the login request received from a first device (e.g., the device 3.104A of FIG. 3.1) referred to in FIG. 3.2 as 'device A'. The login request may be generated from a particular application program on the first device such as an enterprise application where the first device is a desktop computer, or a streaming music app where the first device is a mobile device. The login request may include data identifying the first device, the application program, and/or a user of the first device. A first server, referred to in FIG. 3.2 as 'server A' may generate a token X in operation 3.204 and return the token X through the network 1.101 to the first device in operation 3.206. The application program generating the login request and/or a separate application program referred to as a profile process (e.g., an application program for identity management) may then generate a token Y in operation 3.208.

In operation 3.210, the first device transmits the token X and the token Y through the network 1.101B to a second device (e.g., the device 3.104B of FIG. 3.1), referred to as a 'device B' in FIG. 3.2. The token Y may be an identifier of the first device and token X may include data identifying the user of the first device. The network 1.101B can be, for example, a Bluetooth® or near-field communication connection between the first device and the second device. In operation 3.212, the second device determines whether token Y is associated with a user profile (e.g., the user profile 3.114) of the user of the first device. If not, operation 3.214 generates and error message and/or terminates the multi-factor login 3.118. If a profile association is determined, in operation 3.216 the second device transmits the token X and the token Y to a second server (e.g., the server 3.106), referred to in FIG. 3.2 as 'server B.' The transmission between the second device and the second server may occur through the network 1.101 over a separate channel than a channel carrying communication between the first device and the first server. Although now shown, data of the identity claim 3.120 may be transmitted during this operation as well. In operation 3.218, the second server may determine whether the token Y is associated with a valid user profile. If not, operation 3.218 may proceed to operation 3.214. If there is a valid association, operation 3.218 may proceed to operation 3.220, in which the second server transmits token X to the first server through the network 1.101 (e.g., a LAN and/or a WAN behind a firewall).

FIG. 3.3 is the multi-factor login process 3.200 of FIG. 3.2 continued as the multi-factor login process 3.300, according to one or more embodiments. After the first server receives the token X from the second server, the first server determines according to operation 2.222 whether the first server issued the token X and whether the token X remains valid (e.g., has not expired). If the token X received by the first server was not issued (e.g., it is a third token Z of unknown origin) and/or the token X has expired, operation 2.222 may proceed to generate an error message and terminate login in accordance to operation 3.214. Otherwise, in accordance with operation 2.224, the first server transmits data to the second server to indicate that a token was issued to a particular user by transmitting an identifier of the particular user. In operation 2.226, the second server verifies that a user profile is associated with the identifier of the particular user, and if not proceeds to operation 3.214. If the second server determines that a user profile is associated with the particular user, the second server transmits data of the user profile of the particular user to the first server in operation 2.228. In accordance with operation 2.230, the first server then transmits a login token to the first device. As a result, a secure channel and/or a secure socket between the first device and the first server may then be established. The device and the server may exchange cryptographic keys in a Diffie-Hellman key exchange that may be a specific method for securely exchanging the cryptographic keys over a public communication channel (e.g., the network 1.101).

FIG. 3.4 is an authentication process flow 3.400 illustrating a process by which the device 3.104A of FIG. 3.1 may be securely authenticated using un-forgeable identity credentials that define a fourth authentication factor based on a transaction history of the device (e.g., the device 3.104A, the device 3.104B) and a user profile (e.g., the user profile 3.114) associated with the device, according to one or more embodiments. Operation 3.402 receives an authentication request from a first device (e.g., the device 3.104A) to access a service and/or a datastore (e.g., the datastore 1.114). For example, the authentication request may be generated from an application program on the device 3.104A. Operation 3.404 receives an identity claim 3.120 from the first device and/or a second device (e.g., the device 3.104B) associated with the first device (e.g., under the control of the same user and/or sharing LAN and/or a Bluetooth® connection), the identity claim 3.120 comprising a device root hash 3.602 computed by a hash function. The hash function may use inputs comprising a previous transaction record 3.402 along with a previous hash value 2.306 of a hastory of the device, referred to as a device hastory 3.108. The identity claim 3.120 in one or more preferred embodiments is made by the device 3.104B over a channel that different than a primary channel of communication between the device 3.104A and the server 3.102. The primary channel, for example, may be used by the application program to receive one or more data resources (e.g., by the data stream 4.180 of FIG. 4.1). Operation 3.406 retrieves data of a user profile 3.114 associated with the first device 3.104A and/or the user 3.303 of the first device 3.104A, the user profile 3.114 including a profile hastory 3.112 including a profile root hash 3.600 computed by the hash function using inputs comprising the previous transaction record 3.402 along with a penultimate hash value 2.308 of the profile hastory 3.112. Operation 3.408 extracts the profile root hash 3.600 from the user profile 3.114 associated with the device 3.104A and/or the user 3.303 of the device 3.104A. Operation 3.410 compares the device root hash 3.602 of the device hastory 3.108 with the profile root hash 3.600 of the profile hastory 3.112 to verify an identity of the device 3.104A and/or the user 3.303 of the device 3.104A. Operation 3.412 determines that the device root hash 3.602 and the profile root hash 3.600 are identical. Finally, operation 3.414 validates the identity of the device 3.104A and/or the user 3.303 of the device 3.104A.

FIG. 3.5 is an identity evolution process flow 3.500 that illustrates a process for evolving both the profile hastory 3.114 and the device hastory 3.108 in parallel to synchronize their identities for comparison in a subsequent authentication request, according to one or more embodiments. Operation 3.502 receives data usable to assemble a transaction record of the identity claim 3.120 (referred to as the identity claim record 3.116 in FIG. 3.1) generated by the device 3.104A. In one preferred embodiment, operation 3.502 receives portions of the data usable to assemble the identity claim record 3.116 from two or more sources and/or over two or more channels. For example, a first portion of data usable to assemble the identity claim record 3.116 may be received over a first channel (e.g., a first channel of the network 1.101E of FIG. 3.1) and a second portion of data usable to assemble the identity claim record 3.116 may be received over a second channel (e.g., the second channel of the network 1.101C of FIG. 3.1). In such case, the first portion of the data usable to assemble the identity claim record 3.116 may be transmitted from the device 3.104B to the device 3.104A for re-transmission to the server 3.106 (e.g., through the network 1.101E of FIG. 3.1). Operation 3.504 assembles the transaction record of the identity claim (e.g., the identity claim record 3.116) generated by the device 3.104B. Operation 3.504 assembles the identity claim record 3.116 to yield an identical instance of the identity claim record 3.116 generated on the device 3.104B. For example, the identity claim record 3.116 may be assembled according to a procedure that will yield a virtually identical identity claim record 3.116 as produced on the device 3.104B. Operation 3.506 deposits the transaction record of the identity claim in a new block 4.404 of the sequential chain of blocks 4.400 of a profile hastory 3.112. For example, the data of the assembled identity claim record 3.116 may be placed into the data structure of the sequential chain of blocks 4.400 as an instance of a transaction record 2.302 of FIG. 4.2. The data structure, according to one or more embodiments, may be the hash chain of FIG. 2.3 or the Merkle tree of FIG. 2.4. Operation 3.508 computes a new profile root hash (e.g., a new instance of the root hash 2.310 of FIG. 3.6) with a hash function using as inputs the profile root hash (e.g., the profile root hash 3.600 of FIG. 3.6) and the transaction record of the identity claim (e.g., the identity claim record 3.116), to evolve the identity of the user profile 3.114. Operation 3.510, 3.512 and 3.514 may implement a two-phase commit process. The two phase commit process may be a distributed algorithm that coordinates a distributed atomic transaction on whether to commit or abort (e.g., roll back) the computation of the new profile root hash 3.600 and/or the new device root hash 3.602. Specifically, operation 3.510 transmits a verification of an identity update of the user profile 3.114 (e.g., server update verification 3.180 of FIG. 3.1) to the first device (e.g., the device 3.104A) and/or the second device (e.g., the device 1.104B). The verification of the identity update may include a simple indicator that assembly of the identity claim record 3.116 was successful. The indicator may itself include a different hash value of a different hash function that may selectively hash only the data of the assembled identity claim record 3.116. The verification of the identity update may also include additional data such as a time at which the identity claim record 3.116 was assembled and/or added to the profile hastory 3.112. Following transmission of the verification of the identity update, e.g., by the server, the device 3.104A and/or the device 3.104B may likewise generate a verification of receive of the verification of the identity update made by the server and/or a verification of an identity update of the first device and/or the second device (e.g., device update verification 3.185 of FIG. 3.1). Operation 3.512 then receives a verification of an identity update of the first device 3.104A and/or the second device 3.104B. Operation 3.514 commits the new profile root hash 3.600 of the profile hastory 3.113, to synchronize the identity of the user profile 3.114 with the identity of the device profile 3.108 of the first device (e.g., the device 3.104A) and/or the second device (e.g., the device 3.104B).

FIG. 3.6 is a profile hastory and device hastory view 3.650 illustrating a detailed view of the sequential chain of blocks 2.300 of the profile hastory 3.112 with transactions records 2.302A through 2.302D including a profile data 3.604, an identity claim record 3.116B of a login transaction, an identity claim record 3.116C of a data use transaction, and an identity claim record 3.116C of a log out transaction, according to one or more embodiments. FIG. 3.6 shows an instance of the hastory of FIG. 2.3 usable for the authentication process and/or the real-time authentication process associated with an authorization request, as shown and described in conjunction with FIG. 4.1. The genesis block 2.303A may include, for example, the transaction record 2.302A including the profile data 3.604 used in creating the user profile 3.114 associated with the hastory 3.112 of FIG. 3.6. The hash value 2.306A may include as inputs the data of the transaction record 2.302A such as the profile data 3.604. The hash value 2.306A, the genesis block 2.303A and/or any other data of the profile hastory 3.112 may be communicated to the device 3.104A and/or 3.104B to initiate the device hastory 3.108, setting up an initial synchronization between the identity of the user profile 3.114 and the device profile 3.110. The device profile 3.110 may represent a user (e.g., the user 3.303 of FIG. 3.1) and/or the device 3.104A and/or the device 3.104B.

A set of blocks 2.304B through 2.304D may be added the after genesis block 2.303A for each of several identity claims (e.g., one or more of the identity claims 3.120 of FIG. 3.1) made by the device profile 3.110 against the user profile 3.114. For example: the identity claim record 3.116B may be added as the transaction record 2.302B when the user 3.303 and/or the device 3.104A logs in to the server 3.102 (e.g., to use a service and/or the datastore 1.114): the identity claim record 3.116C may be added when the user 3.303 and/or the device 3.104A submits an authorization request to use a data resource of the datastore 1.114 (e.g., the authorization request of FIG. 3.7 and/or the use request 4.130 of FIG. 4.1); and, the identity claim record 3.116D may be added when the user 3.303 and/or the device 1.104A completes a log out transaction from the server 3.102 and/or the datastore 1.114. A most recently computing hash value of the profile hastory 3.112 such as the hash value 2.306D is referred to as the profile root hash 3.600 which may be analogous to the root hash 2.310 of FIG. 2.3. The profile root hash 3.600 is computed using a hash function with inputs comprising a most recent transaction record 2.302 (which in the embodiment of FIG. 3.6 is the transaction record 2.302D) along with a penultimate hash 2.308 (which in the embodiment of FIG. 3.6 is hash value 2.406C). When a new transaction record (e.g., a transaction record 3.402E, not shown in the embodiment of FIG. 3.6) is added to the sequential chain of blocks 2.300, the profile root hash 3.600 becomes a new instance of the penultimate hash 2.308, and the penultimate hash 2.308 prior to addition of the new transaction record ceases to be an instance of the penultimate hash 2.308.

The device profile 3.110 comprising the device hastory 3.108 is stored on the device 3.104A and/or the device 3.104B. In one embodiment, the device hastory 3.108 may include a complete set of blocks 2.304 back to the genesis block 2.303A. However, as shown in FIG. 3.6 the device hastory 3.108 may be an attenuated version of the profile hastory 3.112 that includes only the most recent transaction record 3.402 (here, the transaction record 3.402D) along with the most recent hash value (referred to within the device hastory 3.108 as the device root hash 3.602). The profile root hash 3.600 and the device root hash 3.602 are identical when the profile hastroy 3.112 and the device hastory 3.108 are synchronized (e.g., the identities of user profile 3.114 and the device profile 3.110 are aligned). The device 3.104A and/or the device 3.104B may generate a new instance of the transaction record 3.402 (for example a transaction record 3.402E, not shown in the embodiment of FIG. 3.6) at the time that the user 3.303, the device 3.104A and/or the device 3.104B make an identity claim 3.120 against the user profile 3.114 according to the identity update 3.150. The device 3.104A and/or 3.104B then transmits data of the transaction record of the identity claim 3.120 through one or more channels to be re-assembled and placed in a new block 2.304 of the profile hastory 3.112. Although not shown in the figures, in one or more embodiments a "reverse" identity update (e.g., similar to the identity update 3.150) may be transmitted from one or more servers that generated the identity claim record 3.116 to the device 3.104A and/or the device 3.104B.

FIG. 3.7 is an real-time authentication process flow 3.700 illustrating a process by which the device 3.104A of FIG. 3.1 can submit to just-in-time authentication in association with an authorization request to utilize a data resource of the datastore 1.114 of FIG. 1.1, according to one or more embodiments. Operation 3.702 receives an authorization request, such as the use request 4.130 of FIG. 4.1, from a first device (e.g., the device 3.104A) to utilize a data resource within a datastore of a server (e.g., the server 1.106A of FIG. 1.1). For example, the utilization of a data resource may include downloading a file, deleting data of the data resource, or having data of the data resource temporarily streamed to the device 3.104A for temporary use. The temporary use may include continuous monitoring and control of the data resource control network 1.100 as shown in the embodiments of FIG. 4.1 through FIG. 4.12. Operation 3.704 receives an identity claim 3.120 from the first device and/or a second device (e.g., the device 3.104B of FIG. 3.1) associated with the first device, the identity claim 3.120 including a device root hash 3.602 computed by a hash function dependent on a dataset that includes one or more transaction records (e.g., the transaction records 2.302D of FIG. 2.4 and/or FIG. 3.6) of previous identity claims 3.120. Specifically, addition of an additional transaction record 2.302 and/or re-arrangement of an order of the transaction records 2.302 result in virtually unpredictable changes in the device root hash 3.602 and/or the profile root hash 3.600. In operation 3.706, a user profile 3.114 associated with at least one of the first device (e.g., the device 3.104A) and a user (e.g., the 3.303) of the first device is retrieved, the user profile including a profile hastory 3.114. Operation 3.708 extracts the profile root hash 3.600 from the user profile 3.114 associated with the first device and/or the user of the first device. Specifically, for example, the server 3.106 may use computing processes to copy and place into physical memory a most recent instance of the hash value 2.306 of the chain of blocks 2.300 of the profile hastory 3.112. Operation 3.708 may function similarly to operation 3.410 of FIG. 3.4 to compare the device root hash 3.606 with the profile root hash 3.600 of the profile hastory 3.112 to verify an identity of the first device and/or the user of the first device. Operation 3.712 determines that the device root hash 3.602 and the profile hash value 3.600 are identical. Thereafter, the user and/or the first device may be authenticated, which may occur rapidly (e.g., within milliseconds) in association with authorizing utilization of the data resource may be authorized. The sever 3.102 and/or 3.106 may then proceed with an authorization process for example operation 3.714 that evaluates one or more permissions of the data resource in relation to the user profile 3.114 (such as read access, write access, or in one or more preferred embodiments the use controls shown and described in conjunction with FIG. 4.1 through FIG. 4.12). While the use of the authentication process shown in FIG. 3.7 may be used for real-time authentication in association with an authorization request, in one or more embodiments the authentication process may also result in a tradition token (e.g., an authentication authorization token) that may be communicated to the device 3.104A and/or the device 3.104B for use in a session of use with the datastore 1.114 and/or other services of one or more of the servers (e.g., the mediation server 1.102).

FIG. 3.8 is an application identity evolution process flow 3.800 showing a process whereby an identity claim 3.120 may be made by the device 3.104A and/or the user profile 3.114 against an application profile 2.1105 of an application program, according to one or more embodiments. The application program may be any computer program such as an appliance, server software, consumer software such as a computer or social network app, an enterprise software application such as a calendar app and/or a word processing app. Within the datastore 1.114 the application program may be represented by an application profile 2.1105 including data about the application program in addition to a catalogue of data resources that are available to the application program. When utilization of a data resource is requested by the user (e.g. the user 3.303) and/or the device (e.g., the device 3.104), the server 3.106 may determine whether to make an identity claim (e.g., the identity claim 3.120) from the user profile 3.114 against the application profile 2.1105 to determine whether the application program has previously interacted with the user 3.114 and/or the device. In operation 3.802, an application profile 2.1105 is referenced, the application profile 2.1105 associated with the application program for which a protected resource is an application resource. An application resource is an instance of the data resource and/or the data organism 2.100 that is available to be addressed, accessed, and/or used within the datastore 1.114. Operation 3.804 resolves an identity claim of the user profile in relation to the application profile by determining that the user profile 3.114 and the application profile both include a transaction record 2.302 that is identical within the profile hastory 3.112 and the application hastory. In contrast to the identity claim 3.120 of FIG. 3.1, the identity claim of process flow 3.800 may or may not utilize in an instance of the hash value 2.306 in the identity claim against the application profile 2.1105. Rather, data and/or contents of one or more transaction records 2.302 of both the application profile 2.1105 and the user profile 3.114 are compared to determine that both have previously transitioned. If they have not previously interacted, for example, additional permissions may be required by the data resource control network 1.100. Operation 3.806 deposits a transaction record 2.302 of the second identity claim in an application hastory 2.1106 of the application profile 2.1105, and operation 3.808 computes an application root hash of the application hastory 2.1106 with the transaction record 2.302 of the identity claim made against the application profile, to evolve the identity of the application profile 2.1105. For example, operations 3.806 and 3.808 may be also shown and described in the transaction of FIG. 2.11. Finally, if the profile hastory 2.114 is updated as a result of the identity claim against the application profile 2.1105, operation 3.810 transmits to the device 3.104A and/or the device 3.104B data usable to assemble a transaction record of the identity claim (e.g., the identity claim record 3.116) of the user profile 3.114 in relation to the application profile 2.1105. Additional verification similar to operations 3.510 and 3.512 of process flow 3.500 may occur before commitment of the identity update 3.150 of the device 3.104A, the device 3.104B and/or the user profile 3.114.

FIG. 3.9 is a profile attack detection process flow 3.900 showing a process that invalidates forged identify credentials if the identity credentials are copied from the device 3.104A and/or the device 3.104B based on the evolution of the device hastory 3.108 and the profile hastory 3.112, according to one or more embodiments. Operation 3.902 receives an authentication request and/or an authorization request from a device (e.g., the device 3.104A) to login and/or to utilize a data resource within a datastore of a server (e.g., the server 3.102). Operations 3.904 receives an identity claim 3.120 from the device 3.104A and/or a device 3.104B including a device root hash 3.602. Operation 3.906 through 3.910 may occur similarly to operations 3.406 through 3.410 of FIG. 3.4, respectively. However, in contrast to the embodiment of FIG. 3.4, operation 3.412 determines that the device root hash 3.602 and the profile root hash 3.600 are different (e.g., not virtually identical such that they will result in a same hash value when used as an input to a particular hash function). As a result, operation 3.914 may deny the authentication request and/or the authorization request and operation 3.916 may optionally lock the user profile 3.114 to prevent prospective authentication attempts by the user 3.303, the device 3.104A, and/or the device 3.104B. In the context of an enterprise, for example, an administrator of the datastore 1.114 may have to be contacted to unlock the user profile 3.114, or an additional identity credential submitted over a different secure channel.

FIG. 3.10 is a forged credential detection view 3.1050 showing a failed identity claim 3.1002 by an impersonator who cloned credentials from a device 3.104A (e.g., such as a smartphone) of user 3.303, the failed identity claim 3.1050 identified and optionally responded to by the process of FIG. 3.9, according to one or more embodiments. A section of a chain of blocks 2.300 of the profile hastory 3.104 is shown in FIG. 3.10, the chain of blocks 2.300 originating at an genesis block 2.304 (not show in the embodiment of FIG. 3.10). A device hastory 3.108A is in an initial synchronized state with the profile hastory 3.104 after both the device 3.104 and the server 3.106 commit the transaction record 3.402A ('T55'). At the initial state, both the device root hash 3.602 and the profile hash 3.600 are equal to the hash value 2.306A. The hash value 2.306A is that included as inputs to a hash function a previous instance of the have value 2.306 ("H54") along with the transaction record 3.402A ("T55"). After the initial state, the user 3.303 and/or the device 3.104A may make an identity claim 3.120B against the profile hastory 3.104 by transmitting the device root hash 3.602 (then the hash value 2.406A) to the server 3.106 to be compared to the profile root hash 3.600 stored in a user profile 3.114. One or more servers (e.g., the server 3.106 of FIG. 3.1) may then effect one or more additional processes of the process flow 3.400 of FIG. 3.4, including the server update verification 3.180B.

After the parallel synchronization of the device hastory 3.102A and the profile hastory 3.104 to result in block 2.304B, an impersonator 3.1001 (for example, a hacker) may find some way to copy a memory of the device 3.104A through the credential cloning 3.1000. The memory may is copied onto a device 3.104X having a copied instance of the device hastory 3.108A referred to as the device hastory 3.108X. Additionally, the impersonator 3.1001 may have through some other means obtained the identity credentials of the device 3.104A that may include the device root hash 3.602 and stored them on the device 3.104X. At the time of the credential cloning 3.1000 in FIG. 3.10 the device root hash 3.602 is equal to the hash value 2.306B.

After the credential cloning 3.1000, either the device 3.104A or device 3.104X may succeed at an identity claim 3.120A. Where the user 3.303 makes the identity claim 3.120C, the identity of the profile hastory 3.104 will evolve after addition of the block 4.404C. The impersonator 3.1001 may then make an identify claim 3.104 that will fail (e.g., the failed identity claim 3.1002) due to mismatch of the hash value 3.406B with the hash value 3.406C, for example per the process flow 3.900 of FIG. 3.9. The user 3.303 and/or an administrator of the datastore 1.114 may then be alerted as to the failed identity claim 3.1002. The user profile 3.114 may also optionally be locked until an administrator of the datastore 1.114 can determine the cause of the failed identity claim 3.1002. On the other hand, where the impersonator 3.1001 makes the identity claim 3.120C before the user 3.303, the user 3.303 may be alerted the next time the user 3.303 and/or the device 3.104A attempts to transact with the profile hastory 3.104. Additional processes may determine when to lock the user profile 3.114 as opposed to allow continued identity claims 3.120 to be made against the profile hastory 3.104 (in which case alerts may be generated and communicated to the user 3.303 and/or an administrator of the datastore 1.114. According to the embodiment of FIG. 3.10, the identity credentials (e.g., the device root hash 3.602) may act as a single-use identity credential usable for rapid authentication. The authentication transaction network 3.100 may lock out impersonators 3.1001 due to the parallel synchronized update of the identity of the device hastory 3.108A and the identity of the profile hastory 3.112.

The authentication transaction network 3.100 and associated processes as shown in the embodiments of FIG. 3.1 through FIG. 3.11 represents a number of advances in the first 'A' of the triple AAA framework, Authentication. To what may be considered the three standard authentication factors (what the user "knows," what the user "has," and/or what the user "is"), the authentication process disclosed adds a fourth authentication factor, what the "has been" or what the user "was." This fourth authentication factor may be based on a history of interaction in between the user and/or a device, that history of transaction records forming the immutable record of transactions in the hashed history, referred to as a hastory. As a result, the authentication process may have a higher degree of certainty when verifying an identity and/or validating an identity claim of the use and/or the device.

At the same time, the datastore and/or services offered by one or more servers may retain two-factor authentication while not requiring either passwords (e.g., something the user knows) or biometrics (something the user has). Rather, the two-factor authentication may comprise what the user "has" (e.g., a first device such as a smartphone) and what the user "was" (e.g., the hastory that may be stored on both the first device, a second device, and/or one or more servers). The result may be a frictionless authentication process, for example where a user brings a first device under the user's control (e.g., a smartphone) into a close proximity with a second device (e.g., a desktop computer, a tablet) on which the user would like to access the datastore or a data resource.

In addition, use of the root hash of the hastory as an identity credential may eliminate general use and/or dependence passwords that may be especially susceptible to social engineering attacks. For example, a social engineer may have to possess one or more devices in order to authenticate in place of the user, unlike a password which once handed out to a social engineer may not be changed and allow access of both the user and the social engineer without detection.

The root hash of the hastory additionally increases security of the datastore by allowing the identity credentials of the device to be single use. As disclosed, the root hash may be communicated out-of-band from a primary channel used to communicate with the datastore, for example to request and receive data of a data resource, which may markedly decrease chances that the identity credentials will be intercepted. However, in the event identity credentials are obtained by an impersonator, for example through interception of the network or cloning of the device, the root hash may still represent an advantage of a session token and/or other identity credentials. Specially, an impersonator will be barred from interaction with the datastore if the true user makes even one more additional identity claim to a server of the authentication transaction network 3.100.

Due to a relatively rapid comparison between the device root hash and the profile root hash, the authentication transaction network 3.100 may reduce computing overhead and permit real-time and/or "just-in-time" authentication that permits the device and/or a user of the device to be re-authenticated after a short period of time (a few seconds, a minute). Therefore, optionally authentication may occur with each interaction between the device 3.104A and/or the server 3.102, for example each request for a data resource and/or protected resource. As a result, it may be technically feasible set permissions for individual data resources based on an identity of the user and/or the device, permitting fine grain control of data resources within the datastore. For example, the data resource control network 1.100 may be able to scale to a large number of user of an enterprise (e.g., customers, employees) while still defining access and/or use controls of each individual data resource when necessary, rather than broad and potentially over-permissioned user groups. Data resources may also be particularly permission, reducing under-permissioning. The user requesting access to the datastore, utilization of data resources, and/or other electronic services is authenticated with a higher degree of certainty due to use of a fourth authentication factor, a hashed history forming an immutable transaction records in which the user participated.

FIG. 4.1 is an authorization network 4.100 showing a set of servers (including the mediation server 1.102, the key server 1.108, the datamode microservice 1.130, and the usermode microservice 1.140) usable to authorize use of a protected resource by a device 1.104 and control use of the protected resource on the device 1.104 using a terms engine 1.112 (including a terms engine server-side 1.112A and a terms engine device-side 1.112B) according to a use policy 4.108, according to one or more embodiments. The authorization network 4.100 may operate in contrast to a server implementing a datastore with a hierarchical file system that may merely control access to data resources. Although not shown for clarity, each of the arrows in FIG. 4.1 through FIG. 4.3 represent communication over one or more instances of the network 1.101 (e.g., the internet, a WAN, a LAN), and each of the servers (e.g., the mediation server 1.102, the usermode microservice 1.141) and the device 1.104 are communicatively coupled by one or more instances of the network 1.101. The authorization network 4.100 may be implemented as a part of the data resource control network 1.100, work in coordination with the authentication transaction network 3.100, and/or may be a distinct operating environment.

In FIG. 4.1, a device 1.104 transmits a use request 4.130 to a mediation server 1.102 to use a protected resource 4.102 of a datastore 1.114 (shown as the subject datastore 1.131 in FIG. 4.1). The protected resource 4.102 may be stored in a data node 4.104 of a non-hierarchical data structure 1.114, and in one or more embodiments, a security node 4.110 may reference the data node. The use request 4.130 may include one or more pieces of data that identify which protected resource 4.102 is requested by the device 1.104. For example, the use request 4.130 may include a security node identifier 4.112 (referred to as the SNID 4.112 in FIG. 4.1). A use policy retrieval 4.135 may be effected by the mediation server 1.102 to retrieve a use policy 4.108 associated with the protected resource 4.102. The use policy 4.108 may be stored, for example, within the security node 4.110, and therefore retrieved by the SNID 4.112 that may be submitted in the use request 4.130. As shown and described in conjunction with FIG. 3.1 through FIG. 3.10, the device 1.104 and/or a user of the device 1.104 may make an identity claim 3.120 against a user profile 3.114 associated with the device 1.104 and/or a user of the device 1.104. The identity claim 3.120 may be to effect just-in-time authenticate the user and/or the device 1.104 as part of a request as described in conjunction with FIG. 3.7. The meditation server 1.102 may open a transaction record of a use transaction and evaluate the use policy 4.108 to determine whether an authorized context for use of the protected resource is present based on a set of contextual values that may be gathered and compared to one or more reference values by the mediation server 1.102 when executing the use policy 4.108. For example, the mediation server 1.102 may evaluate a state dataset (e.g., the state dataset 4.200 of FIG. 4.2) from the device 1.104 to determine that the device 1.104 is, for example, within an authorized geospatial location and the use request 4.130 occurs within a permissible time. The mediation server 1.102 may then authorize access to the protected resource 4.102 and generate a set of use terms 4.116 that are delivered to the device 1.104 to be used by a terms engine device-side 1.112B that monitors and enforces ephemerality of data of the protected resource 4.102.

The authorization network 4.100 may then directly deliver the protected resource 4.102, as described below or in one or more preferred embodiments may then use a key system to provide a level of indirection in redemption of a use key 4.118 to obtain data of the protected resource 4.102. The key system may allow for dynamic load balancing and increase security by permitting control of one or more segments of the data of the protected resource 4.102. In the key implementation, the mediation server 1.102 may generate a set of one or more use keys 4.118 and append a protected resource identifier 4.106 (e.g., as a value of the key) to each of the set of one or more use keys 4.118 to generate one or more key-identifier pairs 4.120 (e.g., key-value pairs). The key may be a unique set of alphanumeric characters generated by on or more of the servers. The key-identifier pairs 4.120 may be deposited in the key server 1.108 in a key deposition 4.140 and each may be associated with an expiration condition 4.122. The use key 4.118 may be returned to the device 1.104 in the use key return 4.150. The device 1.104 then submits the use key 4.150 in the redemption request 4.160. The redemption request 4.160 may be transmitted, as shown in FIG. 4.1, to one or more servers (e.g., the datamode microservice 1.130) running the datastore 1.114 (e.g., the subject datastore 1.131). The one or more servers may then submit a key verification 4.170 to the key server 1.108 to verify that the use key 4.118 was issued. Upon verification, the key server 1.108 may extract the PRID 4.106 that is associated with the use key 4.118 and that identifies the protected resource 4.102, and return the PRID 4.106 to the one or more servers (e.g., the datamode microservice 1.130). A data stream 4.180 of data of the protected resource 4.102 may then be delivered to the device 1.104 and monitored in accordance, for example, with the device active data use process flow 4.1000 of FIG. 4.10. If active use of the data of the protected resource 4.102 ends and/or exceeds the authorized context of the use terms 4.116, the terms engine device-side 1.112 may terminate use of the protected resource 4.102 and the mediation server 1.102 may close the open transaction record. The transaction record of the use by the device 1.104 may be recorded in one or more hastories of data organisms within the datastore 1.114, as shown and described throughout this disclosure. In one or more embodiments the security node 4.110 and/or the data node 4.104 may be data organisms 2.100 and the protected resource 4.102 may be stored in the contained data 2.108 of each of the one or more data organisms 2.100.

Each of the processes of the authorization network 4.100 will now be described. FIG. 4.2 is a contextual authorization process 4.250 showing the authorization network 4.100 of FIG. 4.1 receiving a use request 4.130 from the device 1.104, processing an identity claim 3.120, retrieving a use policy 4.108 to evaluate one or more contextual values, depositing a use key 4.118 in a key server 1.108, and returning a use key 4.118 to the device 1.104, according to one or more embodiments. The device 1.104 may store the SNID 4.112 of a security node 4.110 that stores the protected resource identifier 4.106 in a referential attribute 4.302.

When called, the security node 4.110 may deliver the use policy 4.108 to a source of the call (e.g., the mediation server 1.102) and trigger evaluation of a use policy 4.108 that defines an authorized context for which use of the protected resource 4.102 is authorized. The SNID 4.112 may be obtained by previous interaction of the device 1.104 and the subject datastore 1.131. For example, an application program of the device 1.104 may have previously been authorized to generally use data resources of the subject datastore 1.131 that are not protected by a use policy 4.108. The device 1.104 may also include a state dataset 4.200 that may be dynamically updated and/or generated at the time the use request 4.130 is generated. The state dataset 4.200 may include data about a state of the device 1.104 such as a geospatial location, a user of the device 1.104 (e.g., the user 3.303), an application program generating the use request 4.130, a device ID identifying the device 1.104, and/or a time at which the use request 4.130 was generated.

The use request 4.130 may include some identifier (e.g., a unique identifier) of a node within the subject datastore 1.131 that either directly includes the protected resource 4.102 or points to a data node 4.104 that includes the protected resource 4.102. For example the SNID 4.112 may point to the data node 4.104. The use request 4.130 may include the state dataset 4.200 and/or the device root hash 3.602. The state dataset 4.200 and the device root hash 3.602 may be communicated over a first channel of the network 1.101 whereas the device root hash 3.602 may be communicated over a second channel of the network 1.101 including submission through a second device associated with the device 1.104, as described in conjunction with FIG. 3.1 through FIG. 3.10.

The mediation server 1.102 may receive the use request 4.130 over the network 1.101, for example the internet and/or a WAN. The mediation server 1.102 may then communicate the SNID 4.112 to one or more datastore servers, for example the datamode microservice 1.130 comprising the subject datastore 1.131, to retrieve the PRID 4.106 that may directly reference the data node 4.104. The one or more datastore servers look up the security node 4.110 having a referential attribute 4.203 pointing to the data node 4.104 comprising the protected resource 4.102. The security node 4.110 may reference the data node 4.104 by using the PRID 4.106 of the data node 4.104. The security node 4.110 may also include a use policy 4.108.

The use policy 4.108 comprises computer-readable instructions defining an authorized context for which the device 1.104 can use the protected resource 4.102. The computer-readable instructions may include one or more contextual values that are called when the use policy 4.108 is evaluated by the mediation server 1.102. For example, one of the contextual values may request a geospatial coordinate extracted from the state dataset 4.200 to be compared to predetermined value in the use policy 4.108. Another of the contextual values may be called from an external dataset 4.202. The external dataset 4.202 may include any data to be called that is not included within the state dataset 4.200 of the device 1.104 such as a data from a different data organism 2.100, a different data resource, and/or an external API (e.g., a public demographic data, a sports score). For example, the contextual values may require that two professional sports scores from the Entertainment and Sports Programming Network (ESPN) are compared to one another. In the embodiment of FIG. 4.2, the use policy 1.08 defines the following authorized context: (1) the user associated with the device 1.104 must have an email address of foo@foo.com (which may be included within the user profile associated with the user); (2) the device 1.104 is located in North America; and, (3) that the time be between 8 PM Pacific Standard Time and 10 PM Pacific Standard Time. One or more of the contextual values may also require interaction from other users, for example by requiring affirmative manual authorization for use of the protected resource (e.g., from an IT administrator, from an executive of an enterprise). The computer-readable instructions that express the use policy 4.108 may be defined in a Turing-complete language.

The one or more datastore servers return the PRID 4.106 to the mediation server 1.102 along with the use policy 4.108. The mediation server 1.102 then evaluates the use policy 4.108 by calling each of the one or more contextual values. For example, the email address of the user may be drawn from a user profile (e.g., the user profile 3.114) associated with the device 1.104, the time drawn from an internal clock of the mediation server 1.102, and a location extracted from a geospatial coordinate generated by an operating system of the device 1.104 and communicated in the state dataset 4.200. After determining the authorized context for which use of the protected resource 4.102 by the device 1.104 is present in association with the use request 4.130, the mediation server 1.102 may generate one or more use keys (e.g., the use key 4.118A, the use key 4.118B), as shown in FIG. 4.2. The mediation server 1.102 may append the PRID 4.106 of the data node 4.104 to each of the one or more use keys 4.118 to form one or more key-identifier pairs 4.120 (e.g., the key-identifier pair 4.120A, the key-identifier pair 4.120B). More then one use key 4.118 may be utilized where the protected resource 4.102 is to be chunked and delivered in segments. For example, the data of the protected resource 4.102 may be broken into several segments, each of which may be given a segment identifier (e.g., the segment ID 4.302 of FIG. 4.3). The mediation server 1.102 may associate each segment ID 4.302 with each key-identifier pair 4.120 to form a key-identifier-segment triplet. The mediation server 1.102 may then associate an expiration condition 4.122 with each of the one or more key-value pairs 4.120 and/or key-identifier-segment triplet and then may deposit them in key deposition 4.140, along with the expiration condition 4.122, in the key server 1.108. The expiration condition 4.122 may, for example, include data to indicate to a process of the key server 1.108 that the key-identifier pair 4.122 should be deleted after five seconds, one hour, and/or be deleted upon a happening of a specific event. The expiration condition 4.122 may even be short (e.g., one second) as the redemption request 4.160 may occur in a range of hundreds of milliseconds. The same instance of the expiration condition 4.122 or different expiration conditions (e.g., an expiration condition 4.122A, an expiration condition 4.122B) may be appended to each of the key-identifier pairs 4.120A. Additionally, one or more of the key-identifier pairs 4.122 may be automatically deleted regardless of the expiration condition after each has its associated PRID 4.106 called by the one or more datastore servers and extracted by the key server 1.108, as shown in FIG. 4.3.

The terms engine server-side 1.112A of the mediation server 1.102 may generate a use terms 4.116 comprising data instructing the terms engine device-side 1.112B to conform with the authorized context. For example, the use terms 4.116 in the embodiment of FIG. 4.2 may include data specifying that data of the protected resource 4.102 may be used between a set of geospatial coordinates (e.g., which may be determined by the mediation server 1.102 to specify a territory in North America) and between a time of 8 PM PCT to 10 PM PCT. The use terms 4.116 may be a succinct set of computer instructions usable by the device 1.104, the terms engine server-side 1.112A and/or the terms engine device-side 1.112B to determine the set of permissible actions that a particular user and/or device may take in association with the data of the protected resource 4.102. The use policy 4.108, for example, may specify an authorized context with specifies several individual users and allows them use of data in different ways. A given use policy 4.108 may yield a first set of use terms 4.116A for a first use request 4.130 of a first user 1.104A and a second set of use terms 4.116B for a second user 1.104B. The first set of use terms 4.116A may provide a "sub" authorized context based on geospatial constraints while the use terms 4.116B may provide a different sub authorized context based on affirmative permission from an administrator or 30 second only use (e.g., sufficient time to read an abstract of a document). The mediation server 1.102 may then transmit, according to the key return 4.150, a first use key 4.118A, a route 4.206A for the redemption of the first use key 4.118A, and/or the set of use terms 4.116.

FIG. 4.3 is a controlled data delivery process 4.350 showing the contextual authorization network 4.100 of FIG. 4.2 receiving a redemption request 4.160 comprising the use key 4.118A, verifying the use key 4.118A in the key server 1.108, and streaming data of the protected resource 4.102 to the device, according to one or more embodiments. The device 1.104 transmits the use key 4.118A to the one or more datastore servers that may include, for example, the data-mode microservice 1.130. The redemption request 4.160 may be made by way of the route 4.206A (e.g., which may also be referred to as a redemption route) and returned to the device 1.104 by the mediation server 1.102. For example, the route 4.206A that may referred to as a redemption route may be a network address such as a media access control (MAC) address and/or an Internet protocol (IP) address specifying a node of an instance of the network 1.101. In addition to the redemption route a dynamic protocol designation may be conveyed that specifies which communications protocol to use in an interaction with one or more servers (e.g., the redemption). The one or more datastore servers may effect the key verification 4.170 that queries the key server 1.108 with the use key 4.118A. If the use key 4.118A is present (e.g., the expiration condition 4.122A has not transpired), the key server 1.108 may return the PRID 4.106 and/or the segment ID 4.302A to the one or more datastore servers. In addition, the key server 1.108 may return a use key 4.118B of a second segment of the protected resource 4.102, the second use key 4.118B to be returned to the device 1.104 for use a second instance of the redemption request 4.160 (e.g., which may occur automatically when data the protected resource 4.108 as used by the device 1.104 reaches the end of a memory buffer of the device 1.104). After receiving the PRID 4.106, the segment identifier 4.302A and/or the use key 4.118B, the one or more datastore servers may then reference the data node 4.104 comprising the protected resource 4.102, extract a segment matching the segment ID 4.302A, and initiate the data stream 4.180 to the device 1.104 to effect a controlled delivery of a first segment of the protected resource 4.102. The second use key 4.118B and a new route 4.206B may be communicated to the device 1.104 for the next redemption request 4.160. As the data stream 4.180 is received, the device 1.104 may begin to monitor use of the data of the protected resource 4.102 with the terms engine device-side 1.112B. In addition, the terms engine server-die 1.112A may have an open transaction record 4.404 of a use transaction of the device 1.104A to continue monitoring use of the data of the protected resource 4.102 until the use transaction is closed, as shown in FIG. 4.4.

FIG. 4.4 is a terms engine view 4.450 showing the contextual authorization network 4.100 of FIG. 4.3 monitoring use of and enforcing ephemerality of data of the protected resource 4.102 of FIG. 4.1 through a device-side terms engine (e.g., the terms engine device-side 1.112B) associated through the network 1.101 with a server-side terms engine (e.g., the terms engine server-side 1.112A), according to one or more embodiments. In FIG. 4.4, the user 3.303A may be using the device 1.104 to view and/or edit data of the protected resource 4.402 (for example, a document), listen to the protected resource 4.402 (for example, music) and/or view the protected resource 4.402 (for example, a video).

In the embodiment of FIG. 4.4 the mediation server 1.102 includes the terms engine server-side 1.112A having an open transaction record 4.404 of a set of use transactions that are currently active. For example, when the device 1.104A is using the protected resource 4.102 the open transaction record 4.404 may include the use policy 4.108 associated with the protected resource 4.102 (e.g., from the security node 4.110), the state dataset 4.200 of device 1.104 that may be communicated along with the use request 4.130 (and may also include the external dataset 4.202 assembled during evaluation of the use policy), and/or the use terms 4.116A generated for the use request 4.130 of the device 1.104. The open transaction record 4.404 may also include a use identifier 4.402A specifying the use transaction that is open. Although now shown in the embodiment of FIG. 4.4, the open transaction record 4.404 may also include the PRID 4.102 of the protected resource 4.102 such that updates to the use policy 4.108 of the protected resource 4.102 may be matched to the open transaction record 4.404. This may be useful, for example, to effect the policy update 4.501 shown in FIG. 4.5.

The terms engine device-side 1.112B may include an active use ledger 4.400 specifying data of one or more protected resource 4.102 that is in active use by the device 1.104. The terms engine device-side 1.112B may be part of an application program running on the device 1.104 and/or may be a separate process running on the device that monitors use of the data of the protected resource 4.102 and/or enforces ephemerality of the protected resource 4.102 by erasing appropriate memory addresses within the device 1.104 when use of a particular protected resource 4.102 is ends and/or is terminated. In the embodiment of FIG. 4.4 each piece of data may include the use identifier (e.g., the use identifier 4.402A for the first segment of the protected resource 4.102, the use identifier 4.402B for a different protected resource 4.102). For example, the application program on the device 1.104 may display a user interface to the first user 3.303A that includes text (which may be a first protected resource 4.102A) while simultaneously displaying an image (which may be a different protected resource 4.102B). If the user 3.303A switches to a different user interface view not displaying the text and/or the image, the active use may be determined by the terms engine device-side 1.112B to have ended and the data of the protected resource 4.102 (e.g., associated with the use identifier 4.206A) and/or the different protected resource (e.g., associated with the use identifier 4.402B) may be scrubbed from memory one or more memory addresses of the device 1.104. The terms engine device-side 1.112B may also be configured to terminate active use of the data of one or more items monitored within the active use ledger 4.400 when a network connection (e.g., the network connection 1.101) is lost or unreliable. The active use, for example, may be relatively frequent direct interaction (e.g., providing input such as typing or switching between screens every few seconds, minutes or hours). The active use may also be based, for example, upon a screen that is currently shown on a display of the device 1.104, whether one or more application programs is analyzing data, and/or whether an audio track has been paused or a video volume muted. In addition, the terms engine device-side 1.112B may terminate active use of one or more protected resources 4.102 where the state dataset 4.200 (which may be dynamically changing as time increases and/or the device 1.104 changes location) no longer conforms to one or more parameters and/or programmatic terms of the use terms 4.116 stored in the terms-engine device-side 1.112B. Active monitoring by the device 1.104 is shown and described in conjunction with the process flow 4.1000 of FIG. 4.10. The mediation serer 1.102 may also instruct the device 1.104 to terminate active use of the data of one or more protected resources 4.102, as shown and described in conjunction with FIG. 4.5.

FIG. 4.5 is a real-time revocable authorization process 4.550 by which data of the protected resource 4.102 in active use by the device 1.104 may have use terminated based on an updated use policy 4.502 generated by a second user 3.303B in control of the protected resource 4.102, a termination notice 4.506 and/or a termination report 4.508 generated by the device 1.104 and transmitted to the mediation server 1.102 to close the use transaction, according to one or more embodiments. In FIG. 4.5 a second user 3.303B may communicate over an instance of the network 1.101 with one or more datastore servers containing the protected resource 4.102, for example the subject datastore 1.131, using the device 4.504 (e.g., a smartphone, a different server, a desktop computer, a notebook computer). The user 3.303B may generate the policy update 4.501 that changes the use policy 4.502 defining the authorized context for which use of the protected resource is authorized. For example, the user 3.303B may modify the use policy 4.108 of the security node 4.110 to define additional contextual values or changed values and/or additional parameters in which the contextual values are compared to define the authorized context.

Upon receipt of the updated use policy 4.502, the one or more datastore servers may transmit the PRID 4.106 of the protected resource 4.102 receiving the policy update 4.501 to the key server 1.108. They key server 1.108 may immediately expire all keys associated with the PRID 4.106. The updated use policy 4.502 along with the PRID 4.106 associated with the update use policy 4.502 may be communicated through the network 1.101 in the mediation server 1.102 where it is matched with the open transaction record 4.404. The terms engine server-side 1.112A may then re-evaluate the updated use policy 4.502 using the stored state dataset 4.200 received by the mediation server 1.102 in association with of the use request 4.130. The terms engine server-side 1.112A may also query the device 1.104 for an update use policy 4.500 and re-evaluate the updated use policy 4.502 with the updated state dataset 4.500. If the use by the device 1.104 no longer conforms to the authorized context based on the updated use policy 4.502, the terms engine server-side 1.112A may transmit a termination notice to the terms engine device-side 1.112B to end use of the data of the protected resource 4.102. Otherwise, the terms engine server-side 1.112 may generate the updated use terms 4.116 and transmit them through the network 1.101 to the device 1.104. Once received by the device 1.104, the updated use terms may replace the existing use terms (e.g., the updated use terms 4.516 may replace the use terms 4.116A). The terms engine device-side 1.112B may then continue to monitor active use of the data of the protected resource 4.102 for conformance with the updated use terms 4.516 that define the particular authorized context.

Where active use of the data of the protected resource 4.102 is terminated, the device 1.104 may generate a termination notice 3.406 and/or a termination report 4.508. The termination notice 4.506 may be generated, for example, where the terms engine device-side determines that the use by the device 1.104 does not conform to the use terms 4.116 stored in the active use ledger 4.400. The termination notice 4.506 may be transmitted through the network 1.101 to the mediation server 1.102. Once received, the terms engine server-side 1.112A may close the open transaction record 4.404 to end the use transaction. The termination notice 4.506 may also be generated when network connectivity is lost but may be late transmitted to the mediation server 1.102 when network connectivity is re-established. In addition to the termination notice 4.506, the terms engine device-side may generate the termination report 4.508 specifying which actions the device 1.104 and/or the first user 3.303A of the device 1.104 took outside the scope of the authorized context (e.g., against an applicable instance of the use terms 4.116). The use transaction, which may include data of the termination report 4.508, may be deposited in a block of one or more hastoreis 2.104 of one or more data organisms 2.100 in accordance with FIG. 2.1 through FIG. 2.11. For example the use transaction record may be deposited as a transaction record 2.302 in a profile hastory 3.104 of a user profile 3.114 associated with the user 3.303A and/or the user 3.303B. The use transaction record may also be deposited in a file hastory 2.1104 (e.g., of the data node 4.104), an application hastory 2.1106 associated with an application program for which the protected resource 2.102 is an application resource, and/or a hastory of the security node 4.110. Where an identity of a user profile 3.114 associated with the device 1.104 and/or the user 3.303A is updated, the mediation server 1.102 may transmit data usable to assemble the transaction record 4.402 of the use transaction through one or more channels to the device 1.104 to be assembled and used in evolving the identity of the device hastory 3.108 to yield a new device root hash 3.602, as shown and described in conjunction with FIG. 3.1 through FIG. 3.10.

In an alternate embodiment not shown in FIG. 4.1 through FIG. 4.6, after determining the authorized context is present the mediation server 1.102 may authorize use of the protected resource 4.102 and effect the data stream 4.180 of FIG. 4.1. The terms engine device-side 1.112B may automatically erase the data of the protected resource 4.102 according to a simple set of terms, for example after five seconds, when the data of the protected resource 4.102 is not in active use, and/or when a network connection is lost and/or unreliable.

FIG. 4.6 is a use key generation process flow 5.600 illustrating a process by which the contextual values of the use policy 4.108 may be evaluated and the use key 4.118 of FIG. 4.2 may be generated, according to one or more embodiments. Operation 4.602 receives a use request 4.130 from the device 1.104. The use request 4.130, for example, may be received by the mediation server 1.102 and/or a different server of the data resource control network 1.100. Operation 4.604 may open a use transaction, for example by generating the open transaction record 4.404 within the terms-engine server-side 1.112A. In operation 4.606, the state dataset 4.200 is extracted from the use request 4.130.

For example, a device ID, an application program ID, one or more geospatial coordinates, an operating system of the device 1.104, data related to use of data resources and/or additional data may be pulled from a protocol conveying the use request 4.130. Operation 4.608 extracts a use policy 4.108 from one or more datastores 1.114, for example from the data node 4.104 and/or the security node 4.110. Operation 4.610 gathers one or more contextual values that may be present in the use policy 4.108. The values of the contextual values may be draw from the state dataset 4.200 and/or the external dataset 4.202 (both of which may be collectively referred to as a contextual dataset). The external dataset 4.202 may be any data not received from or associated with the device 1.104. For example, to assemble the external dataset 4.202 the mediation server 1.102 may retrieve values from one or more data resources and/or data organisms 2.100 (e.g., a service level associated with a user profile 3.114), and/or values from sources outside the data resource control network 1.100, such as weather events, government statistics, and/or values drawn from a distributed consensus network. Operation 4.612 may generate a set of use terms 4.116 from the use policy 4.108, for example by evaluating computer-readable instructions of the use policy 4.108 and/or using data received by calling the contextual values to generate specific permissible use parameters for the use request 4.130.

FIG. 4.7 is a continued process flow 4.700 of the use key generation process flow 4.600 of FIG. 4.6, illustrating a process by which the contextual values of the use policy 4.108 may be evaluated and the use key 4.118 of FIG. 4.2 may be generated, according to one or more embodiments. Operation 4.614 is a decision that determines whether use of data of the protected resource 4.102 by the device 1.104 conforms to the authorized context of the use policy 4.108. For example, contextual values may be compared to value ranges using comparators within the computer-readable instructions of the use policy 4.108. If the use request 4.130 does not conform to the authorized context, operation 4.616 may generate an error message that may be returned to the device 1.104, and operation 4.618 may close the open transaction record 4.404 of the terms engine device-side 1.112A. If use by the device 1.102 conforms to the authorized context, operation 4.620 determines whether the protected resource 4.102 is to be segmented. The data node 4.104, the security node 4.110, the use policy 4.108 and/or the data resource 4.102 may include data specifying how the data resource 4.102 is to be segmented. Alternatively, one or more servers may automatically segment the protected resource 4.104, for example in ten second segments where the protected resource 4.102 is an audio file and/or individual paragraphs where the protected resource 4.102 is a text file (e.g., a segmented file in XML format, a PDF, and/or a markdown file). If the data of the protected resource 4.102 is to be segmented, operation 5.624 generates two or more segment identifiers (e.g., the segment IDs 4.302 of FIG. 4.3) and operation 4.626 generates two or more use keys 4.118, appends the PRID 4.106 to each of the two or more use keys to form two or more key-identifier pairs 4.120, and the may further append the segment identifiers to form two or more key-identifier-segment triplets (which still comprises the key-identifier pair 4.120). Where it is determined in operation 4.620 that protected resource 4.620 does not include segments, operation 4.622 generates a use key 4.118 and appends the PRID 4.106 to form a key-identifier pair 4.120. Additional processes may then return one or more use keys 4.118 to the device 1.104 to be submitted in the redemption request 4.160 and to deposit the one or more key-identifier pairs 4.120 and/or key-identifier-segment triplets in the key-server 1.108 for the key verification 4.170. However, in one or more other embodiments the keys need not be generated simultaneously. For example, a use key 4.118B may be generated when a process of the device determines that data associated with a first segment (obtained by redemption of the first use key 4.118A) is nearing the end of a memory buffer or otherwise required by the user.

FIG. 4.8 is a use request evaluation process flow 4.800 showing a process for authorizing use of a protected resource 4.102 according to a set of computer-readable instructions of a use policy 4.108, according to one or more embodiments. Operation 4.802 receives a use request 4.130 from a device 1.104 to use a protected resource 4.102 stored in a data node 4.104 of a data structure within a datastore 1.114. In one or more embodiments, the data structure may be a non-hierarchical data structure. A hierarchical data structure is a data structure that includes a set of nodes, all of which except one are subordinate to one of the set of nodes. Specifically, each child node has only one parent node, whereas each parent node can have one or more child node. In order to retrieve data from a hierarchical data structure, a tree structure may need to be traversed starting from a root node of the hierarchy (not to be confused with the root node of the Merkle tree of FIG. 2.4 or any of the root hashes discussed in the present embodiments). A non-hierarchical data structure may include, for example, a graph data structure in which a set of data objects that may be collections of attribute-value pairs may reference one another using one or more referential attributes. The references may form a directed acyclic graph that may be known to those in the art. In one or more preferred embodiments, the data resources and/or the data organisms 2.100 are stored in a proprietary semantic data structure disclosed by a related inventive entity and/or common assignee of the present disclosure. The semantic data structure may use "domains" as the data nodes 4.104 that may be flexibly related to model any relationship by using referential attributes. The domains may be data resources, data organisms 2.100, and/or protected resources that may act as containers of not only a primitive data such as a document or video (e.g., the primitive data itself may be an example of a data resource), but may also store a hastory 2.104, referential attributes, the use policy 4.108, ownership information, a unique identifier, and/or additional data.

Operation 4.804 extracts from the data node 4.104 and/or a security node 4.110 having a referential attribute 4.203 pointing to the data node 4.104 a use policy 4.108 including computer-readable instructions defining an authorized context for which the device 1.104 can use the protected resource 4.102 based on one or more contextual values. Operation 4.806 initiates a use transaction (which may be, in one or more embodiments, an instance of the transaction 2.200 of FIG. 2.2 that is recorded in one or more hastories 2.104) that executes the computer-readable instructions of the use policy 4.108 to gather one or more contextual values and to determine whether the use request 4.130 satisfies the authorized context for which the device 1.104 can use the protected resource 4.102. Operation 4.808 authorizes access to the protected resource 4.102 by the device 1.104 when it is determined based on the contextual values that the use request (e.g., the use request 4.130) conforms to the authorized context for which the device 4.104 may use the protected resource. For example, the use policy 4.108 may require that the protected resource 4.102 may only be accessed and/or used when the device 1.140 is within a geospatial boundary around an enterprise headquarters and when the use request 4.130 is within business hours of the enterprise. Operation 4.810 generates a use terms 4.116 from the computer-readable instructions defining the authorized context for the use request 4.130. For example, depending on the use policy 4.108, a different set of use terms may be generated for a device 1.104 of a first user and a device 1.104 of a second user.

FIG. 4.9 is a key generation and redemption process flow 4.900 showing, subsequent to evaluation of the contextual values of the use policy 4.108 of FIG. 4.1, a process by which the use keys 4.118 may be generated, returned to the device 1.104, and redeemed upon a redemption request 4.160 by the device 1.104, according to one or more embodiments. Operation 4.902 generates a set of one or more use keys 4.118 and appends an identifier of a protected resource (e.g., the PRID 4.102) to each of the set of one or more use keys 4.118 to form one or more key-identifier pairs 4.120. Operation 4.904 associates an expiration condition 4.122 with each of the one or more key-identifier pairs 4.120, and operation 4.906 optionally divides data of the protected resource 4.102 into two or more segments and may attach a segment identifier to each (e.g., two or more instance of the segment ID 3.402) of the one or more key-identifier pairs 4.120. The result may be referred to as a key-identifier-segment triplet (that includes the key-identifier pair 4.120). The key-identifier pairs 4.120 and/or the key-identifier-segment triplets may be deposited in a server such as the key server 1.108. The key server 1.108 may be configured to monitor each expiration condition 4.122 of each and effect rapid verification of validity of the use keys 4.118 when queried by one or more servers. Operation 1.102 returns a first use key 4.118A of the set of one or more use keys 4.118 to the device 1.104 through the network 1.101. The mediation server 1.102 may transmit the first use key 4.118A. Operation 4.910 may receive a redemption request 4.160 from the device 1.104 including the first use key 4.118A, and operation 4.912 may verify the first use key 4.118A by determining, for example, that a PRID 4.106 is associated with the use key 4.118A within at least one key-identifier pair 4.120 that has not expired.

Operation 4.914 extracts the identifier of the protected resource (e.g., the PRID 4.106) from a first key-identifier pair 4.120A of the one or more key-identifier pairs 4.120 and retrieves the protected resource 4.102 with the identifier of the protected resource 4.102. For example, the key server 1.108 may extract the PRID 4.106 and the datamode microserver 1.130 may retrieve the protected resource 4.104 within the datastore 1.114 (e.g., the subject datastore 1.131). Operation 4.916 streams the protected resource 4.102 to the device 1.104 for use by the device 1.104, optionally including a second use key 4.118B of a second segment identifier (e.g., the segment ID 4.302B). Additionally, operation 4.916 may convey the route 2.306B for the next redemption request. Operation 4.918 may then receive a continued use request automatically generated by the device 1.104 when the first segment of the data of the protected resource 4.102 approaches an end of a memory buffer of the device 1.104, the continued use request including the second use key 4.118B of the one or more use keys 4.118. The second use key 4.118B may be conveyed using the route 4.206B provided to the device 1.104. The route 4.206B, for example, may include an IP address of a content delivery server closest to the device 1.104 (that may include some or all of the data resources of the datastore 1.114). Operations 4.916 and operations 4.918 may then repeat for additional segments of the protected resource 4.102, each segment streamed to the device 1.104 may include a new use key 4.118 of the set of one or more use keys 4.118 and may include a new instance of the route 4.206.

FIG. 4.10 is a device active data use process flow 4.1000 showing a process that can be used to monitor use of the protected resource 4.102 by the device 1.104 and/or enforce ephemerality of the protected resource 4.102 on the device 1.104 in accordance with the use policy 4.108 and a set of use terms 4.116 generated based on the use policy 4.108, according to one or more embodiments. Operation 4.1001 may redeem a use key 4.118, for example from one or more datastore servers and according to a network address specified by a route 4.206. Operation 4.1002 receives a data stream of the protected resource 1.104 (e.g., the data stream 4.180 of FIG. 4.1). Operation 4.1004 deposits a use ID (e.g., the use identifier 4.402 of FIG. 4.4) and a use terms 4.116 in an active use ledger 4.400 of the device 1.104. In operation 4.1006, the device 1.104 and/or an application program of the device 1.104 uses the data of the protected resource 4.102, for example by viewing a document, playing an audio track, and/or visualizing a report (e.g., graphs, charts) based upon data of the protected resource 4.102. While the data of the protected resource 4.102 is in use, operation 4.1008 and operation 4.1012 through operation 4.1016 may monitor its use. Operation 4.1008 determines if the data is in active use. The definition of active use may be pre-set within the terms engine device-side 1.112B and/or may be defined by the use terms 4.116. For example, the use terms 4.116 may specify that data is not in active use when it is not currently displayed on a screen of the device 1.104, where the user has not provided an input for a predetermined period of time (e.g., 30 seconds, 1 hour) where the device 1.104 and/or an application of the device 1.104 has been inactive, or when a display of the device 1.104 is powered down by the operating system. If the data is no longer in active use, operation 4.1010 determines whether there are additional segments and whether the active use terminated due to a current segment of data of the protected resource 4.102 reaching or nearing the end of a memory buffer. For example, operation 4.1010 may determine that an additional segment should be retrieved where a segment of audio is about to end. Operation 4.1010 may also determine whether additional segments of the protected resource 4.102 exist by checking if additional use keys (e.g., the use key 4.118B) were returned to the device 1.104 in association with operation 4.1002. To retrieve additional segments, operation 4.1010 returns to operation 4.1000 which redeems the a next use key (e.g., the use key 4.118B). If no additional segments are to be retrieved, operation 4.1010 proceeds to operation 4.1018 which may delete data of the protected resource 4.104 at one or more memory addresses tracked by the terms engine device-side 1.112B and/or scrub the memory buffer of the device 1.104. Operation 4.1020 may then generate a termination notice 4.506 and/or a termination report 5.408 and one or more servers may close an open transaction record 4.404 of the use transaction by the device 1.104.

If the data of the protected resource 4.102 continues to be in active use, operation 4.1008 proceeds to operation 4.1012 that is a decision process that determines whether updated use terms 4.516 have been received. If so, operation 4.1012 proceeds to operation 4.1004 that may then deposit the updated use terms 4.516 in place of the use terms 4.116. If no updated use terms 4.516 have been received, operation 4.1014 determines whether a network connection remains established over the network 1.101 (e.g., between the device 1.104 and one or more servers of the authorization network 4.100). The network connection may be considered to be lost if, for example, a latency of a predetermined threshold value is reached. If no network connection remains, operation 4.1014 may proceed to operation 4.1018. If a connection remains established, operation 4.1014 may proceed to operation 4.1016 that evaluates the active use of the data of the protected resource 4.102 to determine whether it conforms to the use terms 4.116 and/or, where applicable, the updated use terms 4.516. For example, a set of geospatial coordinates within the use terms 4.106 may require that the active use occur within a given municipality. If the state dataset 4.200 of the device, as may be retrieved from an operating system of the device 4.102, indicates the coordinates are outside of the geospatial coordinates of the municipality, operation 4.1016 may proceed to operation 4.1018. Otherwise, operation 4.1016 returns to operation 4.1006.

FIG. 4.11 is a use termination process flow 4.1000 illustrating a process by which an open transaction record 4.404 of the active use of the protected resource 4.102 is closed the protected resource 4.102 is determined to no longer be in active use, a network connection to the device 1.104 was lost, and/or the device 1.104 performed an action outside of the use terms 4.116, according to one or more embodiments. Operation 4.1102 maintains an open transaction record 4.404 of a use transaction and stores one or more contextual values usable to determine an authorized context (e.g., values of the state dataset 4.200 and/or the external dataset 4.202), the open transaction record 4.404 associating a device 1.104 with an active use of a protected resource 4.102. Operation 4.1104 returns the use terms 4.116 generated from a set of computer-readable instructions (e.g., the set of computer-readable instructions of the use policy 4.108) to the device 1.104. Operation 4.1106 may monitor use of and enforce ephemerality of the protected resource 4.102 on the device 1.104 by maintaining a ledger (e.g., the active use ledger 4.400) including data identifying the protected resource (e.g., the use ID 4.402) that is in active use by the device and a corresponding instance of the use terms 4.116 associated with the authorized use of the protected resource 4.102. As shown in conjunction with FIG. 4.5, operation 4.1108 receives from a second user (e.g., the second user 3.303B) a policy update 4.501 that alters the computer-readable instructions of the use policy 4.108 defining the authorized context for use of the protected resource 4.102. The result may be the updated use policy 4.502. Operation 4.1110 determine the open transaction record 4.404 is associated with the protected resource 4.102 and the device 1.104. For example, one or more of the datastore servers that include the data node 4.104 storing the protected resource 4.102 may transmit the updated use policy 4.502 to the mediation server 1.102 along with the PRID 4.106. The mediation server 1.102 may then use the PRID 4.106 or another method to locate open transaction records 4.404 associated with the PRID 4.106.

4.1112 re-generates the use terms 4.116 to an updated use terms 4.516 based on the stored one or more contextual values (e.g., the state dataset 4.200) and/or a new set of gathered values (e.g., the updated state dataset 4.500) to form a new instance of the authorized context. Operation 4.1114 then pushes the updated use terms 4.516 generated from the policy update 4.501 to the device 1.102. Operation 4.1116 processes a termination notice. For example the termination notice may be a termination notice 4.506 that the protected resource 4.102 is no longer in active use by the device and/or that use of the protected resource 4.102 has been automatically terminated where the device 4.102 performed an action outside of the use terms 4.116 and/or the updated use terms 4.516. The termination notice may also be generated by a server of the authorization network 4.100, for example where a network connection to the device 4.102 is lost. Finally, in operation 4.1118, the result of the termination notice (e.g., the termination notice 4.506) may be logged, the open transaction 4.404 record may be closed, and optionally one or more hastories 2.104 may be updated with a transaction record 2.302 of the use transaction.

The authorization network 4.100 provides a number of advantages. Permissions of a data resource through the use policy are both flexible and can relatively easily defined for each protected resource. The use policy based on gathering contextual values is able to compare those values, for example to determine by defining inputs to be extracted from a gathered external dataset that a user may use a particular protected resource only where one sports score is larger than another sports score. In a specific example, if an employee of an enterprise asks for access to a protected resource the employee is not generally permissioned to use, contextual access and/or use controls through the use policy may be placed by an administrator rather than add the employee to a group that may over-permission the employee. This may prevent compromise of an entire group of protected resources if, for example, the employee loses his or her identity credentials that allow access to an entire group of protected resources. Similarly, a musician may wish to share a digital asset such as music with a fan, but only wish to control how many times the fan can listen to that music on the fan's device, which may substantially increase the economic value of the music to the artist. The use policy 4.108 may even be able to respond to events of the device. For example, where a 3D computer aided design file (CAD) is streamed to the device for single time use, an error of the 3D printer during the manufacturing process may be reported back to one or more servers and the use policy may include computer-readable instructions to interpret the error and re-stream the 3D CAD file.

The data authorization network 4.100 may also be able to implement use controls over data without a separate external system for storing permissions such as an access control list. This may decrease computing overhead in resolving authorization requests, allowing the authorization network 4.100 and/or the data resource control network 1.100 to scale, both in the number of users that can interact and the number of authorization requests per each user that can be quickly resolved. Association of both a protected resource and the use policy defining the authorized context may also make it easier for users to determine which controls are associated with which protected resources and/or whether a data resource is unprotected, improving data security and control.

Finally, the authorization network 4.100 may be able to implement a capability-based control system with real-time revocable authorization of protected resources. As a result, protected resources may not leave the control of the authorization network 4.100, e.g., through use of the terms engine. There is therefore a much higher probably that control of the protected resources, along with associated data about their use that may be valuable for analysis and insight, is retained by an owner and/or an organization running the datastore.

An example of the authorization network will not be provided within the context of an enterprise. FIG. 4.12 is an enterprise use policy view 4.1250 illustrating use of the use policy 4.108 to define an authorized context for limited access and use of a protected resource that is a confidential spreadsheet 4.1202, the authorized context including flexible controls such as a requirement that an executive of the enterprise (e.g., a corporate executive office 4.1203A, the corporate financial officer 4.1203B) be within a geospatial fence of the business premises 4.1200 for an employee

4.1203C to view the confidential spreadsheet 4.1202, according to one or more embodiments. The confidential spreadsheet 4.1202 may be a protected resource stored in a first datastore server 1.106A (e.g., within the data node 4.104 of FIG. 4.1). The datastore server 1.106B may store the control policy 4.108 defining an authorized context for access to and use of the confidential spreadsheet 4.1202. The business premises 4.1200 may be an office building or other physical location and may be specified as a "geofence" which may be a set of geospatial coordinates forming a bounded area. Each of the devices and servers in FIG. 4.12 may be connected through one or more networks. The device 1.104A and the device 1.104B are communicatively coupled to the datastore server 1.106B through a cellular network that may have a capability of transferring IP packets (e.g., by a protocol such as 3G, LTE).

The use policy 4.108 of FIG. 4.12 is implemented to provide careful scope over access to and use of the confidential spreadsheet 4.1202 as it may contain vital trade secrets such as revenue of the enterprise or key business strategy. In a detailed example, the use policy 4.108 may specify a complex authorization scheme. First, any executive of the enterprise (including the CEO 4.1203A and the CFO 4.1203B) may view the spreadsheet 4.1202 in any geospatial location as long as another executive of the enterprise is within 100 yards of the executive. This determination of proximity may be made based up one or more state datasets 4.200 retrieved from devices of the executives (e.g., the device 1.104A, the device 1.104B). Second, the control policy may specify that an employee of the enterprise may have access to the confidential spreadsheet 4.1202 if: (1) at least one executive is within the geospatial boundary of the business premises 4.1200; (2) if the use request (e.g., the use request 4.130) for the confidential spreadsheet 4.1203 originates from a specific set of Ethernet network addresses associated with a local area network of the business premises 4.1200; and (3) if the use request is generated between business hours (e.g., between 8 AM to 6 PM).

The employee 4.1203 may need to see a couple calculations or numbers within the confidential spreadsheet 4.1202. After the employee 4.1203C is authenticated (e.g., by the process described in conjunction with FIG. 3.1), the employee 4.1203C may submit a use request to the mediation server 1.102 including an SNID 4.112 of the security node 4.110 storing the use policy 4.108 and reference the data node 4.104 that stored the confidential spreadsheet 4.1202. The mediation server 12.02 may execute the one or more conditionals of the use policy 4.108 and retrieve one or more contextual values such as the Ethernet address of the device 1.104C, a geospatial coordinate of at least one of the device 1.104B and 1.104A, and a time as may be maintained on an internal clock of the mediation server 1.102. After evaluating the use policy 4.108, the mediation server 1.102 may create an open transaction record 4.404 in transaction engine 1.110 and/or the terms engine server-side 1.112, generate a use terms (e.g., the use terms 4.116 of FIG. 4.1), and generate and deliver a set of use keys 4.118 for multiple segments of the confidential spreadsheet 4.1202, for example each page.

The mediation server 1.102 may return a first use key 4.116A corresponding to a first page of the confidential spreadsheet 4.1202. An application program of the device 1.104C may then redeem the first use key 4.116A for the first page (along with a second use key 4.116B which may also be returned at the same time as the first page). When the user 4.1203C determines that what he or she wishes to see is on the next page, the key 4.116B is redeemed. As a second page of the confidential spreadsheet is streamed to the device 1.104C, the first page may no longer be in "active use" by device 1.104C according to the use terms 4.116 stored on the terms engine device-side 1.112B and may therefore be automatically scrubbed form a memory of the device 1.104C. If the employee 4.1203C takes a screenshot capture of the active page in contradiction to the use terms 4.116, the terms engine device-side may terminate use of the confidential spreadsheet 4.1202, and generate and convey a termination report 4.508 to the mediation server 1.102. The mediation server 1.102 may instruct the key server 1.108 to delete all use keys, may close the open transaction record (e.g., the use transaction) and then have the transaction record deposited in one or more hastories. Additionally, the use policy 4.108 specifies that based upon the termination report 4.508 the executive at the business premises 4.1200 (e.g., the CFO 4.1203B) should have a notification sent to his or her device (e.g., the device 1.104B). Similarly, the use may be terminated where a network connection between the device 1.104C and the mediation server 1.102 is lost, or where all executives leave the geospatial boundary of the business premises 4.1200 as may be periodically polled by the mediation server 1.102. The transaction record generated from the use of the confidential spreadsheet 4.1202 may be deposited directly into a hastory of the security node 4.110 referencing the data node 4.104 such as to create an immutable record of the transaction that may be used in auditing and/or accounting of protected resources of the datastore 1.114.

Although the present embodiments have been described with reference to specific example embodiments, it will be evident that various modifications and changes may be made to these embodiments without departing from the broader spirit and scope of the various embodiments. For example, the various devices, servers and engines described herein may be enabled and operated using hardware circuitry (e.g., CMOS based logic circuitry), firmware, software or any combination of hardware, firmware, and software (e.g., embodied in a non-transitory machine-readable medium). For example, the various electrical structure and methods may be embodied using transistors, logic gates, and electrical circuits (e.g., application specific integrated (ASIC) circuitry and/or Digital Signal Processor (DSP) circuitry).

In addition, it will be appreciated that the various operations, processes and methods disclosed herein may be embodied in a non-transitory machine-readable medium and/or a machine-accessible medium compatible with a data processing system (e.g., the device 1.104A, the mediation server 1.102, one or more servers 1.106, the key server 1.108). Accordingly, the specification and drawings are to be regarded in an illustrative rather than a restrictive sense.

The structures and engines in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the preceding disclosure.

We claim:

1. A computer-implemented method for authorizing and controlling use of a data resource, the method comprising:
   receiving a use request from a device to use a protected resource stored in a data node of a non-hierarchical data structure within a datastore,
      wherein the data node comprising an identifier whereby the data node is addressable within the datastore;
   extracting from at least one of the data node and a security node having a referential attribute pointing to the data node a use policy comprising computer-readable instructions defining an authorized context for which the device can use the protected resource based on one or more contextual values;
   initiating a use transaction that executes the computer-readable instructions of the use policy to gather the one or more contextual values and to determine whether the use request satisfies the authorized context for which the device can use the protected resource;
   authorizing access to the protected resource by the device when it is determined that based on the one or more contextual values that the use request conforms to the authorized context for which the device may use the protected resource;
   generating a set of one or more use keys and appending the identifier of the protected resource to each of the set of one or more use keys to form one or more key-identifier pairs;
   returning a first use key of the set of one or more use keys to the device;
   receiving a redemption request from the device comprising the first use key and verifying the first use key;
   streaming the protected resource to the device for use by the device.

2. The method of claim 1,
   extracting the identifier of the protected resource from a first key-identifier pair of the one or more key-identifier pairs and retrieving the protected resource with the identifier of the protected resource; and
   associating an expiration condition with each of the one or more key-identifier pairs;
   generating a use terms from the computer-readable instructions defining the authorized context for the use request;
   maintaining an open transaction record of the use transaction and storing the one or more contextual values usable to determine the authorized context, the open transaction record associating the device with an active use of the protected resource; and
   returning the use terms generated from the computer-readable instructions to the device,
      wherein a process of the device operable to monitor use of and enforce ephemerality of the protected resource by maintaining a ledger comprising data identifying the protected resource that is in the active use by the device and a corresponding instance of the use terms associated with the authorized use of the protected resource.

3. The method of claim 2, further comprising:
   processing a termination notice that at least one of: (i) the protected resource is no longer in the active use by the device, (ii) a network connection to the device is lost, and (iii) use of the protected resource has been automatically terminated where the device performed an action outside of the use terms.

4. The method of claim 3, further comprising:
   receiving a policy update from a second user that alters the computer-readable instructions of the use policy defining the authorized context for use of the protected resource;
   determining the open transaction record is associated with the protected resource and the device;
   re-generating the use terms to an updated use terms based on at least one of the one or more contextual values stored and a new set of contextual values to form a new instance of the authorized context; and
   pushing the updated use terms generated from the policy update to the device.

5. The method of claim 3, wherein the termination notice including a termination report specifying the action outside the use terms.

6. The method of claim 3, further comprising:
   logging a result of the termination notice and closing the open transaction record;
   dividing data of the protected resource into two or more segments and attaching a segment identifier to each of the one or more key-identifier pairs,
      wherein data of the protected resource transmitted to the device is a first segment of the two or more segments,
      wherein the data of the protected resource transmitted to the device includes a second use key of the one or more use keys; and
   receiving a continued use request automatically generated by the device when the first segment of the data of the protected resource approaches an end of a memory buffer of the device, the continued use request comprising the second use key of the one or more use keys.

7. The method of claim 1,
   wherein the use request comprising a state dataset specifying a current state of the device, and
   wherein at least one of the one or more contextual values are called from the state dataset specifying the current state of the device.

8. The method of claim 1, further comprising:
   conveying a redemption route and a dynamic protocol designation with the at least one of the set of one or more use keys returned to the device; and
   terminating a first key-identifier pair of the one or more key-identifier pairs after streaming the protected resource to the device irrespective of an expiration condition.

9. A computer-implemented method for authorizing and controlling use of a data resource, the method comprising:
   receiving a use request from a device to use a protected resource stored in a data node of a non-hierarchical data structure within a datastore,
   extracting from at least one of the data node and a security node having a referential attribute pointing to the data node a use policy comprising computer-readable instructions defining an authorized context for which the device can use the protected resource based on one or more contextual values;
   initiating a use transaction that executes the computer-readable instructions of the use policy to gather the one or more contextual values to determine whether the use request satisfies the authorized context for which the device can use the protected resource;
   authorizing access to the protected resource by the device when it is determined that each of the one or more contextual values called by the use policy conforms to the authorized context for which the device may use the protected resource;

generating a use terms from the computer-readable instructions defining the authorized context for the use request;

returning to the device the use terms generated from the computer-readable instructions; and streaming the protected resource to the device, wherein the device comprising a process of the device operable to monitor use of and enforce ephemerality of the protected resource by maintaining a ledger comprising data identifying the protected resource that is in an active use by the device and a corresponding instance of the use terms associated with the authorized use of the protected resource.

10. The method of claim 9, further comprising:

processing a termination notice that at least one of: (i) the protected resource is no longer in the active use by the device, (ii) a network connection to the device is lost, and (iii) use of the protected resource has been automatically terminated where the device performed an action outside of the use terms.

11. The method of claim 9, wherein the use request comprising a state dataset specifying a current state of the device, and wherein at least one of the one or more contextual values are extracted from the state dataset specifying the current state of the device.

12. The method of claim 9, further comprising:

maintaining an open transaction record of the use transaction and storing the one or more contextual values usable to determine the authorized context, the open transaction record associating the device with the active use of the protected resource;

receiving from a second user a policy update that alters the computer-readable instructions of the use policy defining the authorized context for use of the protected resource;

determining the open transaction record is associated with the protected resource and the device;

re-generating the use terms to an updated use terms based on at least one of the one or more contextual values stored and a new set of contextual values form a new instance of the authorized context; and pushing the updated use terms generated from the policy update to the device.

13. The method of claim 9, further comprising:

generating a set of one or more use keys and appending an identifier of the protected resource to each of the set of one or more use keys to form one or more key-identifier pairs;

associating an expiration condition with each of the one or more key-identifier pairs;

returning a first use key of the set of one or more use keys to the device;

receiving a redemption request from the device comprising the first use key and verifying the first use key;

extracting the identifier of the protected resource from a first key-identifier pair of the one or more key-identifier pairs and retrieving the protected resource with the identifier of the protected resource; and terminating the first key-identifier pair after streaming the protected resource to the device irrespective of the expiration condition.

14. The method of claim 13, further comprising:

dividing data of the protected resource into two or more segments and attaching a segment identifier to each of the one or more key-identifier pairs, wherein the data of the protected resource transmitted to the device is a first segment of the two or more segments, wherein the data of the protected resource transmitted to the device includes a second use key of the one or more use keys; and receiving a continued use request automatically generated by the device when the first segment of the data of the protected resource approaches an end of a memory buffer of the device, the continued use request comprising the second use key of the one or more use keys.

15. The method of claim 9, further comprising:

logging a result of the termination notice and closing an open transaction record of the use transaction and storing the one or more contextual values usable to determine the authorized context, the open transaction record associating the device with the active use of the protected resource;

conveying a redemption route and a dynamic protocol designation with the at least one of a set of one or more use keys returned to the device, wherein the termination notice including a termination report specifying an action outside the use terms, and wherein the data node comprising an identifier whereby the data node is addressable within the datastore.

16. A system comprising:

one or more datastore servers comprising computer readable instructions that when executed on one or more processors of the one or more datastore servers:

store a data node comprising a protected resource, extract from the data node a use policy comprising computer-readable instructions defining an authorized context for which a device can use the protected resource based on one or more contextual values, and transmit the protected resource to the device for use by the device upon receipt of an identifier of the protected resource;

a transaction engine comprising computer readable instructions that when executed:

initiate a use transaction that executes the computer-readable instructions of the use policy to gather the one or more contextual values to determine whether the use request satisfies the authorized context for which the device can use the protected resource;

a mediation server comprising computer readable instructions that when executed on a processor of the mediation server:

process the one or more contextual values, authorize access to the protected resource by the device when it is determined that the use request based on the one or more contextual values gathered by the use policy conforms to the authorized context for which the device may use the protected resource, and generate a use terms from the computer-readable instructions defining the authorized context for the use request; and a network.

17. The system of claim 16, further comprising:

the device comprising computer readable instructions that when executed on a processor of the device:

generate a redemption request comprising a first use key received by the device, and monitor use of and enforce ephemerality of the protected resource by maintaining a ledger comprising data identifying the protected resource that is in an active use by the device and a corresponding instance of the use terms associated with the authorized use of the protected resource.

18. The system of claim 17, further comprising:
the transaction engine further comprising computer readable instructions that when executed:
  maintain an open transaction record of the use transaction and store one or more inputs usable to determine the authorized context, the open transaction record associating the device with the active use of the protected resource; and
the mediation server further comprising computer readable instructions that when executed on the processor of the mediation server:
  return the use terms generated from the computer-readable instructions to the device.

19. The system of claim 18, further comprising:
the mediation server further comprising computer readable instructions that when executed on the mediation server:
  generate a set of one or more use keys and append the identifier of the protected resource to each of the set of one or more use keys to form one or more key-identifier pairs,
  associate an expiration condition with each of the one or more key-identifier pairs, and
  return the first use key of the set of one or more use keys to the device; and
a key server comprising computer readable instructions that when executed on a processor of the key server:
  receive the redemption request of the device, and
  extract the identifier of the protected resource from a first key-identifier pair of the one or more key-identifier pairs and retrieving the protected resource with the identifier of the protected resource.

20. The system of claim 19, further comprising:
a profile server comprising computer readable instructions that when executed on a processor of the profile server:
  receive an identity claim from the device comprising a device root hash computed by a hash function with inputs comprising a previous transaction record along with a penultimate hash of a hash history of the device, the hash history of the device referred to as a device hastory; and
the transaction engine comprising computer readable instructions that when executed on a processor of the transaction engine:
  process a termination notice that at least one of: (i) the protected resource is no longer in the active use by the device, (ii) a network connection to the device over the network is lost, and (iii) use of the protected resource has been automatically terminated where the device performed an action outside of the use terms.

* * * * *